US012730529B2

(12) United States Patent
Lee et al.

(10) Patent No.: US 12,730,529 B2
(45) Date of Patent: Sep. 8, 2026

(54) DISPLAY DEVICE WITH CORRECTED IMAGE DATA BASED ON STRETCH DATA

(71) Applicant: Samsung Display Co., Ltd., Yongin-si (KR)

(72) Inventors: Seungjun Lee, Yongin-si (KR); Junhyeong Park, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/935,064

(22) Filed: Nov. 1, 2024

(65) Prior Publication Data

US 2025/0284359 A1 Sep. 11, 2025

(30) Foreign Application Priority Data

Mar. 11, 2024 (KR) ........................ 10-2024-0033864

(51) Int. Cl.
*G06F 3/041* (2006.01)
*G06F 3/044* (2006.01)
(Continued)

(52) U.S. Cl.
CPC .......... *G06F 3/0416* (2013.01); *G06F 3/0446* (2019.05); *G06F 3/045* (2013.01);
(Continued)

(58) Field of Classification Search
CPC ................. G06F 3/0416; G06F 3/0446; G06F 2203/04102; G09G 3/035; G09G 3/3208;
(Continued)

(56) References Cited

U.S. PATENT DOCUMENTS 9,691,996 B2 6/2017 Lee
9,698,205 B2 7/2017 Jeong et al.
(Continued)

FOREIGN PATENT DOCUMENTS

CN 112230799 A * 1/2021 ............. G06F 3/044
CN 109189265 B 10/2021
(Continued)

OTHER PUBLICATIONS

Translation of CN-112230799-A. (Year: 2021).*
(Continued)

*Primary Examiner* — Liliana Cerullo
(74) *Attorney, Agent, or Firm* — Womble Bond Dickinson (US) LLP

(57) ABSTRACT

A stretchable display device including a processor configured to correct image data for stretch compensation is provided. The processor is configured to receive from a stretch sensing unit of the display device stretch data including a stretch location, a stretch range, and a stretch ratio, determined based on an electrical characteristic change for each coordinate of a touch sensor of the display device and correct the image data corresponding to pixels of the display device based on the stretch data and a lookup table including a relation between a stretch ratio and correction data. The correction data may be determined based on at least one of a efficiency change of a light-emitting device according to a stretch ratio, a characteristic change of a thin-film transistor, or an emission area ratio.

20 Claims, 62 Drawing Sheets

(51) Int. Cl.
*G06F 3/045* (2006.01)
*G09G 3/00* (2006.01)

(52) U.S. Cl.
CPC ... *G09G 3/035* (2020.08); *G06F 2203/04102* (2013.01); *G09G 2320/0233* (2013.01); *G09G 2354/00* (2013.01)

(58) Field of Classification Search
CPC ... G09G 2320/0233; G09G 2320/0285; G09G 2354/00
See application file for complete search history.

(56) References Cited

U.S. PATENT DOCUMENTS 9,756,723 B2 9/2017 Hong et al.
9,804,699 B2 10/2017 Hyun et al.
10,930,209 B2 2/2021 Choi et al.
11,580,888 B2 2/2023 Liu et al.
2016/0077553 A1 3/2016 Hyun
2018/0174523 A1 6/2018 Jeon et al.
2019/0107911 A1* 4/2019 Zhai ...................... G06F 3/0443
2020/0211437 A1 7/2020 Ahn et al.
2022/0246090 A1* 8/2022 Wu ......................... G09F 9/301
2022/0392381 A1 12/2022 Kim et al.
2023/0152930 A1 5/2023 Park et al.
2023/0316974 A1 10/2023 Kim et al.
2025/0273108 A1* 8/2025 Kim .................... G09G 3/3225

FOREIGN PATENT DOCUMENTS

KR 10-2018-0072022 A 6/2018
KR 10-2020-0081945 A 7/2020
KR 10-2190140 B1 12/2020
KR 10-2021-0128591 A 10/2021
KR 10-2327582 B1 11/2021
KR 10-2350029 B1 1/2022
KR 10-2022-0076112 A 6/2022
KR 10-2022-0095839 A 7/2022
KR 10-2022-0163570 A 12/2022
KR 10-2484880 B1 1/2023
KR 10-2023-0071694 A 5/2023

OTHER PUBLICATIONS

International Search Report and Written Opinion of the International Searching Authority, issued Apr. 8, 2025, corresponding to PCT/KR2025/000316, 3 pages.

* cited by examiner

DA
SDA
SDAs
IIa'
IIa
IIIa'
IIIa
x
y

FIG. 19

| ΔCm | STRETCH RATIO |
|---|---|
| ΔCm0 | 0 |
| ⋮ | ⋮ |
| ΔCmx1 | S1 |
| ⋮ | ⋮ |
| ΔCmx2 | S2 |
| ⋮ | ⋮ |
| ΔCm1 | Sm |

FIG. 21

| STRETCH RATIO | CORRECTION DATA |
|---|---|
| 0 | ΔΔ |
| ⋮ | ⋮ |
| S1 | ΔΔ |
| ⋮ | ⋮ |
| S2 | ΔΔ |
| ⋮ | ⋮ |

DISPLAY DEVICE WITH CORRECTED IMAGE DATA BASED ON STRETCH DATA

CROSS-REFERENCE TO RELATED APPLICATION

The present application claims priority to and the benefit of Korean Patent Application No. 10-2024-0033864, filed on Mar. 11, 2024, in the Korean Intellectual Property Office, the entire disclosure of which is incorporated by reference herein.

BACKGROUND

1. Field

One or more embodiments relate to a display device, and more particularly, to a stretchable display device.

2. Description of the Related Art

As display devices visually showing electrical signals have been developed, various display devices having excellent characteristics, such as being thin and lightweight and having low power consumption, have been introduced. For example, flexible display devices which can be bent and/or rolled have been introduced. Recently, research and development regarding stretchable display devices transformable into various forms have been actively conducted.

SUMMARY

One or more embodiments include a display device with improved display quality. However, the technical aspects described herein are provided merely as an example, and thus do not pose a limitation on the scope of the present disclosure.

Additional aspects and features of embodiments of the present disclosure will be set forth in part in the description which follows and, in part, will be apparent from the description, or may be learned by practice of the described embodiments of the present disclosure.

According to one or more embodiments, a stretchable display device includes a processor configured to correct image data for stretch compensation. The processor may be further configured to receive, from a stretch sensing unit of the display device, stretch data including a stretch location, a stretch range, and a stretch ratio determined based on an electrical characteristic change for each coordinate of a sensor of the display device and correct the image data corresponding to pixels (e.g., image data in the unit of pixels) of the display device based on the stretch data and a lookup table comprising a relation between a stretch ratio and correction data. The correction data may be determined based on an emission area ratio according to a stretch ratio.

The correction data may be determined based on the emission area ratio, a characteristic change of a thin-film transistor, and a characteristic change of a light-emitting device according to a stretch ratio.

The electrical characteristic change may be a capacitance change amount, and the stretch sensing unit may be configured to determine at least one stretch range based on a stretch location having a minimum capacitance change amount and a stretch location having a maximum capacitance change amount.

The processor may be further configured to correct image data of pixels in a display area corresponding to the at least one stretch range according to a stretch ratio.

The processor may be further configured to determine that stretch ratios in the stretch range are the same when a difference between the stretch ratios in the stretch range is within a threshold value and differentiate a stretch ratio applied to pixels of the display device corresponding to a center area in the stretch range from a stretch ratio applied to pixels of the display device corresponding to an edge area in the stretch range, based on a stretch ratio lookup table for each area.

The processor may be further configured to measure during stretching a first time point and a second time point, the first time point and the second time point being preset and correct image data input between the first time point and the second time point based on stretch ratios respectively set to the first time point and the second time point.

The processor may be further configured to further set up a third time point between the first time point and the second time point and calculate a stretch ratio of the third time point by interpolation of a first stretch ratio set to the first time point and a second stretch ratio set to the second time point and correct image data input between the first time point and the third time point and image data input between the second time point and the third time point.

The stretchable display device may further include a data driving unit configured to output data signals corresponding to corrected image data to the pixels.

The sensor may be a capacitive touch sensor, and the stretchable display device may further include a touch sensing unit configured to sense a capacitance change amount for each coordinate of the sensor and generate touch data based on the capacitance change amount for each coordinate.

The touch sensing unit and the stretch sensing unit may be separate integrated circuit chips or a single integrated circuit chip.

The touch sensing unit may be configured to sense a touch when a capacitance for each coordinate of the sensor is greater than a reference capacitance, and the stretch sensing unit may be configured to sense a stretch when a capacitance for each coordinate of the sensor is less than or equal to the reference capacitance. The reference capacitance may be a maximum capacitance of the sensor calculated in a maximum stretch state.

The sensor may include a plurality of sensing electrodes, and the plurality of sensing electrodes may include first sensing electrodes arranged along a first direction and electrically connected to each other and second sensing electrodes arranged along a second direction crossing the first direction and electrically connected to each other.

The electrical characteristic change may be a resistance change amount, and the stretch sensing unit may be configured to determine at least one stretch range based on a stretch location determined based on a minimum resistance change amount and a stretch location determined based on a maximum resistance change amount.

The processor may be further configured to correct image data of pixels in a display area corresponding to the at least one stretch range according to a stretch ratio.

The sensor may include a single-film or double-film transparent resistive film having a resistance varying according to a stretch.

The sensor may include a plurality of first sensing lines extending in a first direction and a plurality of second sensing lines extending in a second direction intersecting the first direction, the plurality of first sensing lines and the plurality of second sensing lines having a resistance varying according to a stretch, and the plurality of first sensing lines and the plurality of second sensing lines may be in different layers from each other.

The stretchable display device may further include a resistive touch sensor and a touch sensing unit configured to sense a resistance change amount for each coordinate of the touch sensor and generate touch data based on the resistance change amount for each coordinate.

According to one or more embodiments, a method of correcting image data for stretch compensation in a stretchable display device includes receiving by a processor from a stretch sensing unit of the display device, stretch data including a stretch location, a stretch range, and a stretch ratio determined based on an electrical characteristic change for each coordinate of a sensor and correcting, by the processor, image data corresponding to pixels (e.g., image data in the unit of pixels) based on the stretch data and a lookup table including a relation between a stretch ratio and correction data. The correction data may be determined based on at least one of an emission area ratio, a characteristic change of a light-emitting device, or a characteristic change of a thin-film transistor, according to a stretch ratio.

The sensor may include a capacitive touch sensor, the electrical characteristic change of the sensor may include a capacitance change amount, and the processor may be configured to receive, from the stretch sensing unit, the stretch data determined based on a capacitive change amount of the sensor and receive, from a touch sensing unit of the display device, touch data determined based on the capacitive change amount of the sensor.

The sensor may include a resistive film having a resistance varying according to a stretch, the electrical characteristic change of the sensor may be a resistance change amount, and the processor may be further configured to receive from the stretch sensing unit the stretch data determined based on a resistance change amount of the sensor, and receive from a touch sensing unit of the display device, touch data determined based on an electrical characteristic change amount for each coordinate of a touch sensor of the display device. The touch sensor may be separately located from the sensor and may include a capacitive sensor or a resistive sensor, and the electrical characteristic change amount of the touch sensor may be a capacitance change amount or a resistance change amount.

BRIEF DESCRIPTION OF THE DRAWINGS

The above and other aspects and features of certain embodiments of the present disclosure will be more apparent from the following description taken in conjunction with the accompanying drawings, in which:

FIG. 19 is a schematic view illustrating a lookup table of stretch ratio according to a capacitance change, according to one or more embodiments;

FIG. 21 is a schematic view illustrating a lookup table of stretch ratio and correction data according to a capacitance change, according to one or more embodiments;

DETAILED DESCRIPTION

Figure 1:
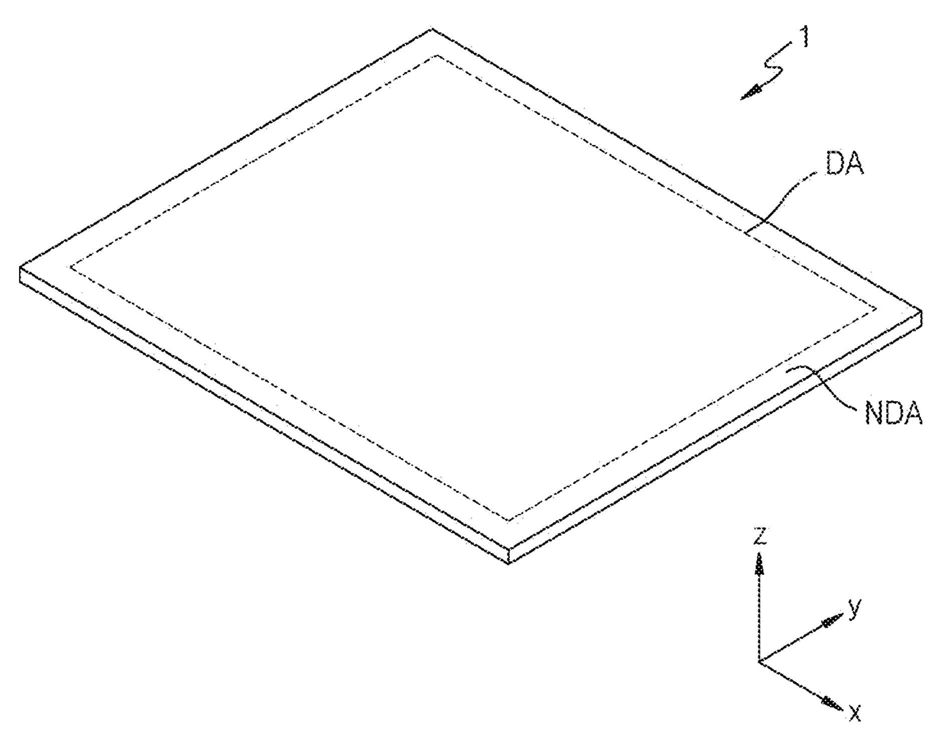
FIG. 1 is a schematic perspective view of a display device according to one or more embodiments.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, embodiments are merely described below, by referring to the figures, to explain aspects of the present disclosure. As used herein, the term "and/or" includes any and all combinations of one or more of the associated listed items. Throughout the present disclosure, the expression "at least one of a, b or c" or "at least one of a, b, and c" indicates only a, only b, only c, both a and b, both a and c, both b and c, all of a, b, and c, or variations thereof.

As embodiments allow for various changes and numerous embodiments, embodiments will be illustrated in the drawings and described in detail in the written description. The effects, aspects, and features of the present disclosure and methods for achieving the same may be clarified by referring to the following detailed embodiments along with the drawings. The present disclosure may, however, be embodied in many different forms and should not be construed as limited to the embodiments set forth herein.

It will be understood that although the terms "first," "second," etc. may be used herein to describe various elements, these elements should not be limited by these terms. These terms are only used to distinguish one element from another.

As used herein, the singular forms "a," "an" and "the" are intended to include the plural forms as well, unless the context clearly indicates otherwise.

It will be further understood that the terms "comprises" and/or "comprising" used herein specify the presence of stated features or elements, but do not preclude the presence or addition of one or more other features or elements.

It will be further understood that when a layer, region, or element is referred to as being "on" another layer, region, or element, it may be "directly on" the other layer, region, or element or may be "indirectly on" the other layer, region, or element with one or more intervening layers, regions, or elements therebetween.

As used herein, "A and/or B" represents the case of A, B, or A and B. Also, "at least one of A and B" represents the case of A, B, or A and B.

In embodiments below, when X and Y is connected to each other, this may mean that X and Y are electrically connected to each other, X and Y are functionally connected to each other, or X and Y are physically connected to each other. In this regard, X and Y may be an object (for example, an apparatus, a device, a circuit, a wire, an electrode, a terminal, a conductive film, a layer, etc.) Accordingly, a connection between X and Y is not limited to the connections illustrated in the drawings or the detailed description and may also include other types of connections.

When X and Y are electrically connected to each other, this may include the cases that X and Y are directly connected to each other and that at least one device enabling the electrical connection between X and Y (for example, a switch, a transistor, a capacitive device, an inductor, a resistive device, a diode, etc.) is connected between X and Y.

In the following examples, the x direction, the y direction, and the z direction are not limited to the directions along the three axes of the rectangular coordinate system, and may be interpreted in a broader sense. For example, the x direction, the y direction, and the z direction may be perpendicular to one another, or may represent different directions that are not perpendicular to one another.

When a certain embodiment may be implemented differently, a specific process order may be performed differently from the described order. For example, two consecutively described processes may be performed substantially at the same time or performed in an order opposite to the described order.

Sizes of components in the drawings may be exaggerated for convenience of explanation. In other words, because sizes and thicknesses of elements in the drawings are arbitrarily illustrated for convenience of explanation, the present disclosure is not limited thereto.

Blocks of the diagrams and combinations of flowcharts may be performed by computer program instructions. Such computer program instructions may be embedded in a processor of a general-purpose computer, a special purpose computer, or other programmable data processing devices, and the instructions performed by a processor of a computer or other programmable data processing devices may generate a tool to perform functions described in the blocks of flowcharts. These computer program instructions may use a computer or other programmable data processing devices or may be stored in a computer-readable memory to implement functions in a particular manner, and thus, the instructions using a computer or being stored in a computer-readable memory may also be used to manufacture a product including an instruction tool for performing the functions described in the blocks of the flowcharts. The computer program instructions may be embedded in a computer or other programmable data processing devices, and accordingly, a series of operations may be performed on a computer or other programmable data processing devices to generate a process in a computer. Thus, the instructions for executing a computer or other programmable data processing devices may provide operations to perform the functions described in the blocks of the flowcharts.

In addition, each block may represent a module, a segment, or a part of a code including at least one executable instruction to perform particular logical functions. In some alternative execution examples, functions mentioned in the blocks may also be performed in an order other than the described orders. For example, two consecutive blocks may be performed concurrently (e.g., simultaneously or substantially simultaneously) or may be performed in an opposite order according to their functions.

Such a term as " . . . unit" used herein refers to a software or a hardware such as FPGA or ASIC and may perform certain functions. However, a unit does not necessarily refer to a software or a hardware. A unit may be included in an addressable storage medium or may be configured to drive at least one processor. For example, " . . . unit" may include elements, such as software elements, object-oriented software elements, class elements, and task elements, processes, functions, attributes, procedures, sub-routines, segments of program codes, drivers, firmware, micro-codes, circuits, data, databases, data structures, tables, arrays, and variables. Elements and functions provided in units may be combined into a smaller number of elements and units or may be further divided into additional elements and units. In addition, elements and units may be implemented to drive at least one CPU in a device or a secure multimedia card.

A person of ordinary skill in the art would appreciate, in view of the present disclosure in its entirety, that each suitable feature of the various embodiments of the present disclosure may be combined or combined with each other, partially or entirely, and may be technically interlocked and operated in various suitable ways, and each embodiment may be implemented independently of each other or in conjunction with each other in any suitable manner unless otherwise stated or implied.

Figure 2A:
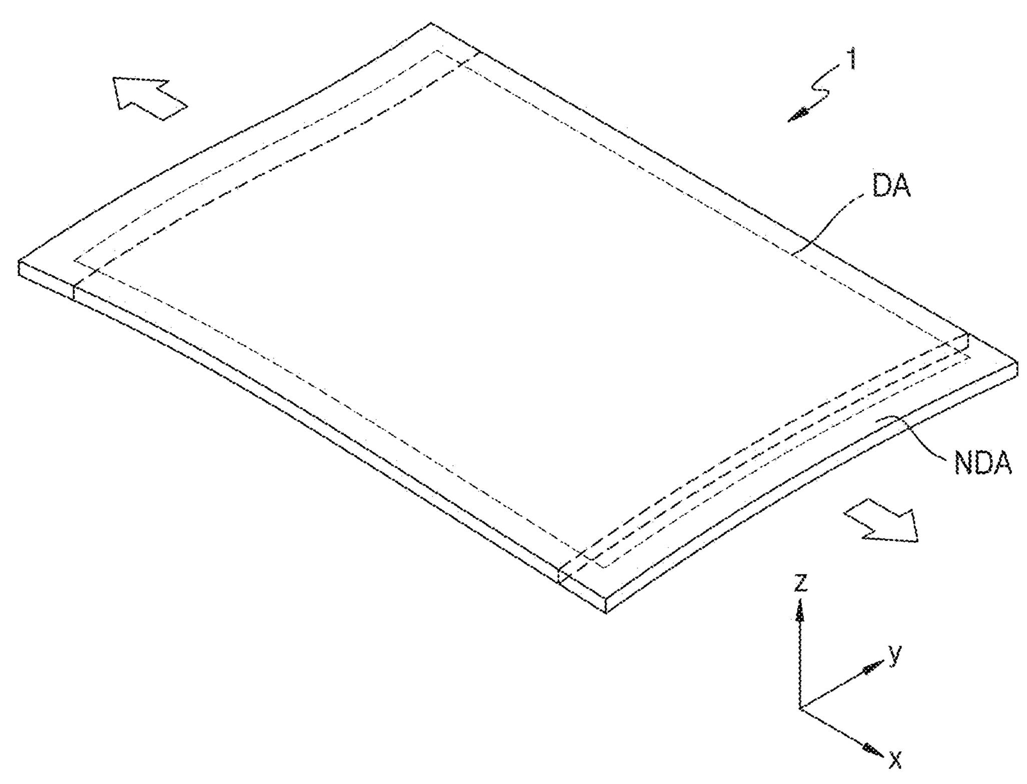
FIGS. 2A and 2B are each a perspective view illustrating the display device of FIG. 1 stretched in a first direction.
Figure 2B:
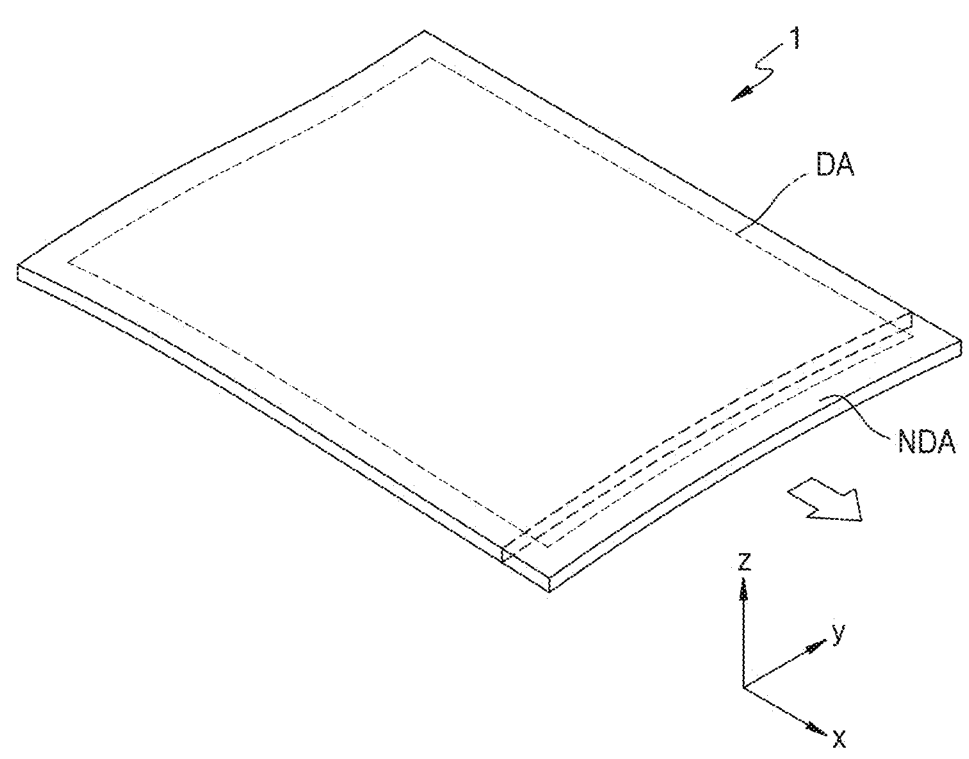
Figure 2C:
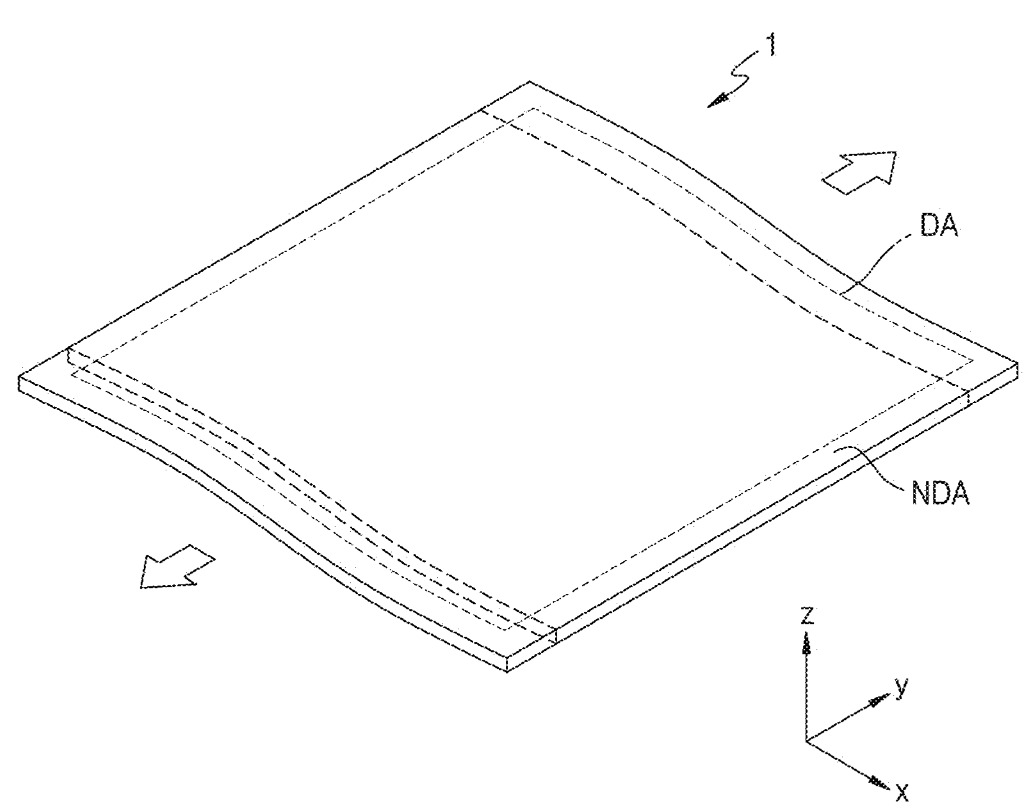
FIG. 2C is a perspective view illustrating the display device of FIG. 1 stretched in a second direction.
Figure 2D:
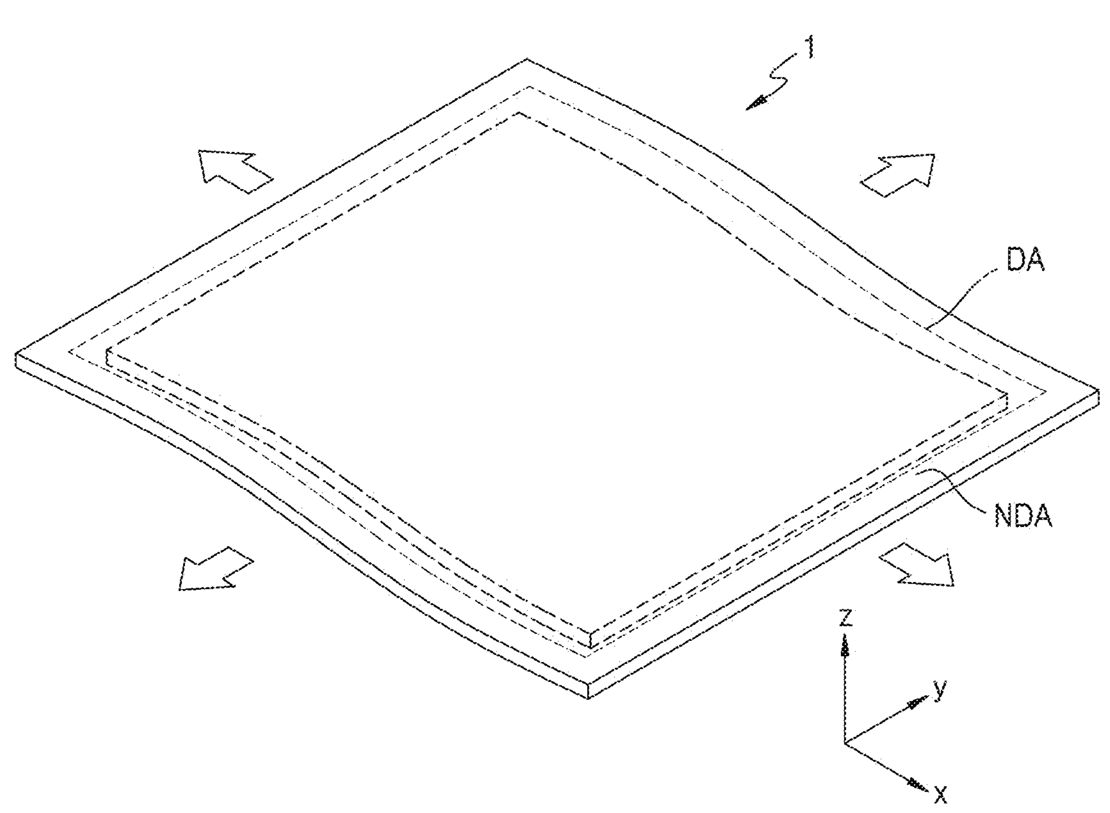
FIG. 2D is a perspective view illustrating the display device of FIG. 1 stretched in the first direction and the second direction.
Figure 2E:
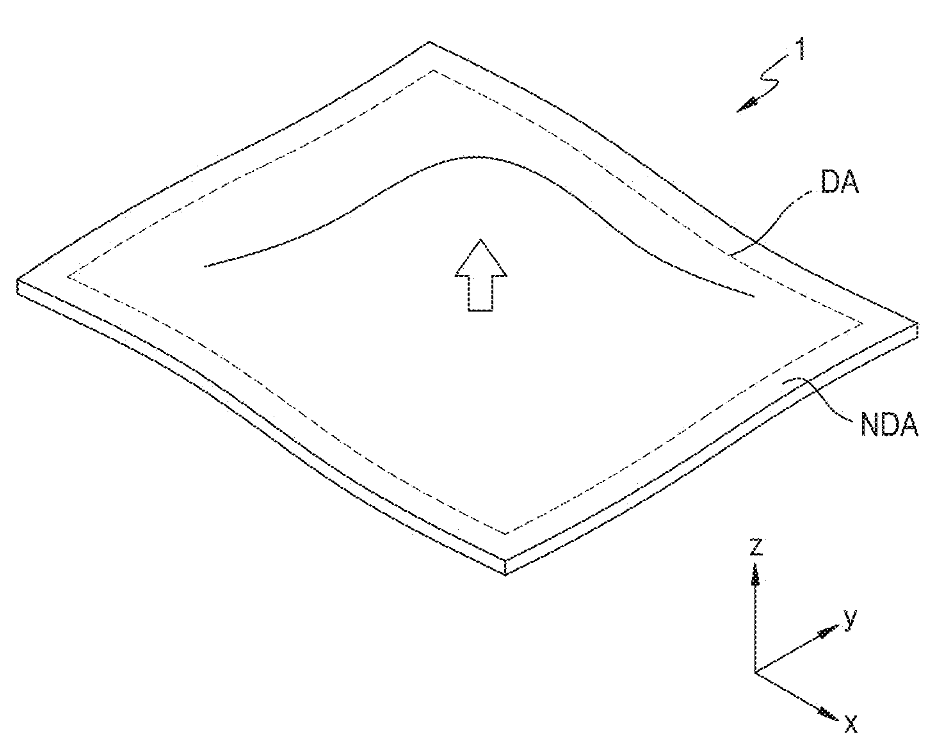
FIG. 2E is a perspective view illustrating the display device of FIG. 1 stretched in a third direction.

FIG. 1 is a schematic perspective view of a display device according to one or more embodiments. FIGS. 2A and 2B are each a perspective view illustrating the display device of FIG. 1 stretched in a first direction. FIG. 2C is a perspective view illustrating the display device of FIG. 1 stretched in a second direction. FIG. 2D is a perspective view illustrating the display device of FIG. 1 stretched in a first direction and a second direction. FIG. 2E is a perspective view illustrating the display device of FIG. 1 stretched in a third direction.

Referring to FIG. 1, a display device 1 may be a stretchable display device which may be stretched and/or reduced in various directions. The display device 1 may include a display area DA and a non-display area NDA around an edge or a periphery of the display area DA. The display area DA may include a plurality of pixels. The display device 1 may provide a certain image by using light emitted from the plurality of pixels. The non-display area NDA may be arranged outside of the display area DA. The non-display area NDA may entirely surround the display area DA.

The display device 1 may be stretched in a first direction (for example, x direction and/or −x direction) by an external force applied by a user or an external object. For example, as illustrated in FIGS. 2A and 2B, the display area DA and/or the non-display area NDA of the display device 1 may be stretched in the first direction (for example, x direction and/or −x direction). For example, as illustrated in FIG. 2A, the display device 1 may be stretched in the x direction and −x direction, or the display device 1 may be stretched in the x direction and −x direction while one side thereof is fixed. FIG. 2B illustrates the display device 1 stretched in the x direction while one side thereof is fixed.

The display device 1 may be stretched in a second direction (for example, y direction and/or −y direction) by an external force applied by a user or an external object. For example, as illustrated in FIG. 2C, the display area DA and/or the non-display area NDA of the display device 1 may be stretched in the y direction and the −y direction. In another example, the display device 1 may be stretched in the y direction or the −y direction while one side thereof is fixed.

The display device 1 may be stretched in a plurality of directions, for example, the first direction (e.g., x direction and/or −x direction) and the second direction (e.g., y direction and/or −y direction) by an external force applied by a body part of a user and/or an external object. As illustrated in FIG. 2D, the display area DA and/or the non-display area NDA of the display device 1 may be stretched in the +x direction and the ty direction.

The display device 1 may be stretched in a third direction (for example, z direction or −z direction) by an external force applied by a body part of a user and/or an external object. For example, FIG. 2E illustrates a part of the display device 1, for example, a part of the display area DA protrudes in the z direction. In another example, a part of the display device 1, for example, a part of the display area DA may protrude in the −z direction (or z direction).

FIGS. 2A-2E illustrate the display device 1 stretched in the first direction, the second direction, and/or the third direction; however, the present disclosure is not limited thereto. In one or more embodiments, the display device 1 may be transformed into an atypical shape, for example, a bent or twisted shape having two or more axis.

Figure 3A:
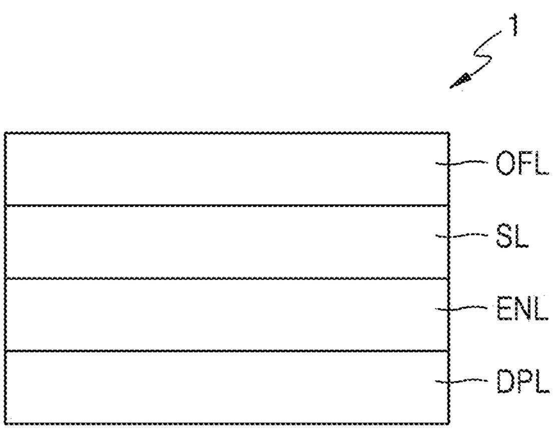
FIGS. 3A and 3B are each a schematic cross-sectional view of a display device according to one or more embodiments.
Figure 3B:
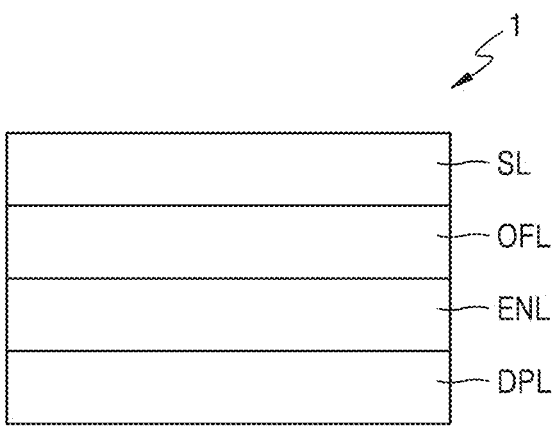

FIGS. 3A and 3B are each a schematic cross-sectional view of a display device according to one or more embodiments.

Referring to FIG. 3A, the display device 1 may include a display layer DPL, an encapsulation layer ENL, a sensor layer SL, and an optical functional layer OFL. For the stretch of the display device 1, the display layer DPL, the encapsulation layer ENL, and the optical functional layer OFL may include a stretchable material.

The display layer DPL may include a plurality of pixels. Each pixel may include a pixel circuit and a light-emitting device (e.g., a display element) connected to the pixel circuit. The pixel circuit may include at least one thin-film transistor and at least one capacitor.

The encapsulation layer ENL may be disposed on the light-emitting device and may cover the display area DA and the non-display area NDA.

In one or more embodiments, the encapsulation layer ENL may be a thin-film encapsulation layer including an inorganic encapsulation layer and/or an organic encapsulation layer. In one or more embodiments, the encapsulation layer ENL may include a structure in which an inorganic encapsulation layer including an inorganic insulating material, an organic encapsulation layer including an organic insulating material, and an inorganic encapsulation layer including an inorganic insulating material are stacked. In one or more embodiments, the encapsulation layer ENL may include an organic material such as resin and may be a signal layer including the aforementioned organic material. In one or more embodiments, the encapsulation layer ENL may include urethane epoxy acrylate. The encapsulation layer ENL may include a photosensitive material, such as a photoresist.

In one or more embodiments, the encapsulation layer ENL may be a sealing substrate. The sealing substrate may be arranged to face a substrate on which pixels are arranged, with a light-emitting element arranged therebetween. There may be a gap between the sealing substrate and the light-emitting element.

The sensor layer SL may be disposed on the encapsulation layer ENL. The sensor layer SL may include a strain sensor (e.g., a stretchable sensor). In one or more embodiments, the strain sensor may be a capacitive sensor or a resistive sensor sensing an external force. In one or more embodiments, the sensor layer SL may be formed directly on the encapsulation layer ENL. In one or more embodiments, the sensor layer SL may be formed separately on a sensor substrate and then may be coupled onto the encapsulation layer ENL through an adhesive layer, such as an optical clear adhesive (OCA).

The optical functional layer OFL may be disposed on the sensor layer SL. The optical functional layer OFL may include an anti-reflection layer. The anti-reflection layer may reduce a reflectance of light (e.g., an external light) incident from the outside towards the display device 1. In one or more embodiments, the optical functional layer OFL may include a filter plate including a black matrix and/or color filters. In one or more embodiments, the optical functional layer OFL may be a polarizing film. In one or more embodiments, as illustrated in FIG. 3B, the optical functional layer OFL may be arranged between the encapsulation layer ENL and the sensor layer SL.

Figure 4:
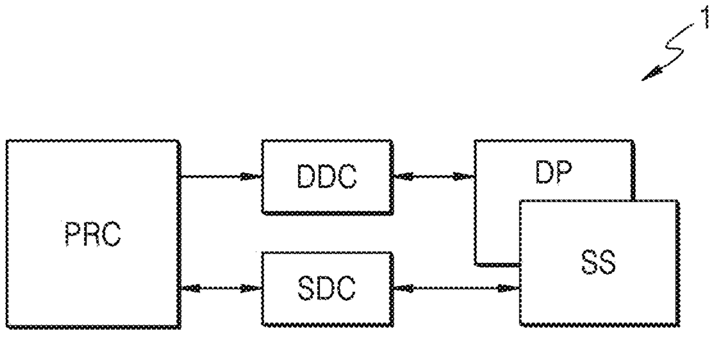
FIGS. 4 and 5 are each a schematic view of a display device according to one or more embodiments.
Figure 5:
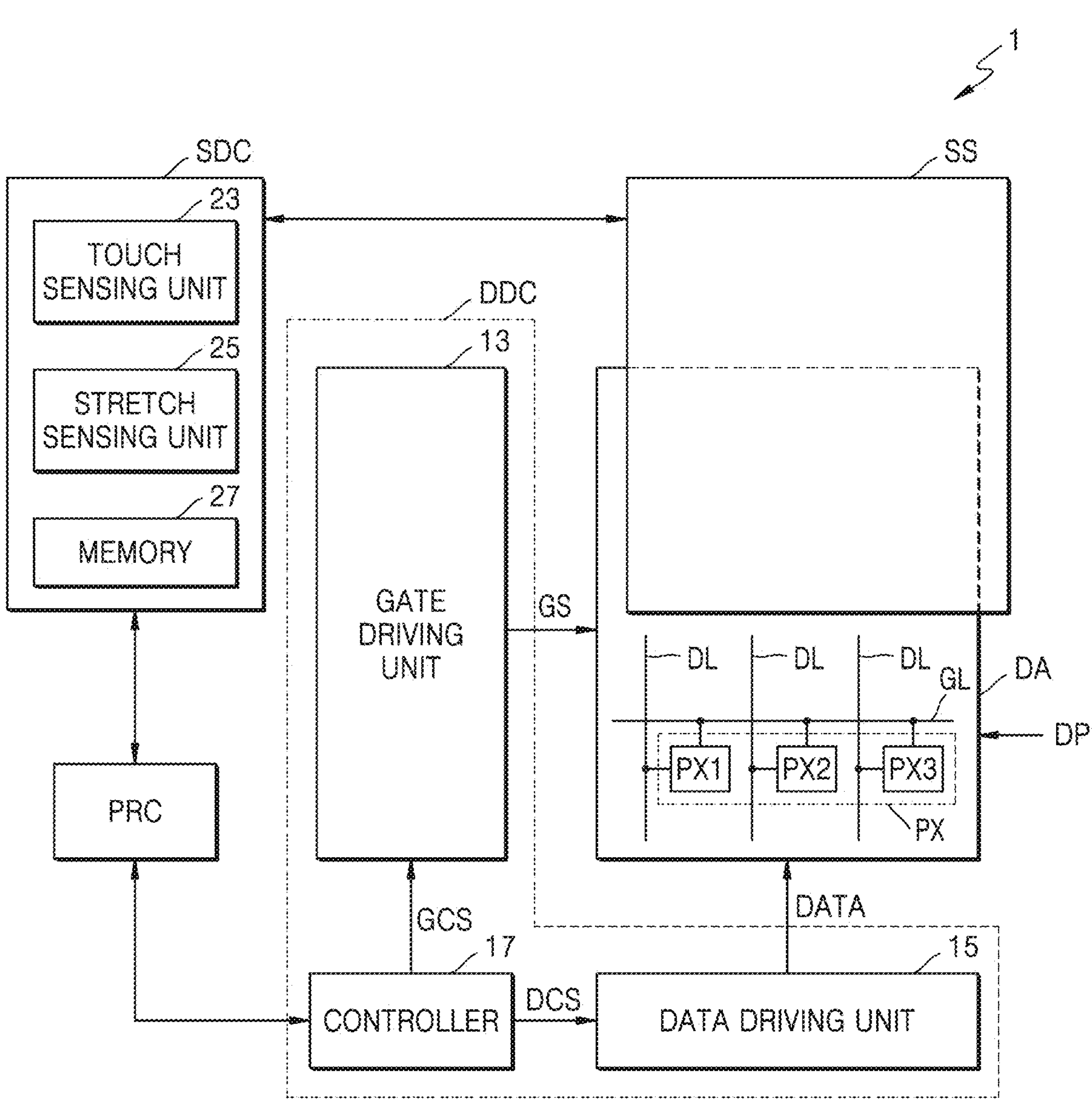
Figure 6A:
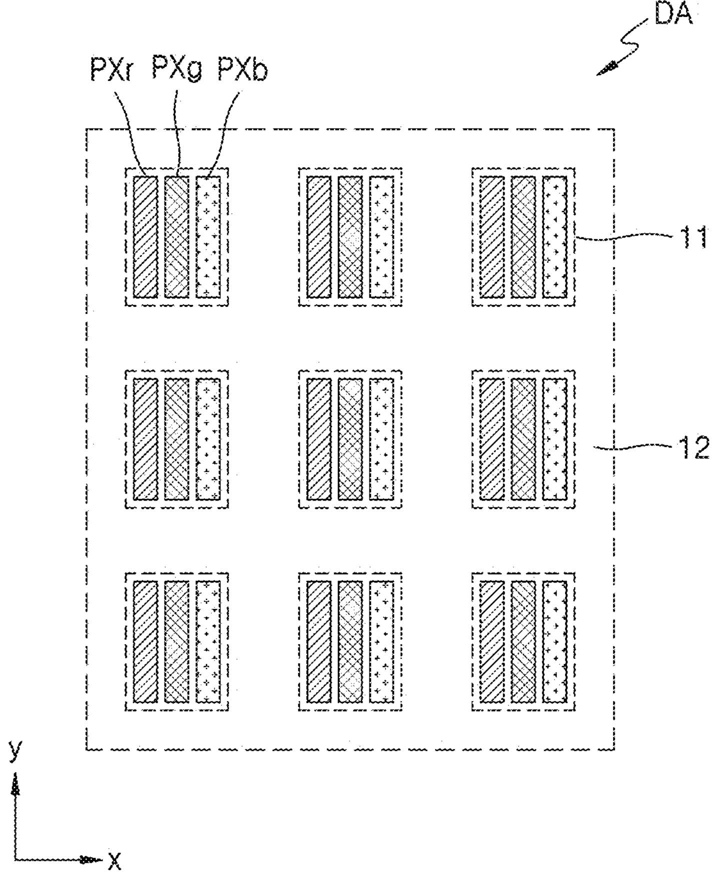
FIGS. 6A and 6B are each a schematic view illustrating a part of a display area according to one or more embodiments.
Figure 6B:
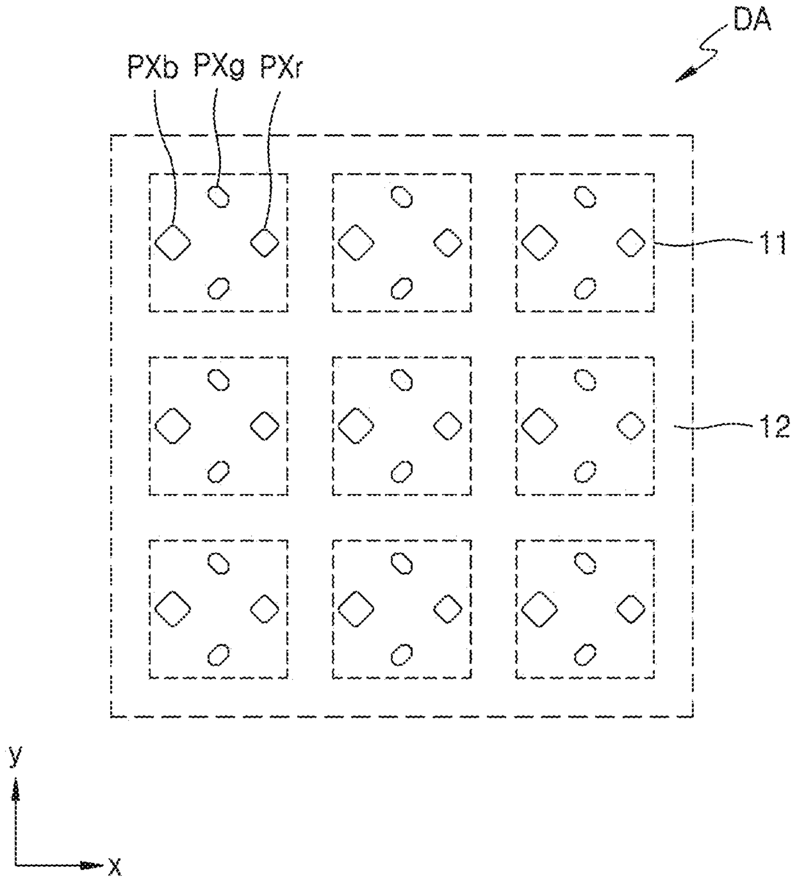
Figure 7A:
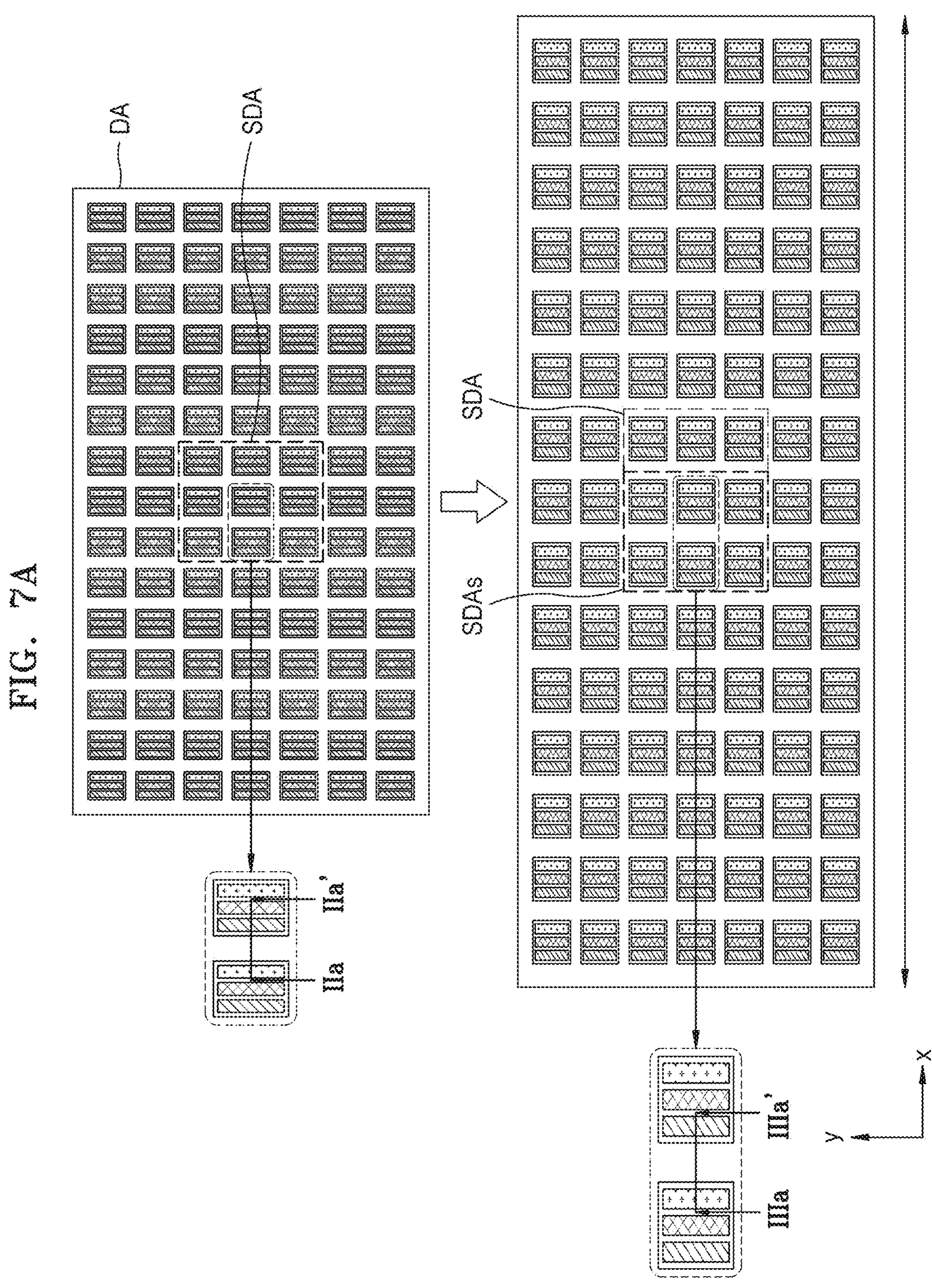
FIGS. 7A-7C are each a diagram illustrating an areal change of an emission area due to stretching of a display area.
Figure 7B:
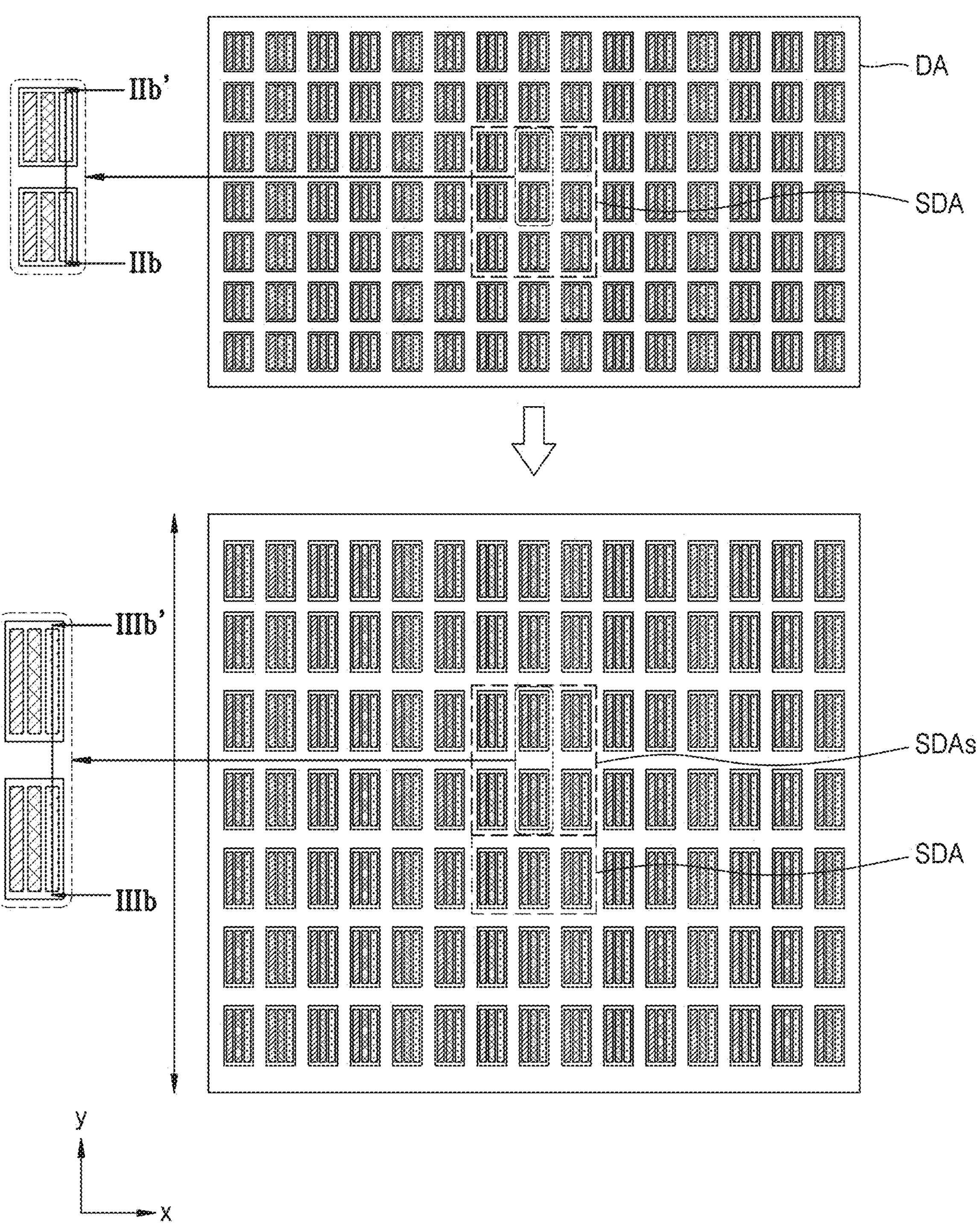
Figure 7C:
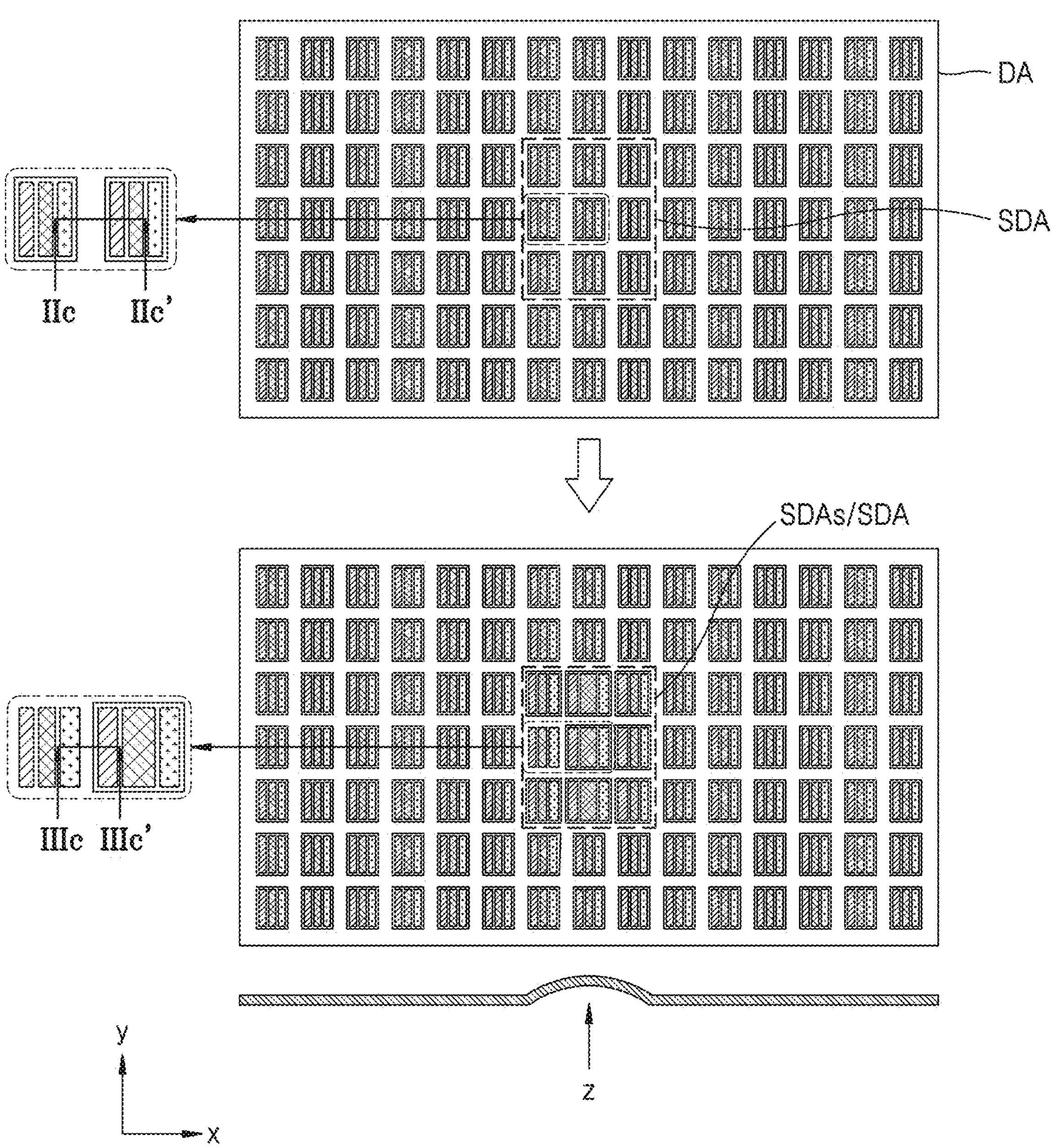
Figure 8:
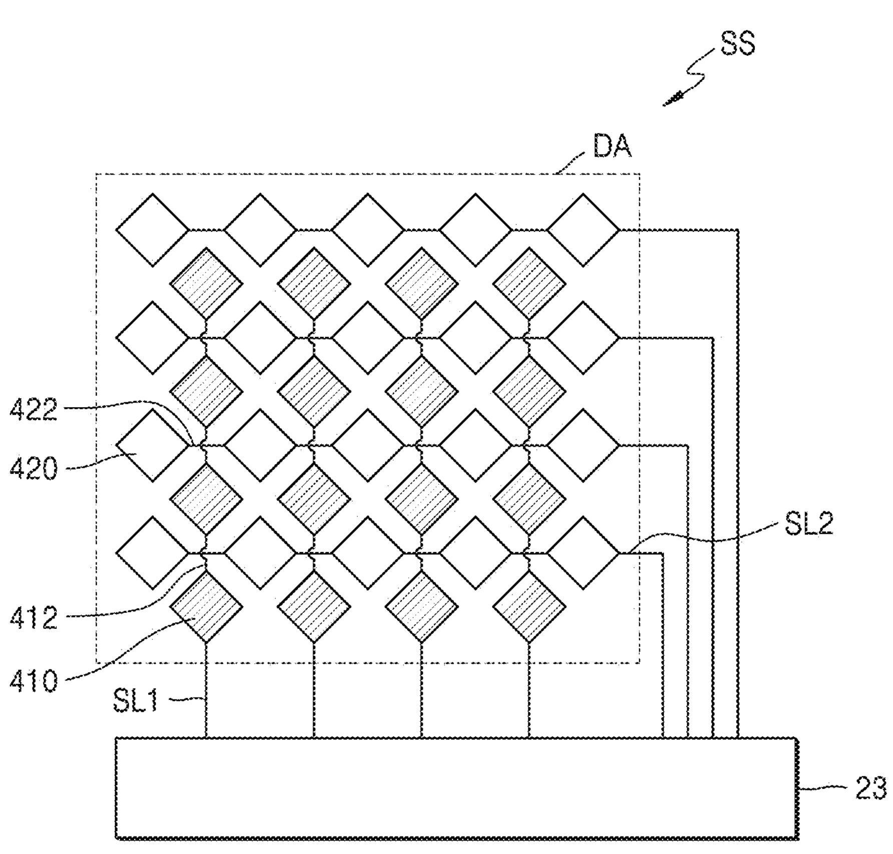
FIG. 8 is a schematic plan view of a strain sensor according to one or more embodiments.
Figure 9:
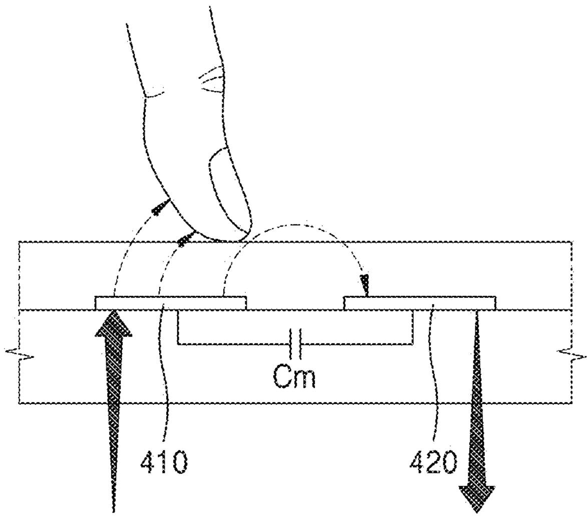
FIG. 9 is a schematic cross-sectional view illustrating sensing of a touch by a strain sensor according to one or more embodiments.
Figure 10:
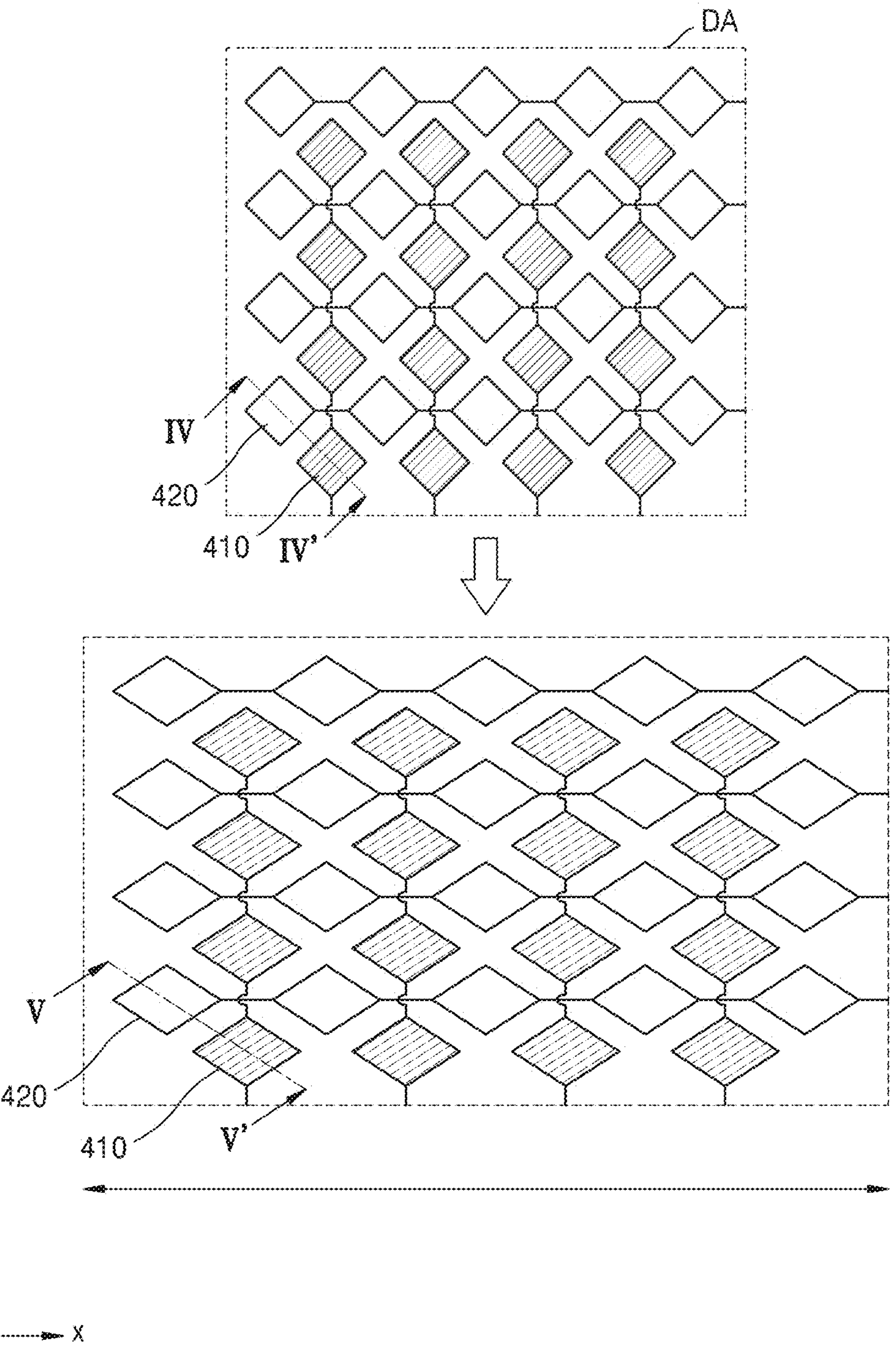
FIG. 10 is a schematic plan view illustrating an areal change of a strain sensor due to stretching of the strain sensor, according to one or more embodiments.
Figure 11:
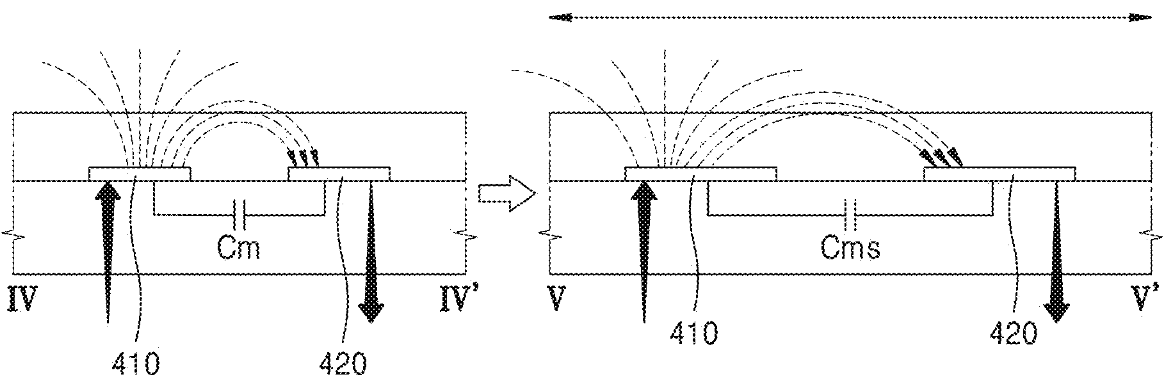
FIG. 11 is a schematic cross-sectional view illustrating sensing of stretching due to an areal change of a strain sensor according to one or more embodiments.

FIGS. 4 and 5 are each a schematic view of a display device according to one or more embodiments. FIGS. 6A and 6B are each a schematic view illustrating a part of a display area according to one or more embodiments. FIGS. 7A-7C are each a diagram illustrating an areal change of an emission area due to stretching of the display area DA. FIG. 8 is a schematic plan view of a strain sensor according to one or more embodiments. FIG. 9 is a schematic cross-sectional view illustrating sensing of a touch by a strain sensor according to one or more embodiments. FIG. 10 is a schematic plan view illustrating an areal change of a strain sensor due to stretching of the strain sensor, according to one or more embodiments. FIG. 11 is a schematic cross-sectional view illustrating sensing of stretching due to an areal change of a strain sensor according to one or more embodiments.

Referring to FIG. 4, the display device 1 may include a display panel DP, a display drive controller DDC, a strain sensor SS, a sensor drive controller SDC, and a processor PRC.

A plurality of pixels PX may be arranged in the display panel DP. In one or more embodiments, the display area DA and the non-display area NDA respectively corresponding to the display area DA and the non-display area NDA of the display device 1 may be defined in the display panel DP. As illustrated in FIG. 5, the plurality of pixels PX may be arranged in the display area DA of the display panel DP. The pixel PX may include a plurality of subpixels emitting different light from each other.

The plurality of subpixels may include a first subpixel PX1 emitting light of a first color, a second subpixel PX2 emitting light of a second color, and a third subpixel PX3 emitting light of a third color. For example, the first subpixel PX1 may be a red subpixel, the second subpixel PX2 may be a green subpixel, and the third subpixel PX3 may be a blue subpixel. The first subpixel PX1, the second subpixel PX2, and the third subpixel PX3 may each include a pixel circuit and a light-emitting device electrically connected to the pixel circuit. The pixel circuit may include a plurality of transistors and at least one capacitor and may be a pixel driver circuit that controls driving of the light-emitting device.

The pixel PX may be a minimum repeat unit of subpixels having a certain arrangement. A plurality of subpixels may have various arrangements, such as a stripe arrangement, a PENTILE® arrangement, a diamond arrangement, a mosaic arrangement, etc. to implement an image, but the present disclosure is not limited thereto. This PENTILER arrangement structure may be referred to as an RGBG matrix structure (e.g., a PENTILE® matrix structure or an RGBG structure (e.g., a PENTILE® structure)). PENTILE® is a registered trademark of Samsung Display Co., Ltd., Republic of Korea. In one or more embodiments, the pixel or the subpixel may refer to a light-emitting device, and an arrangement structure of subpixels may be understood as an arrangement structure of light-emitting devices. Hereinafter, the arrangement structure of subpixels may refer to the arrangement structure of light-emitting devices, and emission of the pixel or the subpixel may refer to emission of the light-emitting device.

Referring to FIGS. 6A and 6B, the display area DA may include first areas 11 and a second area 12 between the first areas 11. A plurality of subpixels constituting the pixel PX may be arranged in the first area 11.

In one or more embodiments, as illustrated in FIG. 6A, the subpixels may be arranged in a stripe structure in the display area DA, and the pixel PX may include one red pixel PXr, one green pixel PXg, and one blue pixel PXb.

In one or more embodiments, as illustrated in FIG. 6B, the subpixels may be arranged in a PENTILE® structure in the display area DA, and the pixel PX may include one red pixel PXr, two green pixels PXg, and one blue pixel PXb.

Although FIGS. 6A and 6B illustrate that the first areas 11 have a square shape in a plan view, the first areas 11 may have various shapes, such as a hexagonal shape, etc. The second area 12 may be an area in which a signal line (for example, a gate line, a data line, a voltage line, etc.) providing a signal to the pixels PX arranged in the first areas 11.

A plurality of gate lines GL and a plurality of data lines DL may be arranged in the display area DA of the display panel DP. Each subpixel may be connected to at least one corresponding gate line from among the plurality of gate lines GL and a corresponding data line from among the plurality of data lines DL.

Each of the gate lines GL may extend in the x direction (row direction) and may be connected to the pixels PX arranged in the same row. Each of the gate lines GL may transmit a gate signal to the pixels PX in the same row. Each of the data lines DL may extend in the y direction (column direction) and may be connected to the subpixels arranged in the same column. Each of the data lines DL may transmit a data signal to each of the subpixels in the same column in synchronization with a gate signal.

Although FIG. 5 illustrates that the pixels PX are connected to one gate line GL, this is just an example. The pixels PX may be connected to two or more gate lines, and a gate driving unit 13 may provide the gate lines with two or more gate signals GS which have different on-voltage application timings from each other.

The display drive controller DDC may drive the pixels PX of the display panel DP under the control by the processor PRC. The plurality of pixels PX may display an image signal received from the display drive controller DDC.

The display drive controller DDC may include the gate driving unit 13, a data driving unit 15, and a controller 17, as illustrated in FIG. 5.

The gate driving unit 13 may be connected to the plurality of gate lines GL, generate a gate signal GS in response to a control signal GCS from the controller 17, and sequentially provide the gate signal to the gate lines GL.

The data driving unit 15 may be connected to the plurality of data lines DL and provide data signals DATA to the data lines DL in response to a control signal DCS from the controller 17. The data signal DATA transmitted to the data line DL may be provided to the subpixel to which the gate signal is transmitted. The data driving unit 15 may convert image data or corrected image data having a gradation input from the timing controller 17 into a data signal DATA in the form of a voltage or current.

The controller 17 may be a timing controller. The controller 17 may generate the control signals (GCS, DCS) based on signals input from the outside and provide the same to the gate driving unit 13 and the data driving unit 15. The control signal GCS output to the gate driving unit 15 may include a plurality of clock signals and a gate start signal. The control signal DCS output to the data driving unit 15 may include a plurality of clock signals and a data start signal.

In one or more embodiments, the display drive controller DDC may be provided in the non-display area NDA of the display panel DP. The gate driving unit 13, the data driving unit 15, and the controller 17 of the display drive controller DDC may be formed in the form of separate integrated circuit (IC) chips or a single integrated circuit (IC) chip and may be disposed on a flexible printed circuit board (FPCB) electrically connected to a pad arranged on one side of a substrate.

In one or more embodiments, a part of or the entire gate driving unit 13 may be directly formed in the non-display area NDA of the substrate in the process of forming a transistor constituting the pixel circuit in the display area DA. The data driving unit 15 and the controller 17 may be formed in the form of separate integrated circuit (IC) chips or a single integrated circuit (IC) chip and may be disposed on a FPCB connected to one side of the substrate. In one or more embodiments, the data driving unit 15 and the controller 17 may be directly disposed on the substrate in the chip-on-plastic (COP) manner.

Hereinafter, by referring to FIGS. 7A-7C, an area of an emission area in a subarea SDA, which is a part of the display area DA, is described. When the display area DA is elongated, a gap between the pixels PX located within an elongation area (e.g., an elongation range) may increase, and a pixel distribution rate in the elongation area may decrease. When the display area DA is contracted, a gap between the pixels PX located within a contraction area (e.g., a contraction range) may decrease, and a pixel distribution rate in the contraction area may increase. The contraction may include contraction of a display device before elongation and contraction of a display after elongation.

As illustrated in FIG. 2A, as the display area DA is elongated in the first direction, for example, the x direction and the −x direction, the subarea SDA which has a certain area before elongation may be elongated in the first direction. Referring to FIG. 7A, 3×3 pixels (for example, 9 pixels) may emit light in the subarea SDA before elongation, and 2×3 pixels (for example, 6 pixels) may emit light in a subarea SDAs having the same area as the subarea SDA after elongation. Due to the elongation, the area of the emission area (hereinafter, the “emission area”) of 3×3 pixels in the subarea SDA may increase in the first direction.

As illustrated in FIG. 2C, as the display area DA is elongated in the second direction, for example, the y direction and the −y direction, the subarea SDA which has a certain area before elongation may be elongated in the second direction. Referring to FIG. 7B, 3×3 pixels (for example, 9 pixels) may emit light in the subarea SDA before elongation, and 3×2 pixels (for example, 6 pixels) may emit light in the subarea SDAs having the same area as the subarea SDA after elongation. Due to the elongation, the emission area of 3×3 pixels in the subarea SDA may increase in the second direction.

As illustrated in FIG. 2E, a part of the display area DA, for example, the subarea SDA having a certain area may be elongated in the third direction, for example, the z direction. Referring to FIG. 7C, 3×3 pixels (for example, 9 pixels) may emit light in the subarea SDA before elongation, and 3×3 pixels (for example, 9 pixels) may emit light in the subarea SDAs having the same area as the subarea SDA in a plan view after elongation. After the elongation, the emission area of 3×3 pixels in the subarea SDAs may increase in the first direction and/or the second direction. The emission area of 3×3 pixels in the subarea SDAs may vary according to a degree of elongation.

The strain sensor SS may be arranged to overlap the display panel DP. The strain sensor SS may be integrated with the display panel DP and may be coupled onto the display panel DP by an adhesive layer.

In one or more embodiments, the strain sensor SS may sense stretching of a display device and/or sense a touch.

In one or more embodiments, the sensor drive controller SDC may be formed in the form of an integrated circuit (IC) chip and may be disposed on the FPCB on which the display drive controller DDC is arranged. In one or more embodiments, the sensor drive controller SDC may be formed in the form of an integrated circuit (IC) chip and may be disposed on a separate FPCB from the FPCB on which the display drive controller DDC is arranged.

The sensor drive controller SDC may sense a change in electrical characteristics for a particular location of the strain sensor SS and transmit the same to the processor PRC. A change in electrical characteristics may include a capacitance change (amount). The sensor drive controller SDC may receive a voltage or a current corresponding to a capacitance change from the strain sensor SS and transmit a capacitance change amount calculated based on the received voltage or current as sensing data to the processor PRC. The sensor drive controller SDC may include a touch sensing unit 23 and a stretch sensing unit 25.

The touch sensing unit 23 may drive the strain sensor SS according to a preset frequency and obtain sensing data. The touch sensing unit 23 may provide the sensing data or a part of the sensing data to the stretch sensing unit 25. The touch sensing unit 23 may identify a touch or a touch location from the sensing data. To this end, the touch sensing unit 23 may include a microprocessor (MPU) and/or a microcontroller (MCU). The touch sensing unit 23 may generate touch data based on the sensing data and provide the same to the processor PRC. The touch data may include a touch location.

The stretch sensing unit 25 may receive sensing data from the touch sensing unit 23 by certain periods. The stretch sensing unit 25 may identify a stretch and a stretch location by comparing the sensing data with reference data. The stretch sensing unit 25 may generate stretch data based on the sensing data. To this end, the stretch sensing unit 25 may include a microprocessor (MPU) and/or a microcontroller (MCU). The stretch data may include a stretch ratio, a stretch location and/or a stretch range. The stretch sensing unit 25 may provide the stretch data to the processor PRC. The stretch sensing unit 25 may provide one cycle of stretch data to the processor PRC.

In one or more embodiments, the driving frequency of the sensor drive controller SDC may be identical to or different from the driving frequency of the display drive controller DDC. The driving frequency of the touch sensing unit 23 may be identical to or different from the driving frequency of the stretch sensing unit 25.

The sensor drive controller SDC may further include a memory 27. The memory 27 may be a non-volatile memory. The non-volatile memory may be a flash memory. The memory 27 may store a stretch ratio according to the sensing data. The stretch ratio according to the sensing data may be generated in an inspection process for the display device 1 and may be stored in the memory 27. For example, in the inspection process, the sensing data may be calculated for each stretch stage and written on the memory 27.

The touch sensing unit 23 and the stretch sensing unit 25 may be formed in the form of separate integrated circuit (IC) chips or a single integrated circuit (IC) chip and may be disposed on a FPCB.

Referring to FIG. 8, in one or more embodiments, the strain sensor SS may be a capacitive sensor. For example, the strain sensor SS may be a capacitive touch sensor. Referring to FIG. 8, the strain sensor SS may include a plurality of sensing electrodes and sensing lines. The sensing electrodes of the strain sensor SS may be arranged in the display area DA of the display device 1. Accordingly, when a user inputs a touch signal and/or a stretch signal to the display device 1, the user may immediately receive information through a displayed image. The sensing lines of the strain sensor SS may be arranged in the non-display area NDA of the display device 1.

The sensing electrodes may include first sensing electrodes 410 arranged in the y direction and second sensing electrodes 420 arranged in the x direction intersecting with the y direction. In the display area DA, the first sensing electrodes 410 may be arranged adjacent to each other in the y direction, and the second sensing electrodes 420 may be arranged adjacent to each other in the x direction between the first sensing electrodes 410. In one or more embodiments, each of the first sensing electrodes 410 and the second sensing electrodes 420 may include conductive lines having a mesh shape including a plurality of openings. Each opening may correspond to the first area 11 of the display area DA.

The first sensing electrodes 410 arranged in the y direction may be connected to each other, and the second sensing electrodes 420 arranged in the x direction may be connected to each other. For example, the first sensing electrodes 410 may be connected to each other through a first connection line 412, and the second sensing electrodes 420 may be connected to each other through a second connection line 422.

Columns of the first sensing electrodes 410 extending in the y direction may be connected to first signal lines SL1 arranged in the non-display area NDA. Columns of the second sensing electrodes 420 extending in the x direction may be connected to second signal lines SL2 arranged in the non-display area NDA. Each of the first signal lines SL1 and the second signal lines SL2 may be connected to the touch sensing unit 23.

In one or more embodiments, the second sensing electrodes 420 and the second connection line 422 may be arranged at a layer different from a layer at which the first sensing electrodes 410 and the first connection line 412 is arranged.

In one or more embodiments, the first sensing electrodes 410 and the second sensing electrodes 420 may be arranged at a same layer. The first connection lines 412 and/or the second connection lines 422 may be arranged at the same layer as the first sensing electrodes 410 and the second sensing electrodes 420. For example, the first connection lines 412 may be arranged at the same layer as the first sensing electrodes 410 and the second sensing electrodes 420, and the second connection lines 422 may be arranged at a layer different from a layer at which the first sensing electrodes 410 and the second sensing electrodes 420 are arranged, with an insulating layer arranged therebetween.

The first sensing electrodes 410, the second sensing electrodes 420, the first connection lines 412, the second connection lines 422, the first signal lines SL1, and the second signal lines SL2 (hereinafter, collectively referred to as the "sensing conductive patterns") may include a conductive material. For example, each of the sensing conductive patterns may include at least one metallic conductive material selected from molybdenum (Mo), mendelevium (Mb), silver (Ag), titanium (Ti), copper (Cu), and/or aluminum (Al). In one or more embodiments, each of the sensing conductive patterns may include a conductive complex having a metallic nanostructure, etc. dispersed in polymer resin. The conductive complex may include an elastomer and may further include an additive, such as carbon nanotube, carbon fiber, graphene, graphene oxide, etc. to improve conductivity. In one or more embodiments, each of the sensing conductive patterns may include a liquid metal material such as an eutectic gallium-indium alloy. Each of the sensing conductive patterns may have a single-layer or multi-layer structure including the aforementioned conductive material.

The touch sensing unit 23 may transmit a driving signal to the first sensing electrodes 410 through the first signal lines SL1 and obtain sensing data from a sensing signal transmitted from the second sensing electrodes 420 through the second signal lines SL2.

As illustrated in FIG. 9, a mutual capacitance Cm formed between adjacent first sensing electrode 410 and second sensing electrode 420 (hereinafter, referred to as the "capacitance") may be changed by an external input (for example, a touch), and such change may change a current and/or a voltage of the second signal lines SL2 or the first signal lines SL1. A change amount of the capacitance Cm may be calculated from a change in current and/or voltage, and a touch and a touch location may be detected by the change amount of the capacitance Cm.

As illustrated in FIG. 10, when the strain sensor SS is elongated in the first direction, for example, the x direction and the −x direction, the first sensing electrodes 410 and the second sensing electrodes 420 may also be elongated in the first direction. The capacitance Cm formed between the first sensing electrodes 410 and the second sensing electrodes 420 may be changed by the stretching, and after the stretching, a stretch and a stretch location may be sensed by the capacitance Cms. FIG. 11 illustrates a capacitance change Cms after elongation of the first sensing electrodes 410 and the second sensing electrodes 420.

The processor PRC may control all operations of the display device 1. In one or more embodiments, the processor PRC may be a microprocessor, an application processor (AP), etc. The processor PRC may receive data or an instruction from a user and control the display drive controller DDC and the sensor drive controller SDC based on the input data or instruction. The processor PRC may be implemented by a graphic card, a system-on-chip (SOC), etc. The processor PRC may provide image data to the display drive controller DDC.

The processor PRC may generate a control signal for executing an operation corresponding to a touch input based on the touch data obtained from the touch sensing unit 23.

The processor PRC may perform image correction for stretch compensation with respect to the input image data based on the stretch data obtained from the stretch sensing unit 25 and provide corrected image data to the display drive controller DDC.

Figure 12A:
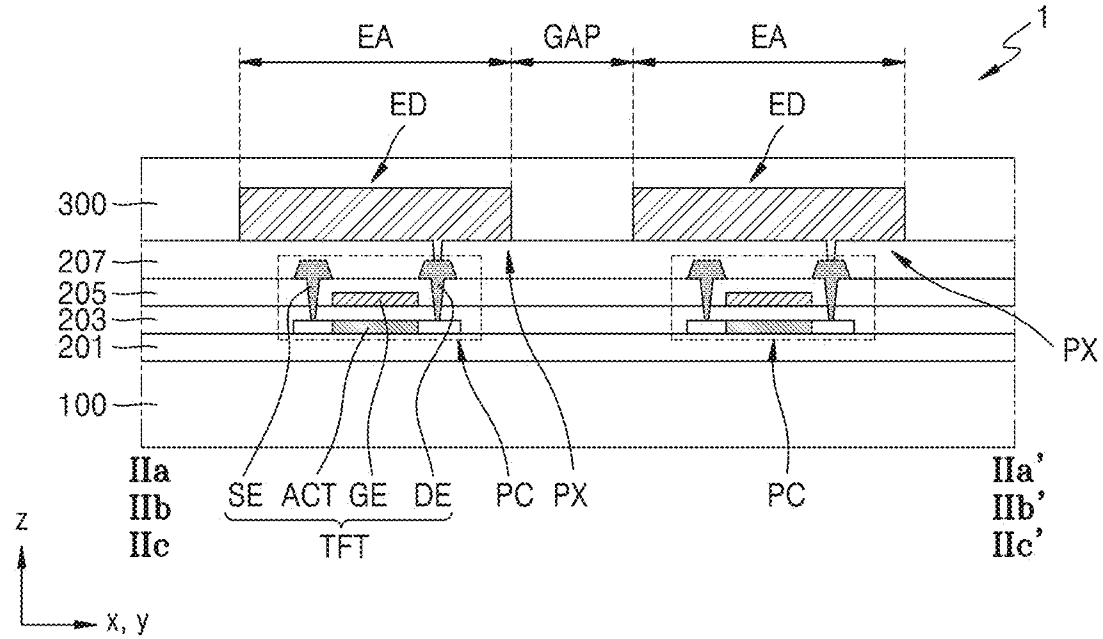
FIG. 12A is a schematic cross-sectional view illustrating a part of a display layer of a display device according to one or more embodiments.
Figure 12B:
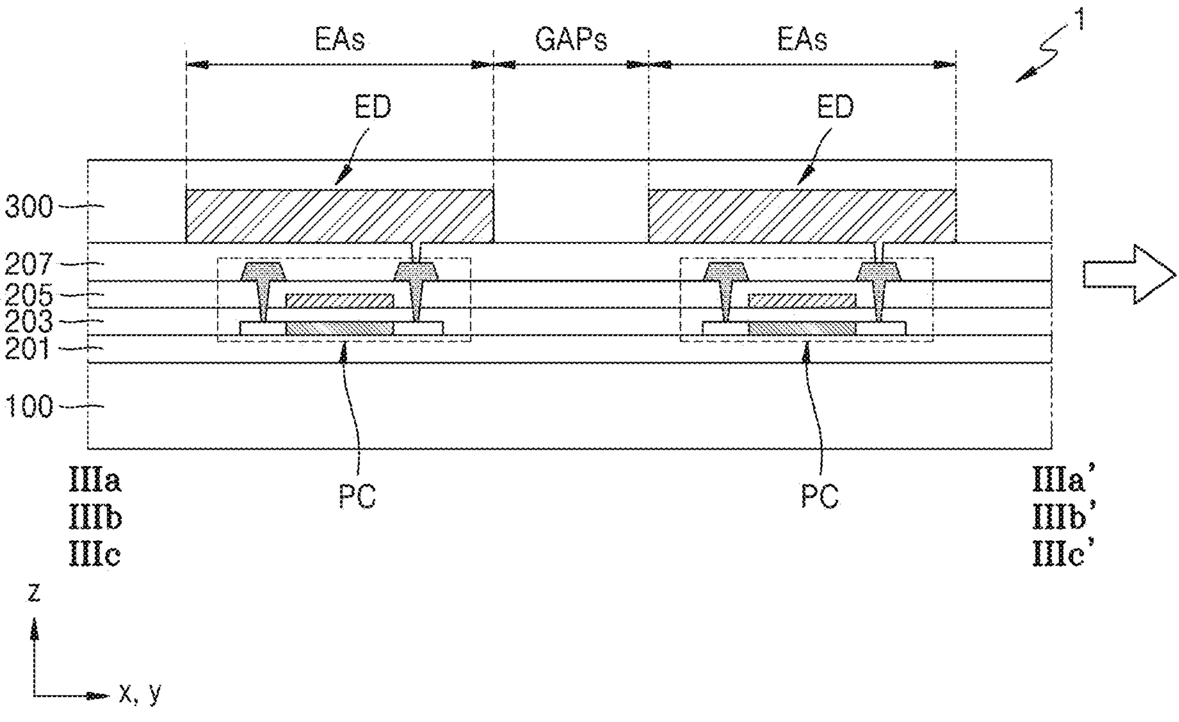
FIG. 12B is a schematic cross-sectional view illustrating the part of the display device illustrated in FIG. 12A, stretched in a certain direction.
Figure 13:
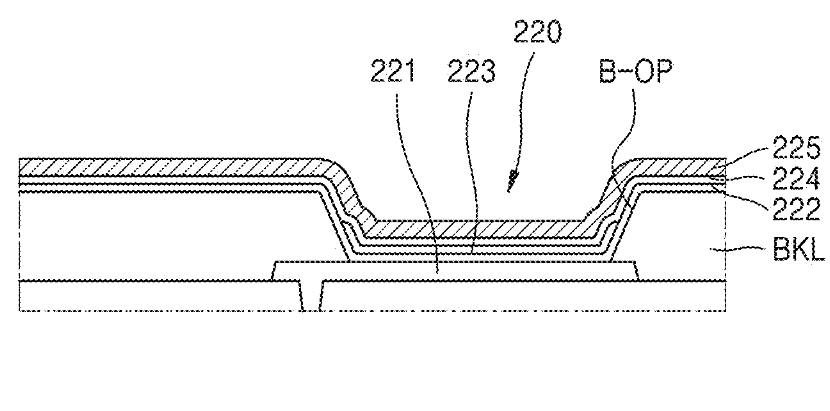
FIG. 13 is a schematic cross-sectional view of a light-emitting device illustrated in FIGS. 12A and 12B.

FIG. 12A is a schematic cross-sectional view illustrating a part of a display layer of a display device according to one or more embodiments. FIG. 12B is a schematic cross-sectional view illustrating the part of the display device illustrated in FIG. 12A, stretched in a certain direction. FIG. 13 is a schematic cross-sectional view of a light-emitting device illustrated in FIGS. 12A and 12B.

FIG. 12A is a cross-sectional view of the display area DA before elongation, which is taken along the lines IIa-IIa', IIb-IIb', and IIc-IIc' of FIGS. 7A-7C. FIG. 12B is a cross-sectional view of the display area DA after elongation, which is taken along lines IIIa-IIIa', IIIb-IIIb', and IIIc-IIIc' of FIGS. 7A-7C.

Referring to FIG. 12A, subpixels may be arranged on a substrate 100. The subpixel may include a pixel circuit PC and a light-emitting device ED electrically connected to the pixel circuit PC.

The substrate 100 may be a stretchable substrate that may be elongated or contracted in a certain direction. The substrate 100 may include a stretchable material, for example, stretchable polymer resin. In one or more embodiments, the substrate 100 may include an elastomer. The elastomer may include an organic elastomer, an inorganic elastomer, and/or a combination thereof. For example, the substrate 100 may include a silicon-based elastomer such as polydimethylsiloxane, a styrene-based elastomer, an olefin-based elastomer, polyurethane, and/or a mixture thereof. The substrate 100 may have a single-layer or multi-layer structure.

A first insulating layer 201 may be disposed on the substrate 100. The first insulating layer 201 may prevent or reduce penetration of impurities from the substrate 100 and provide a flat base surface to the pixel circuit PC disposed on the first insulating layer 201. The first insulating layer 201 may include an organic insulating material, an inorganic insulating material, or an organic and inorganic insulating material and may have a single-layer or multi-layer structure.

The pixel circuit PC may include a transistor TFT. The transistor TFT may include a semiconductor layer ACT, a gate electrode GE, a source electrode SE, and a drain electrode DE. The semiconductor layer ACT may include a channel area and impurity areas arranged on both sides of the channel area. At least one of the impurity areas arranged on both sides of the channel area may be a source area and the other one may be a drain area. The semiconductor layer ACT may include a semiconductor material and may be disposed on the first insulating layer 201. The semiconductor material may be a silicon-based semiconductor material, an oxide-based semiconductor material, a carbon nanotube, and/or an organic semiconductor material.

The silicon-based semiconductor material may include amorphous silicon and/or polysilicon. The oxide-based semiconductor material may include an oxide of at least one selected from indium (In), gallium (Ga), stannum (Sn), zirconium (Zr), vanadium (V), hafnium (Hf), cadmium (Cd), germanium (Ge), chromium (Cr), titanium (Ti), aluminum (Al), cesium (Cs), cerium (Ce), and/or zinc (Zn). The oxide-based semiconductor material may be In—Ga—Zn—O (IGZO), In—Sn—Zn—O (ITZO), and/or In—Ga—Sn—Zn—O (IGTZO), in which a metal such as indium (In), gallium (Ga), and/or stannum (Sn) is included in ZnO.

The organic semiconductor material may be a semiconductor low-molecular material and/or a semiconductor high-molecular material. For example, the organic semiconductor material may include pentacene, tetracene, anthracene, naphthalene, flullerene, α-6-thiophene, α-4-thiophene, oligo thiophene, perylene and derivatives thereof, rubrene and derivatives thereof, coronene and derivatives thereof, perylenetetra carboxylic diimide and derivatives thereof, perylene tetra carboxylic dianhydride and derivatives thereof, polythiophene and derivatives thereof, polyparaphenylenevinylene and derivatives thereof, polyparaphenylene and derivatives thereof, polyfluorene and derivatives thereof, polythiophenevinylene and derivatives thereof, polythiophene-heterocyclic aromatic copolymer and derivatives thereof, oligoacene of naphthalene and derivatives thereof, naphthalene tetra carboxylic acid diimide and derivatives thereof, oligothiophene of α-5-thiophene and derivatives thereof, metal-containing or non-metal-containing phthalocyanines and derivatives thereof, pyromellitic dianhydride and derivatives thereof, pyromellitic diimide and derivatives thereof, polyalkylthiophene, polythienylenevinylene, alkylfluorene unit, copolymer of alkylthiophene, diketopyrrolopyrrole and derivatives thereof, etc. However, this is only an example, and other organic semiconductor materials may be included in the semiconductor layer ACT. The semiconductor layer ACT may include a diketopyrrolopyrrole-based polymer, etc.

In one or more embodiments, the semiconductor layer ACT may include a complex layer in which a carbon nanotube, an organic semiconductor material, etc. are dispersed in polymer resin.

A second insulating layer 203 may be disposed on the semiconductor layer ACT and the first insulating layer 201. The second insulating layer 203 may include an insulating material and may have a single-layer or multi-layer structure. The second insulating layer 203 may include an organic insulating material, an inorganic insulating material, or an organic and inorganic insulating material and may have a single-layer or multi-layer structure.

The gate electrode GE may be disposed on the second insulating layer 203 and may overlap the channel area of the semiconductor layer ACT in the z-direction (e.g., a thickness direction of the substrate 100). The gate electrode GE may include a conductive material. The gate electrode GE may include a metal material such as molybdenum (Mo), aluminum (Al), copper (Cu), titanium (Ti), etc. In one or more embodiments, the gate electrode GE may include a conductive complex having a metallic nanostructure, etc. dispersed in polymer resin. The conductive complex may include an elastomer and may further include an additive, such as carbon nanotube, carbon fiber, graphene, graphene oxide, etc. to improve conductivity. In one or more embodiments, the gate electrode GE may include a liquid metal material such as an eutectic gallium-indium alloy. The gate electrode GE may have a single-layer or multi-layer structure.

A third insulating layer 205 may be disposed on the gate electrode GE and the second insulating layer 203. The third insulating layer 205 may include an organic insulating material, an inorganic insulating material, or an organic and inorganic insulating material and may have a single-layer or multi-layer structure.

The source electrode SE and the drain electrode DE may be arranged on the third insulating layer 205. In one or more embodiments, a part of the source electrode SE and the drain electrode DE may be omitted, and the thin-film transistor TFT may be connected to a neighboring thin-film transistor through the source area and the drain area. The source electrode SE and the drain electrode DE may include a conductive material such as a metal material, a conductive complex, and/or a liquid metal material, etc. The source electrode SE and the drain electrode DE may have a single-layer or multi-layer structure.

A fourth insulating layer 207 may be disposed on the source electrode SE and the drain electrode DE, and the third insulating layer 205. The fourth insulating layer 207 may provide a flat base surface to the light-emitting device ED disposed thereon. The fourth insulating layer 207 may include an organic insulating material and may have a single-layer or multi-layer structure.

The light-emitting device ED may be electrically connected to the pixel circuit PC through a contact hole penetrating the fourth insulating layer 207. An encapsulation layer 300 may be arranged to cover the light-emitting device ED on the fourth insulating layer 207. The encapsulation layer 300 may include polymer resin and/or may include an elastomer.

At least one of the first insulating layer 201, the second insulating layer 203, the third insulating layer 205, and the fourth insulating layer 207 may include an elastomer. The first insulating layer 201, the second insulating layer 203, the third insulating layer 205, and the fourth insulating layer 207 may include a silicon-based elastomer, a styrene-based elastomer, an olefin-based elastomer, polyurethane, and/or a mixture thereof.

As illustrated in FIG. 12B, layers constituting the pixel circuit PC and layers constituting the light-emitting device ED may have elasticity and may be elongated or contracted when the display device 1 is elongated or contracted. A gap GAPS between two adjacent to pixels PX after elongation may increase in an elongation direction and may be greater than a gap GAP between the two pixels PX before elongation. An area of an emission area EAs of each of elongated pixels PX may be greater than an area of an emission area EA of each of the pixels PX before elongation. A gap GAPs between two adjacent to pixels PX after contraction may decrease in a contraction direction and may be less than a gap GAP between the two pixels PX before contraction. An area of an emission area EAs of each of contracted pixels PX may be less than an area of an emission area EA of each of the pixels PX before contraction. In one or more embodiments, as illustrated in FIG. 7C, when the pixels PX have different stretch degrees from each other, areas of the emission areas EAs thereof may also be different from each other.

Referring to FIG. 13, in one or more embodiments, the light-emitting device ED may be an organic light-emitting diode 220 including an organic material. The organic light-emitting diode 220 may include a first electrode 221 arranged on an insulating layer (for example, the fourth insulating layer 207), a second electrode 225 facing the first electrode 221, and an emission layer 223 arranged between the first electrode 221 and the second electrode 225. A first functional layer 222 may be arranged between the first electrode 221 and the emission layer 223, and a second functional layer 224 may be arranged between the emission layer 223 and the second electrode 225.

An edge of the first electrode 221 may be covered by a bank layer BKL including an insulating material. The bank layer BKL may include an opening B—OP partially overlapping the first electrode 221.

The first electrode 221 may include a conductive oxide such as an indium tin oxide (ITO), an indium zinc oxide (IZO), a zinc oxide (ZnO), an indium oxide (In2O3), an indium gallium oxide (IGO), or an aluminum zinc oxide (AZO). In another embodiment, the first electrode 221 may include a reflective layer including silver (Ag), magnesium (Mg), aluminum (Al), platinum (Pt), palladium (Pd), gold (Au), nickel (Ni), neodymium (Nd), iridium (Ir), chrome (Cr), and/or a compound thereof. In one or more embodiments, the first electrode 221 may further include a layer including ITO, IZO, ZnO, AZO, or $In_2O_3$ on/under the reflective layer.

The emission layer 223 may include a high-molecular and/or low-molecular organic material emitting light of a certain color. The first functional layer 222 may include a hole transport layer and/or a hole injection layer. The second functional layer 224 may include an electron transport layer and/or an electron injection layer.

The second electrode 225 may include a conductive material having a low work function. For example, the second electrode 225 may include a (semi) transparent layer including silver (Ag), magnesium (Mg), aluminum (Al), platinum (Pt), palladium (Pd), gold (Au), nickel (Ni), neodymium (Nd), iridium (Ir), chrome (Cr), lithium (Li), calcium (Ca), and/or an alloy thereof. Alternatively, the second electrode 225 may further include a layer including ITO, IZO, ZnO, AZO, and/or In2O3 on/under the (semi) transparent layer including the above material.

Hereinafter, an image correction method by the touch sensing unit 23, the stretch sensing unit 25, and the processor PRC is described in detail.

Figure 14:
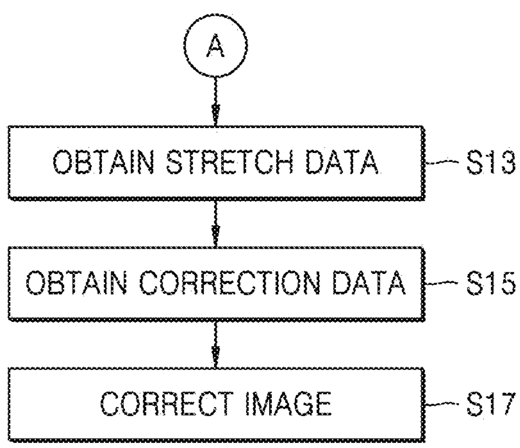
FIGS. 14, 15A and 15B are each a flowchart illustrating an image correction method by a display device according to one or more embodiments.
Figure 15A:
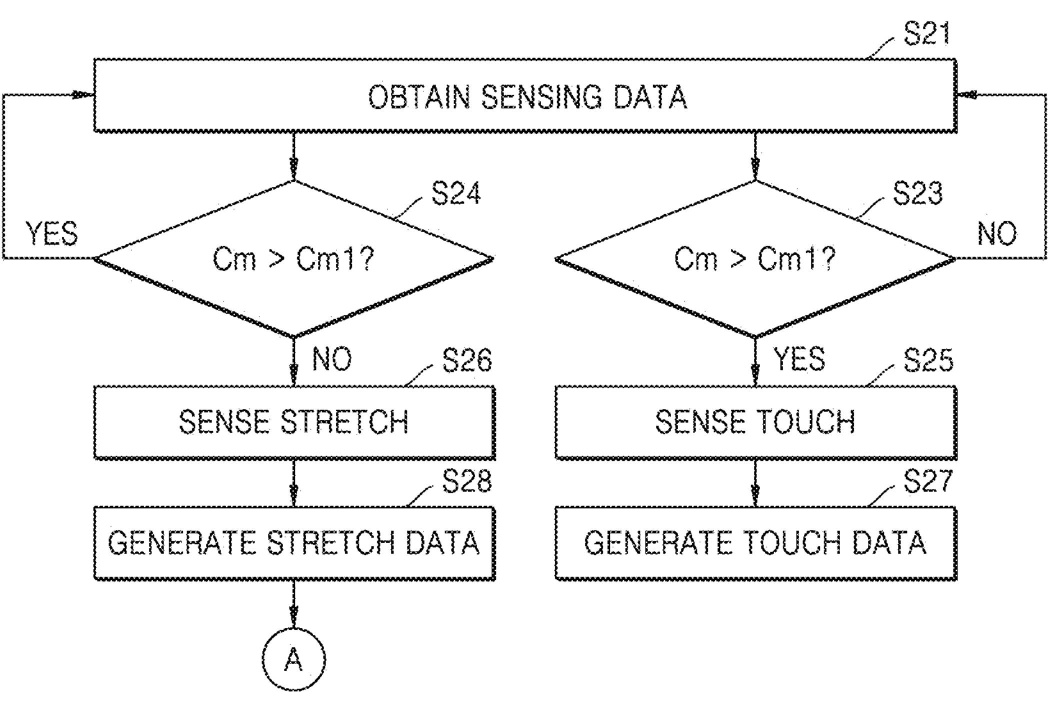
Figure 15B:
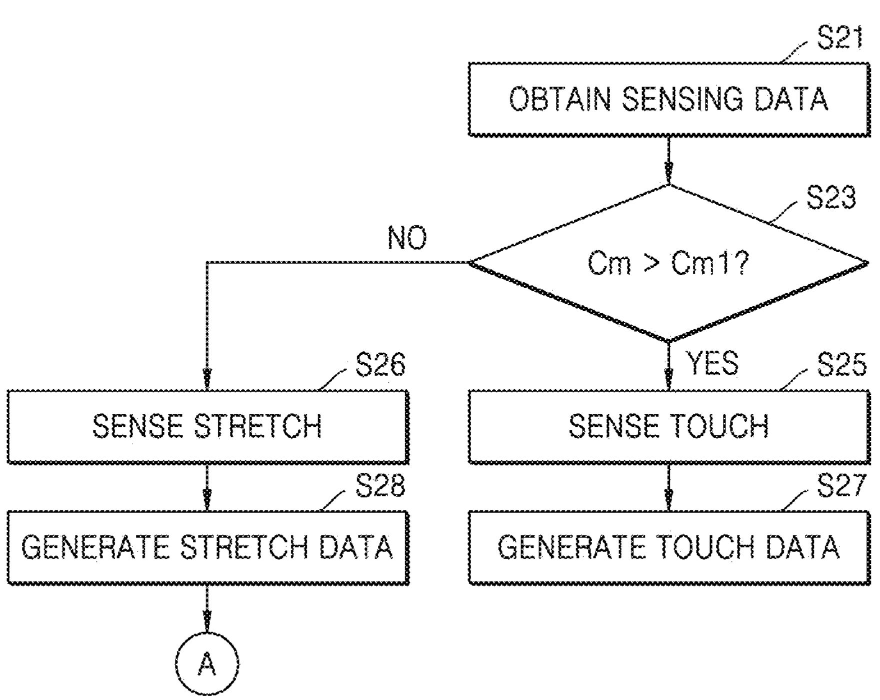
Figure 16:
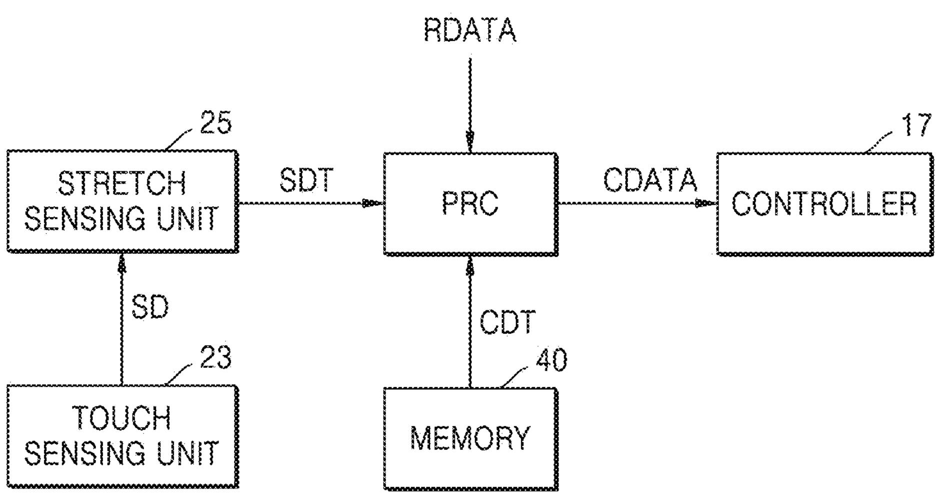
FIG. 16 is a schematic view illustrating a processor and components connected to the processor, according to one or more embodiments.
Figure 17:
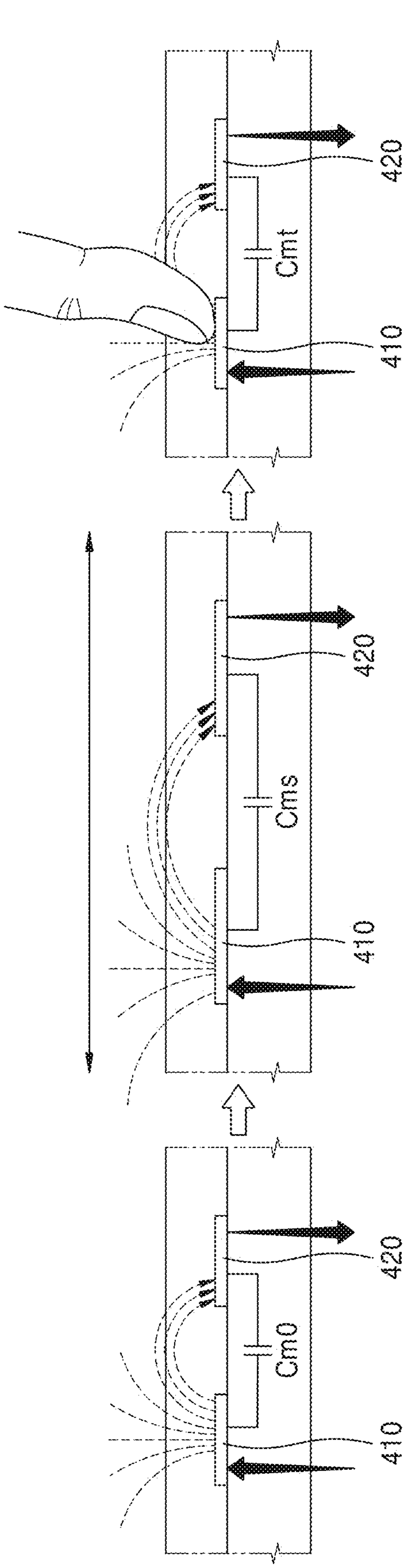
FIG. 17 is a schematic cross-sectional view illustrating a capacitance change due to a touch and stretching of a strain sensor, according to one or more embodiments.
Figure 18:
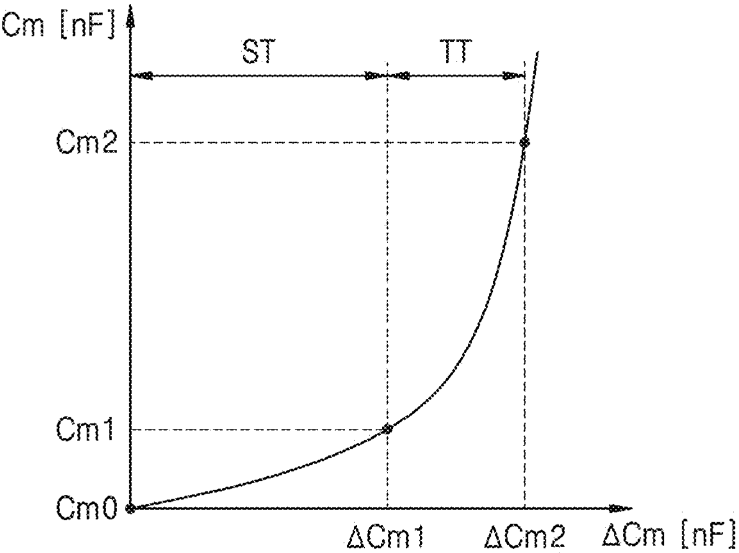
FIG. 18 is a graph schematically showing a capacitance change due to a touch and stretching of a strain sensor, according to one or more embodiments.
Figure 20:
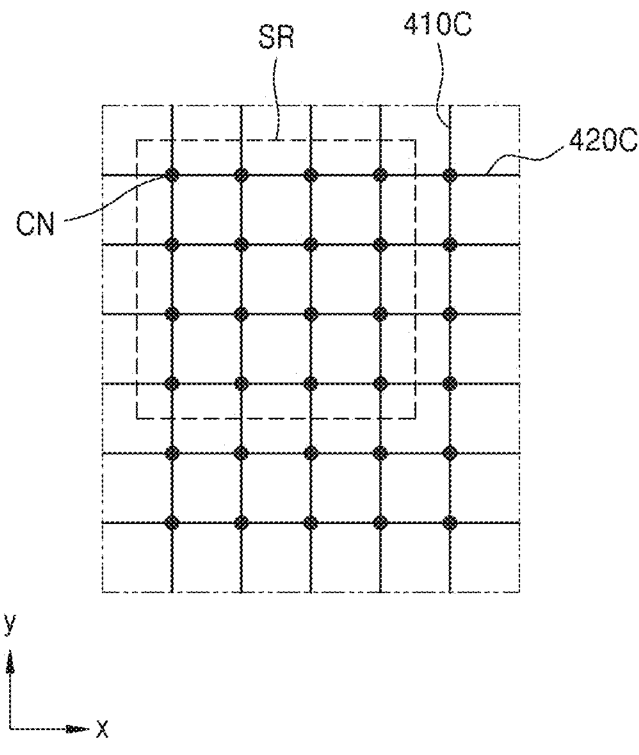
FIG. 20 is a schematic view illustrating a stretch location and stretch range according to one or more embodiments.
Figure 22:
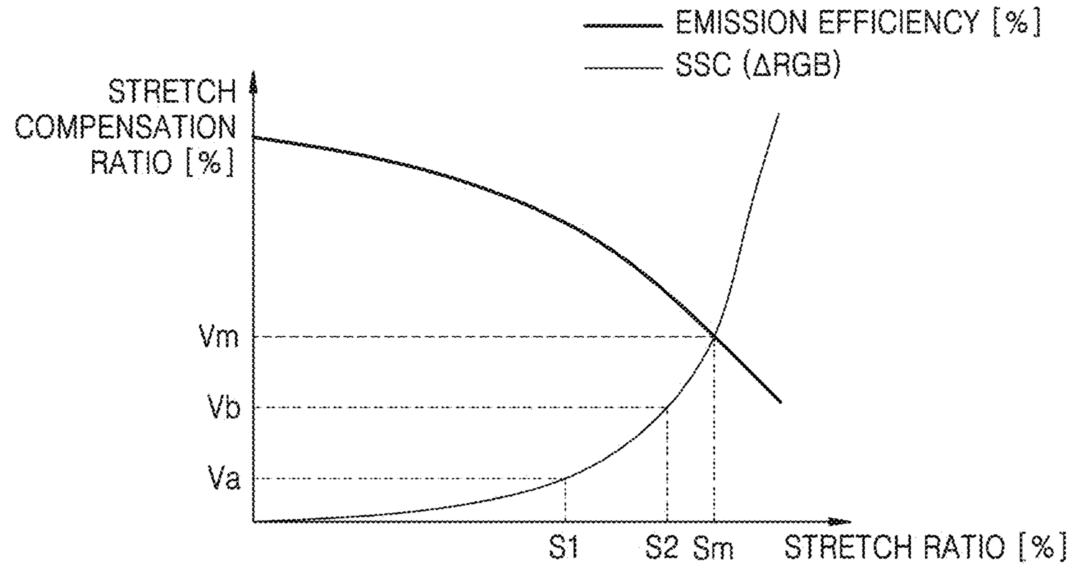
FIG. 22 is a diagram showing a stretch compensation curve corresponding to a lookup table of correction data according to a stretch ratio, according to one or more embodiments.

FIGS. 14, 15A and 15B are each a flowchart illustrating an image correction method by a display device according to one or more embodiments. FIG. 16 is a schematic view illustrating a processor and components connected to the processor, according to one or more embodiments. FIG. 17 is a schematic cross-sectional view illustrating a capacitance change due to a touch and stretching of a strain sensor, according to one or more embodiments. FIG. 18 is a graph schematically showing a capacitance change due to a touch and stretching of a strain sensor, according to one or more embodiments. FIG. 19 is a schematic view illustrating a lookup table of stretch ratio according to a capacitance change, according to one or more embodiments. FIG. 20 is a schematic view illustrating a stretch location and stretch range according to one or more embodiments. FIG. 21 is a schematic view illustrating a lookup table of stretch ratio and correction data according to a capacitance change, according to one or more embodiments. FIG. 22 is a diagram showing a stretch compensation curve corresponding to a lookup table of correction data according to a stretch ratio, according to one or more embodiments.

FIG. 14 is a flowchart schematically showing image correction by the processor PRC. FIGS. 15A and 15B are each a flowchart schematically showing operations of the sensor driving controller SDC. Referring to FIG. 14, the processor PRC may obtain stretch data from the stretch sensing unit 25 (S13), obtain correction data based on the stretch data (S15), and correct an image based on the correction data (S17). The processor PRC may perform image correction for stretch compensation with respect to the input image data based on the stretch data obtained from the stretch sensing unit 25 and provide corrected image data to the display drive controller DDC.

In one or more embodiments, as illustrated in FIGS. 15A and 16, the touch sensing unit 23 may sense the strain sensor SS according a certain frequency and obtain sensing data SD (S21). The touch sensing unit 23 may apply a driving signal of an alternating current (AC) to the first sensing electrodes 410 through the first signal lines SL1 and may sense a change amount of the capacitance Cm from a change amount of a current and/or a voltage of the second sensing electrodes 420 through the second signal lines SL2. The touch sensing unit 23 may obtain the change amount of the capacitance Cm as the sensing data SD. The touch sensing unit 23 may provide all of the obtained sensing data SD to the stretch sensing unit 25 or may provide some of the obtained sensing data SD to the stretch sensing unit 25 according to a preset cycle.

The touch sensing unit 23 may calculate the capacitance Cm from the change amount of the capacitance Cm and compare the capacitance Cm with a reference capacitance Cm1 (S23). When the capacitance Cm is greater than the reference capacitance Cm1, the touch sensing unit 23 may determine that a touch is sensed (S25) and may generate touch data based on the sensing data SD (S27). The reference capacitance Cm1 may be the capacitance Cm sensed from the strain sensor SS when the display device 1 is stretched at a maximum stretch ratio Sm (FIG. 19). The touch data may include a touch location and a touch range. The touch sensing unit 23 may provide the touch data to the processor PRC. Known various detection methods may be applied for the detection of a touch location by the touch sensing unit 23.

The stretch sensing unit 25 may calculate the capacitance Cm from the change amount of the capacitance Cm received from the touch sensing unit 23 and may compare the capacitance Cm with the reference capacitance Cm1 (S24). When the capacitance Cm is less than or equal to the reference capacitance Cm1, the stretch sensing unit 25 may determine that a stretch is sensed (S26). When a stretch is sensed, the stretch sensing unit 25 may generate stretch data SDT based on the sensing data SD (S28). The stretch data SDT may include a stretch location, a stretch range, and a stretch ratio. The stretch sensing unit 25 may provide the stretch data SDT to the processor PRC.

In one or more embodiments, as illustrated in FIG. 15B, when the capacitance Cm is greater than the reference capacitance Cm1, the touch sensing unit 23 may determine that a touch is sensed (S25) and generate touch data from the sensing data SD (S27). When the capacitance Cm is less than or equal to the reference capacitance Cm1, the touch sensing unit 23 may determine that a stretch is sensed and transmit the sensing data SD sensed as a stretch to the stretch sensing unit 25 (S26). The stretch sensing unit 25 may generate the stretch data SDT based on the sensing data SD (S28). The embodiment of FIG. 15B illustrates that the touch sensing unit 23 transmits the sensing data SD to the stretch sensing unit 25 only when the touch sensing unit 23 has sensed a stretch.

FIG. 17 shows a capacitance Cm0 formed between the first sensing electrodes 410 and the second sensing electrodes 420 when there is no touch and stretch (hereinafter, referred to as the "initial capacitance"), a capacitance Cms formed between the first sensing electrodes 410 and the second sensing electrodes 420 after stretching (for example, elongation) (hereinafter, referred to as the "stretch capacitance"), and a capacitance Cmt formed between the first sensing electrodes 410 and the second sensing electrodes 420 when there is a touch (hereinafter, referred to as the "touch capacitance"). The touch capacitance Cmt may be greater than the initial capacitance Cm0 and the stretch capacitance Cms. The stretch capacitance Cms may be greater than the initial capacitance Cm0.

FIG. 18 schematically shows a relation between the capacitance Cm and a capacitance change amount ΔCm. FIG. 18 shows a first capacitance change amount ΔCm1 corresponding to the reference capacitance Cm1 and a second capacitance change amount ΔCm2 corresponding to a maximum capacitance Cm2.

When the capacitance change amount ΔCm is within a section ST between a change amount corresponding to the initial capacitance Cm0 (for example, 0) and the first capacitance change amount ΔCm1, it may be determined that there is a capacitance change due to stretching. The capacitance change amount ΔCm may be proportional to a stretch degree. For example, the greater the capacitance change amount ΔCm is, the higher the stretch degree may be. When the stretch degree increases, the stretch ratio may increase as well.

When the capacitance change amount ΔCm is within a section TT between the first capacitance change amount ΔCm1 and the second capacitance change amount ΔCm2, it may be determined that there is a capacitance change due to a touch. The capacitance change amount ΔCm may also be proportional to a touch intensity.

The stretch sensing unit 25 may obtain a stretch ratio corresponding to the capacitance change amount ΔCm from the lookup table stored in the memory 27. Referring to FIG. 19, the memory 27 may store a stretch ratio corresponding to the capacitance change amount ΔCm.

The stretch sensing unit 25 may detect a stretch location and a stretch range.

As illustrated in the coordinate map of FIG. 20, at a node CN at which a column 410C of the first sensing electrodes 410 of the strain sensor SS and a column 420C of the second sensing electrodes 420 cross each other, the capacitance Cm may be generated by the first sensing electrode 410 and the second sensing electrode 420. The coordinate of each node CN may be a touch coordinate (e.g., a touch location) and a stretch coordinate (e.g., a stretch location).

The stretch sensing unit 25 may determine an area including a location having a maximum capacitance change amount ΔCm due to stretching and a location having a minimum capacitance change amount ΔCm as a stretch range SR. The stretch range SR may be a part or all of the display area DA. Although FIG. 20 illustrates one square stretch range SR, one or more stretch ranges SR may be determined within the display area DA, and each stretch range SR may be determined in various shapes according to a stretch location.

The processor PRC may perform image correction for input image data RDATA based on the stretch data SDT obtained from the stretch sensing unit 25 and the correction data CDT obtained from a memory 40 and compensate for the stretching of the image data. The processor PRC may determine the correction data CDT corresponding to a gradation (gray scale or gray level) of the input image data RDATA and output corrected image data CDATA by applying the correction data CDT to the input image data RDATA according to an equation (1) below. The input image data RDATA and the corrected image data CDATA may be RGB data for each pixel.

$$CDATA = RDATA \times CDT \tag{1}$$

The processor PRC may determine the correction data CDT based on the lookup table in the memory 40. The processor PRC may obtain the correction data CDT for each pixel in the display area DA corresponding to a stretch location and a stretch range from the lookup table. In one or more embodiments, a stretch location and a stretch range may correspond to at least one pixel in the display area DA.

For example, in FIG. 20, the stretch range SR includes 16 stretch coordinates, and a plurality of pixels may correspond to each stretch coordinate. The plurality of pixels corresponding to the stretch coordinate may be corrected by applying the same stretch ratio. In one or more embodiments, in the coordinate map, a plurality of cells may be defined based on a coordinate, and a plurality of pixels corresponding to each cell may be the pixels corresponding to each stretch coordinate.

The memory 40 may be a non-volatile memory. In one or more embodiments, the non-volatile memory may be a flash memory. The memory 40 may store the correction data CDT for each gray scale corresponding to a stretch ratio.

In one or more embodiments, the correction data CDT may be generated in the inspection process for the display device 1 and may be stored in the memory 40. For example, in the inspection process, luminance distribution data of the display panel DP may be calculated for each stretch stage. The correction data CDT may be generated based on the luminance distribution data and may be written onto the memory 40.

In one or more embodiments, the correction data CDT may be generated based on the emission efficiency. The emission efficiency may be defined by the luminance reduction ratio according to a stretch degree (e.g., a stretch ratio). The correction data CDT may be an efficiency gain calculated based on the emission efficiency. The efficiency gain may be generated by a function (F) having at least one of a efficiency change of a light-emitting device ($\Delta$EV), a characteristic change of a thin-film transistor ($\Delta$TFT), and an emission area ratio ($\Delta$EA) as a variable and/or a parameter. In one or more embodiments, when the stretch ratio is Si, the efficiency gain (EG(Si)) may be generated by the function (F) having the emission area ratio ($\Delta$EA) as a variable and/or a parameter as represented by an equation (2) below. In one or more embodiments, when the stretch ratio is Si, the efficiency gain (EG(Si)) may be generated by the function (F) having the efficiency change of a light-emitting device ($\Delta$EV), the characteristic change of a thin-film transistor ($\Delta$TFT), and the emission area ratio ($\Delta$EA) as a variable and/or a parameter as represented by an equation (3) below. The emission area ratio may refer to a luminance change per unit area.

$$EG(Si) = F(\Delta EA)(Si) \tag{2}$$

$$EG(Si) = F(\Delta EV, \Delta TFT, \Delta EA)(Si) \tag{3}$$

As illustrated in FIG. 21, the memory 40 may store a plurality of lookup tables showing relations between reference stretch ratios and correction data for each gray scale. The reference stretch ratios may be a certain number of stretch ratios determined between preset minimum and maximum stretch ratios. In one or more embodiments, the correction data may be a compensation ratio (e.g., a stretch compensation ratio) for conversion of input RGB data into output RGB data. For example, a stretch compensation ratio of a first gray scale for each subpixel corresponding to a first stretch ratio, a stretch ratio of a second gray scale, etc. may be stored in the memory 40 as a lookup table.

The processor PRC may convert input data input in the unit of frames into a gray scale (e.g., a gray scale value) for each pixel. The processor PRC may obtain the correction data CDT of a gradation corresponding to image data of each of subpixels constituting a pixel. For example, when the pixel PX includes the red pixel PXr, the green pixel PXg, and the blue pixel PXb, the processor PRC may obtain correction data CDT of a gradation corresponding to each of image data of the red pixel PXr (R data), image data of the green pixel PXg (G data), and image data of the blue pixel PXb (B data) of each pixel PX. For example, when the display gradation is divided by 256 levels, the processor PRC may convert the input RGB data for each pixel into one gradation of the 256 levels and obtain a stretch compensation ratio corresponding to a stretch ratio and a gradation from a lookup table.

The processor PRC may calculate the stretch compensation ratio corresponding a stretch ratio between two stretch ratios by interpolation. FIG. 22 illustrates a stretch compensation curve SSC generated based on a stretch ratio and a stretch compensation ratio of a lookup table. For example, a stretch compensation ratio corresponding to a stretch ratio between a first stretch ratio S1 and a second stretch ratio S2 may be calculated by the interpolation between a stretch compensation ratio Va corresponding to the first stretch ratio S1 and a stretch compensation ratio Vb corresponding to the second stretch ratio S2.

When the stretch ratio of the display device 1 increases, the emission efficiency of the display device 1 may decrease. A maximum stretch ratio Sm of the display device 1 may be determined by the emission efficiency of the display device 1.

The processor PRC may obtain the corrected image data CDATA by applying the stretch compensation ratio to the image data input in the unit of image frames, for example, each of RGB data. For example, referring to FIG. 22, when the display device 1 is stretched (for example, elongated) in a certain direction at the first stretch ratio S1, the processor PRC may correct RGB values of the image data by applying the stretch compensation ratio Va to the image data for each pixel of the display area DA.

Figure 23:
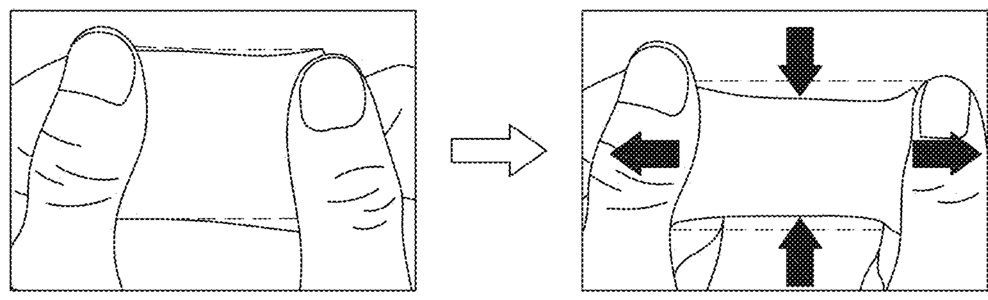
FIG. 23 is a diagram illustrating stretching of a display device in a certain direction according to one or more embodiments.
Figure 24A:
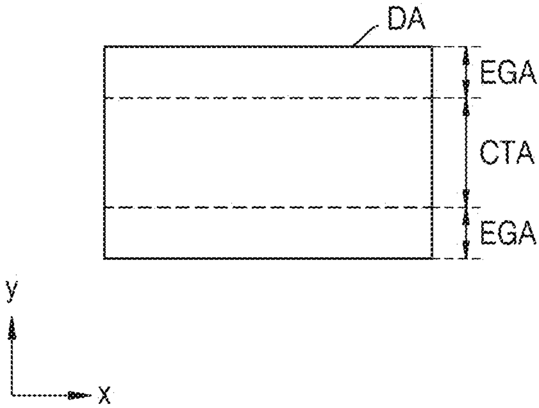
FIGS. 24A-24C are each a diagram illustrating a center area and an edge area of a display area.
Figure 24B:
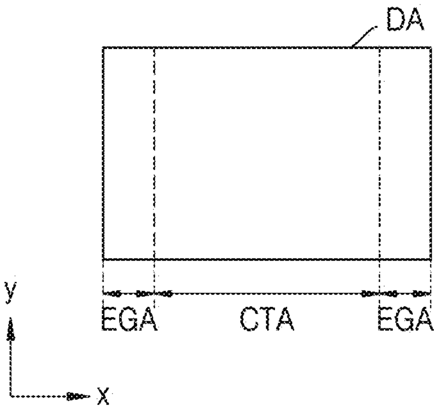
Figure 24C:
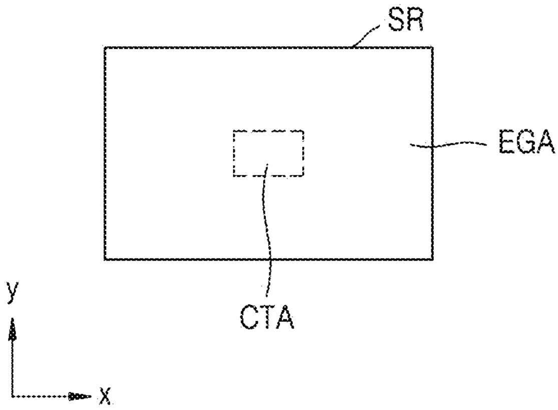
Figure 25:
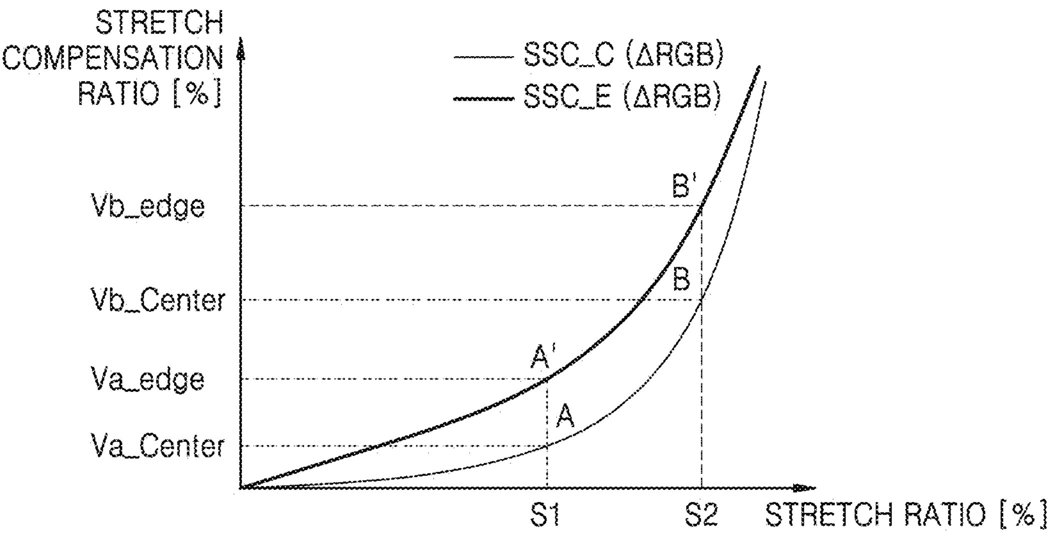
FIG. 25 is a diagram showing a stretch compensation curve applied to each of a center area and an edge area of a display area.

FIG. 23 is a diagram illustrating stretching of a display device in a certain direction according to one or more embodiments. FIGS. 24A-24C are each a diagram illustrating the center area CTA and the edge area EGA of the display area DA. FIG. 25 is a diagram showing a stretch compensation curve SSC (e.g., SSC_E and SSC_C) applied to each of the center area CTA and the edge area EGA of the display area DA.

In one or more embodiments, the processor PRC may receive a stretch ratio for each stretch location from the stretch sensing unit 25. The processor PRC may determine a stretch ratio of pixels corresponding to each stretch location for an image input in the unit of frames. The processor PRC may compare a difference between stretch ratios of pixels of the display area DA with a threshold value in the unit of frames and determine that the display area DA is stretched at the same stretch ratio when the difference between the stretch ratios is within the threshold value.

As illustrated in FIG. 23, when the display area DA is stretched (for example, elongated) in a certain direction (for example, the first direction and/or second direction) at the first stretch ratio S1, in the display area DA, a stretch ratio of the center area CTA may not be completely identical to a stretch ratio of the edge area EGA as illustrated in FIGS. 24A and 24B.

In one or more embodiments, when a difference between the stretch ratio of the center area CTA and the stretch ratio of the edge area EGA is within a threshold value, the processor PRC may determine that the center area CTA and the edge area EGA are stretched at the same stretch ratio. The processor PRC may determine the stretch ratio of the center area CTA or the stretch ratio of the edge area EGA as the stretch ratio of the display area DA. In one or more other embodiments, the processor PRC may determine an average of the stretch ratio of the center area CTA and the stretch ratio of the edge area EGA as the stretch ratio of the display area DA.

In one or more embodiments, the processor PRC may correct image data by applying the stretch compensation curve SSC for each area based on each of a lookup table applied to the center area CTA and a lookup table applied to the edge area EGA of the display area DA, as illustrated in FIG. 25. For example, when the first stretch ratio S1 is determined as the stretch ratio of the entire display area DA, as illustrated in FIGS. 24A and 24B, the processor PRC may apply a stretch compensation ratio Va_Center to the pixels of the center area CTA according to a center stretch compensation curve SSC_C and apply a stretch compensation ratio Va_edge to the pixels of the edge area EGA according to an edge stretch compensation curve SSC_E, according to a stretch direction.

In one or more embodiments, as illustrated in FIGS. 2E and 7C, when a part of the display area DA is stretched (for example, elongated) in the z direction (e.g., the third direction) at the first stretch ratio S1, the processor PRC may apply the stretch compensation ratio Va_Center to the pixels of the center area CTA within the stretch range SR illustrated in FIG. 24C according to the center stretch compensation curve SSC_C and apply the stretch compensation ratio Va_edge to the pixels of the edge area EGA according to the edge stretch compensation curve SSC_E. In one or more embodiments, as illustrated in FIGS. 2E and 7C, when a part of the display area DA is stretched (for example, elongated) in the z direction (e.g., the third direction) at the second stretch ratio S2, the processor PRC may apply the stretch compensation ratio Vb_Center to the pixels of the center area CTA within the stretch range SR illustrated in FIG. 24C according to the center stretch compensation curve SSC_C and apply the stretch compensation ratio Vb_edge to the pixels of the edge area EGA according to the edge stretch compensation curve SSC_E.

The memory 40 may store, for example, each of a lookup table applied to the center area CTA of the display area DA and a lookup table applied to the edge area EGA of the display area DA.

According to the aforementioned embodiments, the processor PRC may periodically determine a real-time stretch ratio to check a stretch state and apply a stretch compensation ratio corresponding to the stretch ratio to image data to perform stretch compensation. The correction data based on a stretch compensation ratio may be synchronized with a vertical synchronizing signal V_sync of the image data and may be applied in the unit of frames. Values of the correction data may apply differently according to stretch information considering a recognized image quality.

Figure 26:
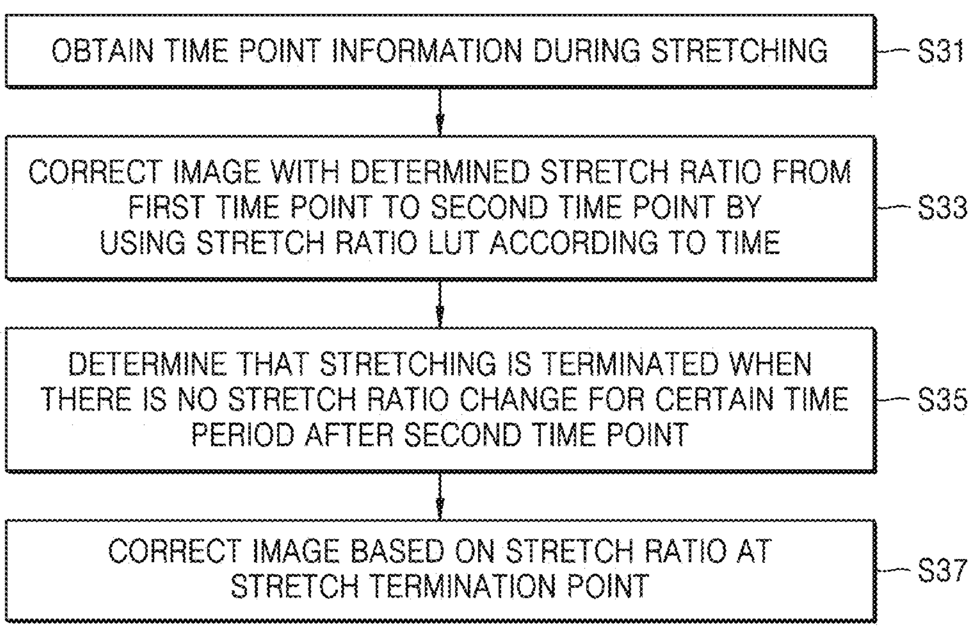
FIG. 26 is a flowchart illustrating a method of determining a stretch ratio according to stretch time, according to one or more embodiments.
Figure 27:
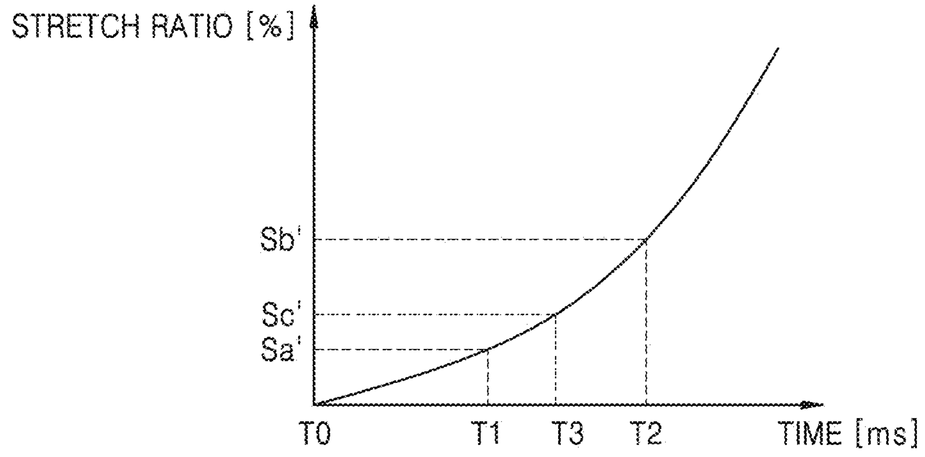
FIG. 27 is a schematic diagram illustrating a stretch ratio according to stretch time, according to one or more embodiments.

FIG. 26 is a schematic view illustrating a method of determining a stretch ratio according to stretch time, according to one or more embodiments. FIG. 27 is a schematic diagram illustrating a stretch ratio according to stretch time, according to one or more embodiments. FIG. 27 illustrates a stretch curve based on a lookup table of stretch ratio according to stretch time.

In one or more embodiments, the processor PRC may determine a stretch ratio between two time points at regular or irregular intervals and apply a stretch compensation ratio corresponding to the stretch ratio to image data to perform stretch compensation.

Referring to FIG. 26, the processor PRC may obtain information about at least two time points during stretching of the display device 1 (S31). In one or more embodiments, the processor PRC may measure two time points during the stretching in the unit of milliseconds, for example, a first time point T1 and a second time point T2. The second time point T2 may be a time point after the first time point T1. Known various methods such as a clock counting method, etc. may be used as a time measurement method. In an embodiment, the first time point T1 and the second time point T2 may be predetermined. The first time point T1 and the second time point T2 may be set based on time generally required for stretching in an inspection process. For example, the second time point T2 may be a time point having a maximum stretch ratio value or a time point having a median stretch ratio value.

The processor PRC may correct an image according to a stretch ratio obtained at the first time point T1 based on a lookup table from the first time point T1 to the second time point T2 (S33). For example, the processor PRC may obtain a first stretch ratio Sa' corresponding to the first time point T1 from the lookup table and determine the first stretch ratio Sa' as a stretch ratio of the display device 1 form the first time point T1 until the second time point T2 are measured.

When a stretch ratio obtained from the stretch sensing unit 25 after the second time point T2 does not change for a certain time period, the processor PRC may determine that stretching is terminated (S35).

The processor PRC may perform image correction based on a stretch ratio obtained at a time point when termination of stretching is determined (S37). In one or more embodiments, a stretch ratio obtained at the second time point T2 may be a stretch ratio obtained at a time point when termination of stretching is determined.

In one or more embodiments, the processor PRC may determine a stretch ratio at certain periods between the first time point T1 and the second time point T2 and correct an image during the stretching. According to a period, the stretch ratio may be determined at two or more times points at certain intervals between the first time point T1 and the second time point T2. The processor PRC may determine a stretch ratio at two or more time points between the first time point T1 and the second time point T2 by the interpolation of the first stretch ratio Sa' at the first time point T1 and the second stretch ratio Sb' at the second time point T2.

In one or more embodiments, the processor PRC may set at least one time point at certain intervals between the first time point T1 and the second time point T2 and correct an image during stretching. For example, as illustrated in FIG. 27, the processor PRC may set a third time point T3 between the first time point T1 and the second time point T2, determine the first stretch ratio Sa' obtained at the first time point T1 as a stretch ratio of the display device 1 from the first time point T1 to the third time point T3, and determine a third stretch ratio Sc' corresponding to the third time point T3 as a stretch ratio of the display device 1 from the third time point T3 until the second time point T2 is measured. The processor PRC may determine the third stretch ratio Sc' at the third time point T3 by the interpolation of the first stretch ratio Sa' at the first time point T1 and the second stretch ratio Sb' at the second time point T2. A time gap between the first time point T1 and the third time point T3 may be different from a time gap between the third time point T3 and the second time point T2.

The memory 40 may store a lookup table of stretch ratio according to stretch time. The processor PRC may obtain the first stretch Sa' at the first time point T1 and the second stretch ratio Sb' at the second time point T2 from the lookup table of stretch ratio according to stretch time, and determine the third stretch ratio Sc' at the third time point T3 by interpolation. The lookup table of stretch ratio according to stretch time may be generated in consideration of average stretch time according to a stretch degree in an inspection process of the display device 1. The aforementioned embodiments describe image correction by stretch compensation in a display device to which a capacitive strain sensor is applied; however, the present disclosure is not limited thereto. For example, image correction by stretch compensation may also be performed in a display device to which a resistive strain sensor is applied. Hereinafter, embodiments are described focusing on the difference with the display device 1.

Figure 28:
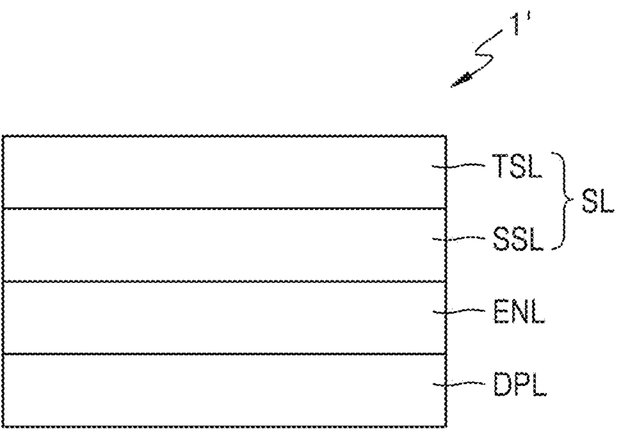
FIG. 28 is a schematic cross-sectional view of a display device according to one or more embodiments.

FIG. 28 is a schematic cross-sectional view of a display device according to one or more embodiments.

Referring to FIG. 28, a display device 1' may include a sensor layer SL, and the sensor layer SL may include a strain sensor layer SSL and a touch sensor layer TSL. For example, the display device 1' may include the display layer DPL, the encapsulation layer ENL, the strain sensor layer SSL, and the touch sensor layer TSL. An optical functional layer OFL (FIGS. 3A and 3B) may be arranged on the touch sensor layer TSL.

The strain sensor layer SSL may be arranged under the touch sensor layer TSL as illustrated in FIG. 28. The strain sensor layer SSL may include a strain sensor. The strain sensor layer SSL may be formed directly on the encapsulation layer ENL. In one or more embodiments, the strain sensor layer SSL may be formed separately on a stretch substrate and then may be coupled onto the encapsulation layer ENL through an adhesive layer, such as an optical clear adhesive (OCA). In one or more embodiments, the strain sensor layer SSL may be disposed on the touch sensor layer TSL.

In one or more embodiments, the strain sensor layer SSL may be formed directly on or under the touch sensor layer TSL provided separately from the display layer DPL, and the touch sensor layer TSL may be a member having functions of a touch sensor and a stretch sensor and may be combined with the display layer DPL.

Figure 29:
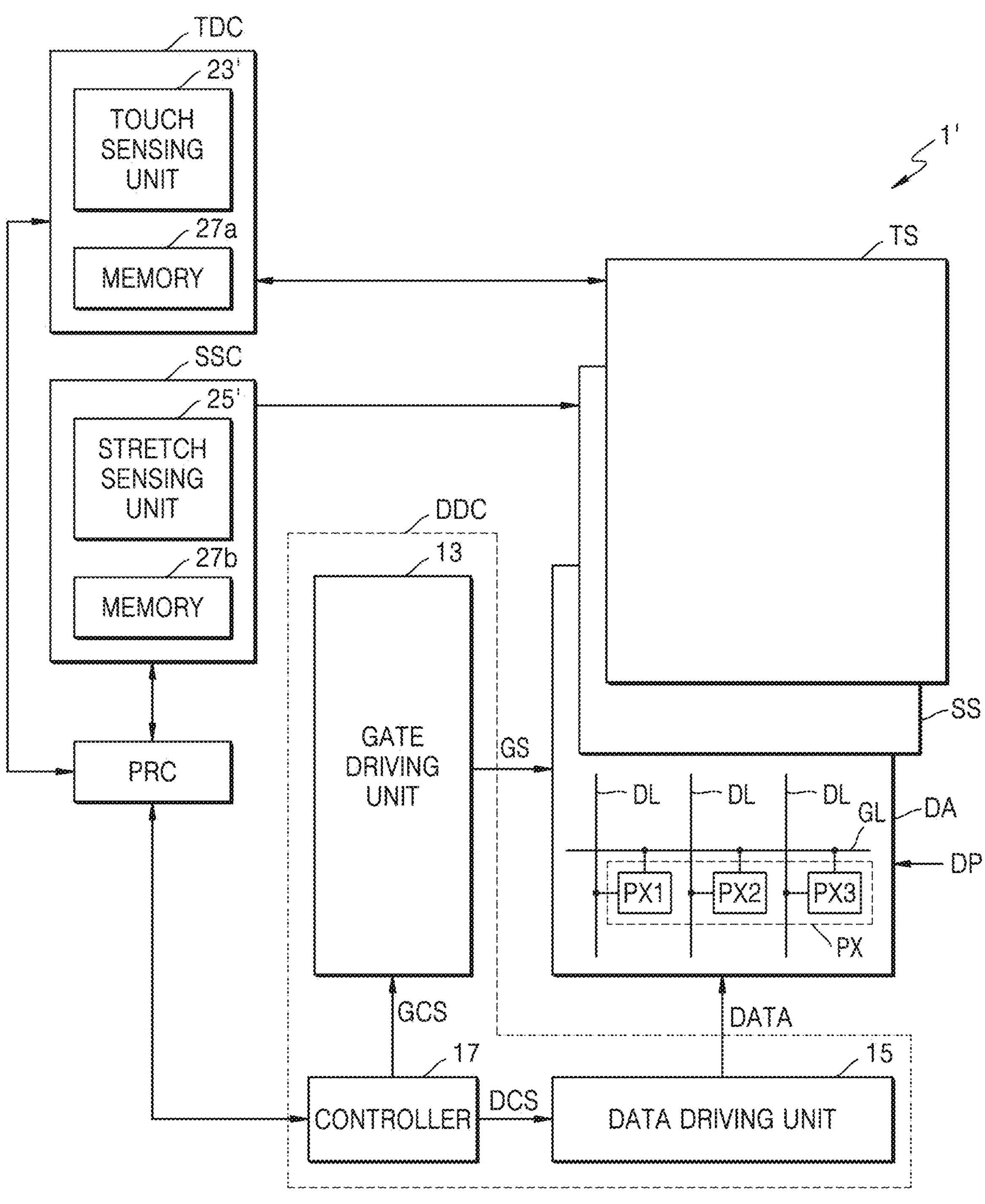
FIG. 29 is a schematic view of a display device according to one or more embodiments.
Figure 30A:
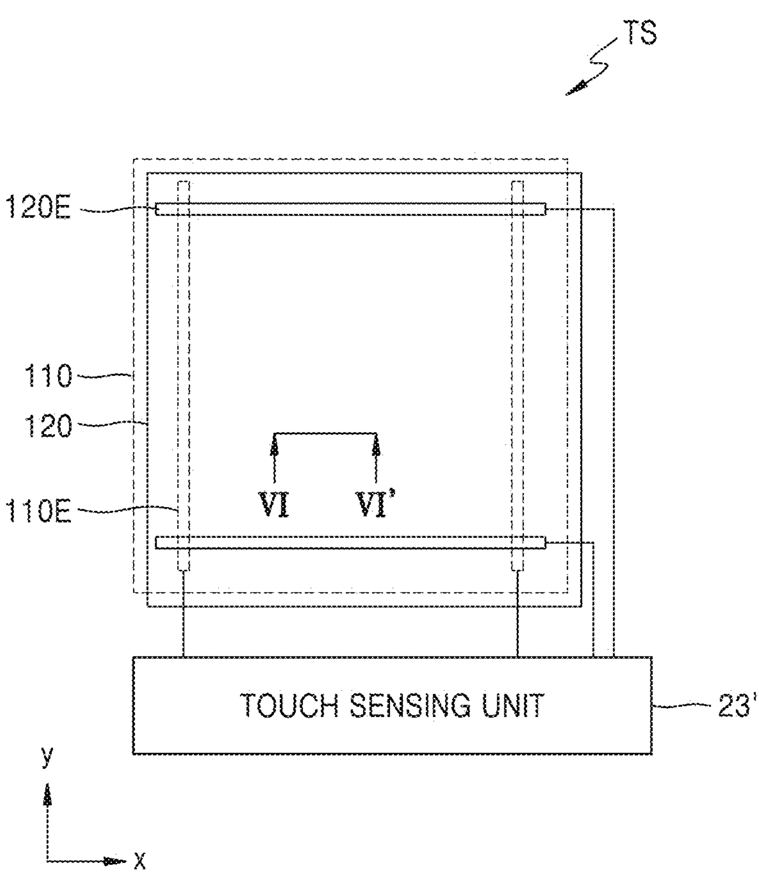
FIGS. 30A-30C are each a schematic view of a touch sensor according to one or more embodiments.
Figure 30B:
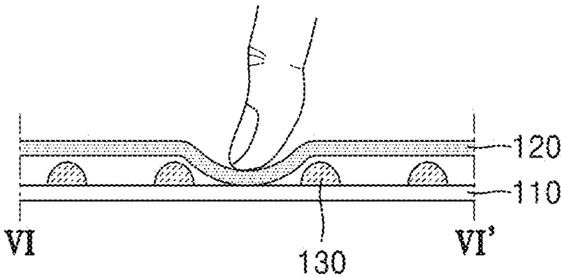
Figure 30C:
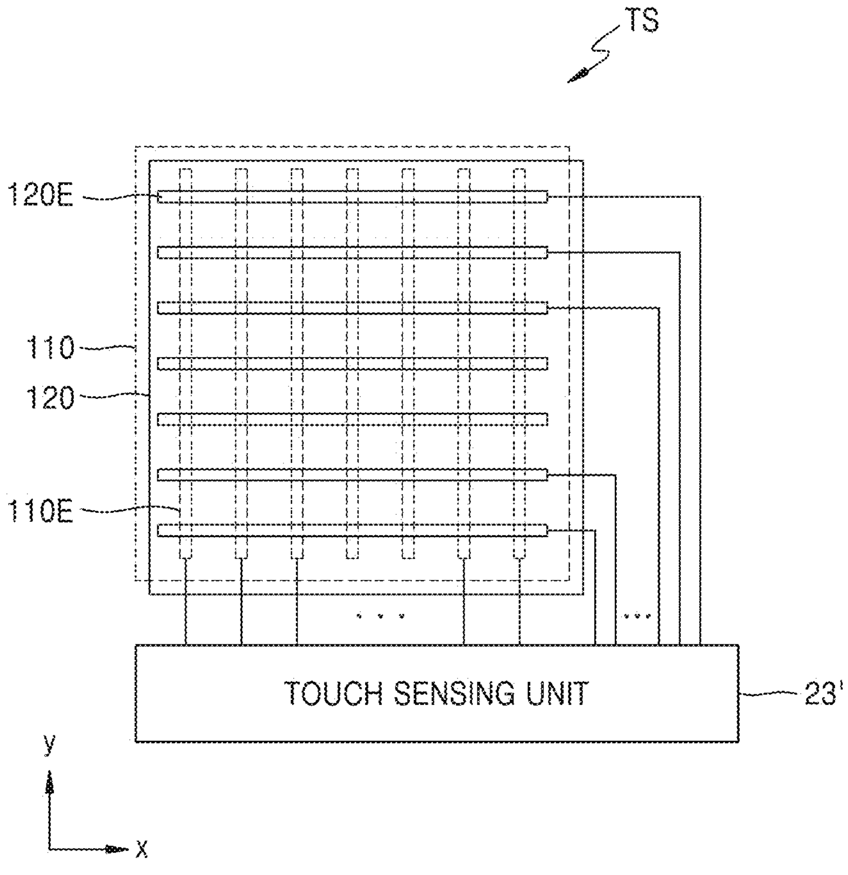

FIG. 29 is a schematic view of a display device according to one or more embodiments. FIGS. 30A-30C are each a schematic view of a touch sensor according to one or more embodiments. FIGS. 31A-31D are each a schematic view of a strain sensor according to one or more embodiments. Hereinafter, any redundant explanation described with reference to FIGS. 5-27 is omitted, and the embodiments are described focusing on the differences.

Referring to FIG. 29, the display device 1' may include a display panel DP, a display driving controller DDC, a touch sensor TS, a touch driving controller TDC, a strain sensor SS, a stretch sensing controller SSC, and a processor PRC.

In the display area of the display panel DP, a plurality of pixels PX and a plurality of gate lines GL and a plurality of data lines DL which are connected to the pixels PX may be arranged.

The display drive controller DDC may drive the pixels PX of the display panel DP under the control by the processor PRC.

The touch sensor TS may be arranged to overlap the display panel DP. In one or more embodiments, the touch sensor TS may be a capacitive touch sensor or a resistive touch sensor.

The touch driving controller TDC may sense an electrical characteristics change (for example, a capacitance change or a resistance change) for a particular location of the touch sensor TS and transmit the same to the processor PRC. The touch driving controller TDC may receive as an input a voltage or a current corresponding to the capacitance change or the resistance change from the touch sensor TS and transmit as touch sensing data the capacitance change or the resistance change for each location, which is calculated based on the input, to the processor PRC. The touch driving controller TDC may include a touch sensing unit 23' and a memory 27*a*.

The touch sensing unit 23' may drive the touch sensor TS according to a preset frequency and obtain the touch sensing data. The touch sensing unit 23' may identify a touch or a touch location from the touch sensing data. To this end, the touch sensing unit 23' may include a microprocessor (MPU) or a microcontroller (MCU).

The memory 27*a* may be a non-volatile memory. The non-volatile memory may be a flash memory. The memory 27*a* may store a lookup table showing a relation between a voltage and a touch location.

A capacitive touch sensor TS may have a structure identical to or similar with the structure of the strain sensor SS illustrated in FIG. 8. For example, the capacitive touch sensor TS may include columns of the first sensing electrodes 410 arranged in the y direction and the first signal lines SL1 connected thereto and columns of the second sensing electrodes 420 arranged in the x direction and the second signal lines SL2 connected thereto. The capacitive touch sensor TS may detect a touch and a touch location by a change amount of the capacitance Cm formed between adjacent first sensing electrode 410 and the second sensing electrode 420 as illustrated in FIG. 9.

The resistive touch sensor TS may include a pair of a lower resistive film 110 and an upper resistive film 120 that face each other and are spaced from each other at a certain distance as illustrated in FIGS. 30A and 30B. A plurality of spacers 130 may be arranged between the lower resistive film 110 and the upper resistive film 120 to maintain a gap. Lower electrodes 110E having a line shape may be provided at both x-direction ends of the lower resistive film 110 in the y direction, and upper electrodes 120E having a line shape may be provided at both y-direction ends of the upper resistive film 120 in the x direction.

FIG. 30B is a cross-sectional view taken along the line VI-VI' of FIG. 30A. As illustrated in FIG. 30B, when the upper resistive film 120 becomes in contact with the lower resistive film 110 due to an external input such as a touch, the upper resistive film 120 and the lower resistive film 110 may be electrically connected to each other at a contact point. The touch sensing unit 23' may alternately apply a voltage to the lower electrodes 110E and the upper electrodes 120E through the signal lines connected to each of the lower electrodes 110E and the upper electrodes 120E and obtain a voltage a contact point from the lower electrodes 110E and the upper electrodes 120E to detect a location of the contact point as a touch location. As the resistance changes according to a location of a contact point, the location of the contact point may be detected according to a measured voltage.

In one or more embodiments, the touch sensor TS may have a structure in which the plurality of lower electrodes 110E extending in the y-axis direction are arranged in the lower resistive film 110, and the plurality of upper electrodes 120E extending in the x-axis direction are arranged in the upper resistive film 120, as illustrated in FIG. 30C. The touch sensing unit 23' may alternately apply a voltage to the lower electrodes 110E and the upper electrodes 120E through the signal lines connected thereto and measure a voltage to detect a touch and a touch location.

In one or more embodiments, the conductive patterns such as a resistive film, an electrode, etc. constituting the touch sensor TS may include ITO. The conductive patterns may each include a conductive complex having a metallic nanostructure, etc. dispersed in polymer resin. The conductive complex may include an elastomer and may further include an additive, such as carbon nanotube, carbon fiber, graphene, graphene oxide, etc. to improve conductivity. In one or more embodiments, each of the conductive patterns may include a liquid metal material such as an eutectic gallium-indium alloy.

The strain sensor SS may be arranged to overlap the display panel DP. In one or more embodiments, the strain sensor SS may be integrated with a touch sensor as illustrated in FIG. 5 or may be provided separately from the touch sensor TS as illustrated in FIGS. 28 and 29.

The strain sensor SS may have a single-film or a double-film resistive sensor.

Figure 31A:
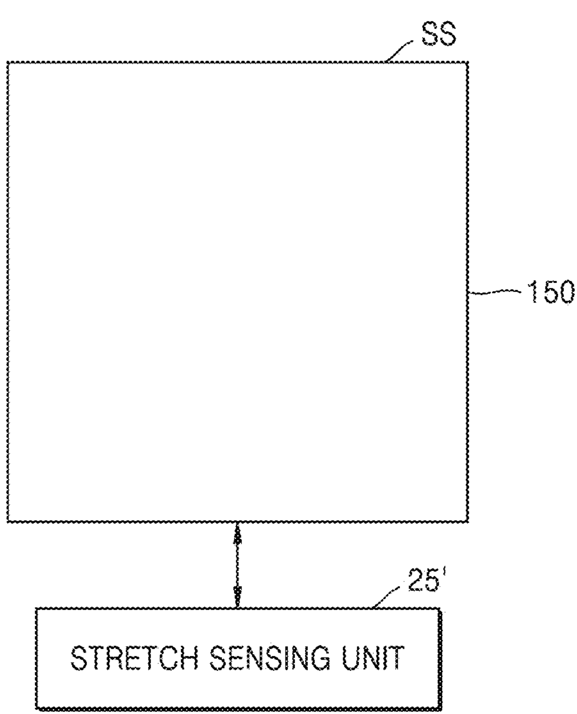
FIGS. 31A-31D are each a schematic view of a strain sensor according to one or more embodiments.

In one or more embodiments, as illustrated in FIG. 31A, the strain sensor SS may include a transparent resistive film 150. The transparent resistive film 150 may include indium tin oxide (ITO). The transparent resistive film 150 may include an elastomer having elasticity.

Figure 31B:
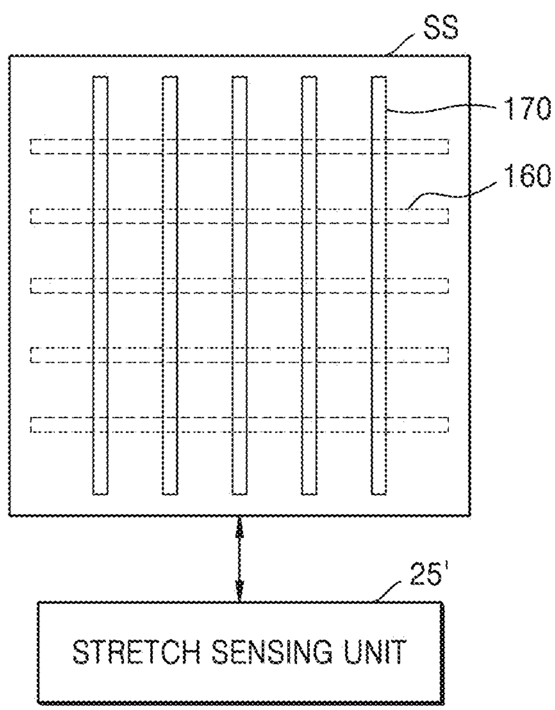

In one or more embodiments, as illustrated in FIG. 31B, the strain sensor SS may include a plurality of first sensing lines 160 extending in the x direction on a base layer and a plurality of second sensing lines 170 extending in the y direction, and the first sensing lines 160 and the second sensing lines 170 may be arranged spaced from each other at a certain distance to form a lattice. The base layer may include an elastomer having elasticity. The first sensing lines 160 and the second sensing lines 170 may include a metal or a semiconductor having a resistance that varies according to an applied external force. The first sensing lines 160 and the second sensing lines 170 may be arranged at different layers from each other. At least one insulating layer may be arranged between the layer at which the first sensing lines 160 are arranged and the layer at which the second sensing lines 170 are arranged. The first sensing lines 160 and the second sensing lines 170 may include an elastomer having elasticity.

Figure 31C:
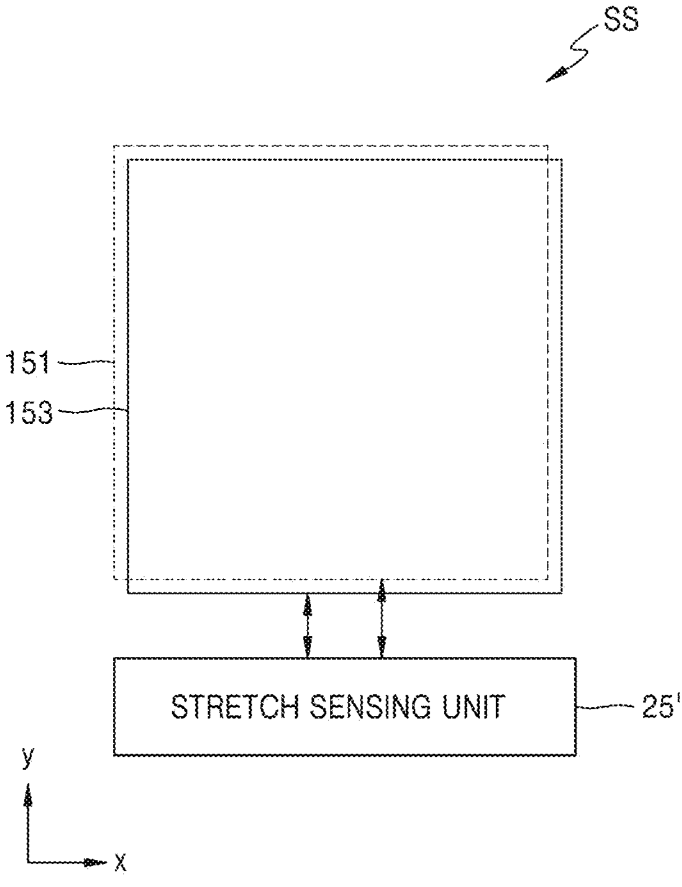

In one or more embodiments, as illustrated in FIG. 31C, the strain sensor SS may include a lower resistive film 151 and an upper resistive film 153 that are transparent. The lower resistive film 151 and the upper resistive film 153 may include ITO. The lower resistive film 151 and the upper resistive film 153 may include an elastomer having elasticity.

Figure 31D:
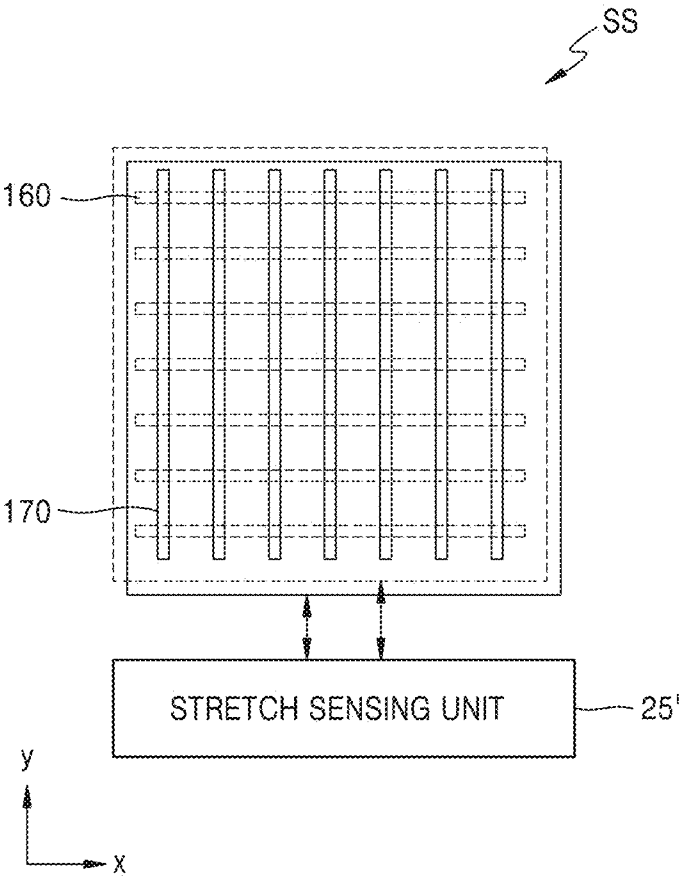

In one or more embodiments, as illustrated in FIG. 31D, the strain sensor SS may include a plurality of first sensing lines 160 extending in the x direction on a lower base layer and a plurality of second sensing lines 170 extending in the y direction on an upper base layer. The first sensing lines 160 and the second sensing lines 170 may include a metal or a semiconductor having a resistance that varies according to an applied external force. The lower base layer at which the first sensing lines 160 are arranged and the upper base layer at which the second sensing lines 170 are arranged may face each other and may include an elastomer having elasticity. The first sensing lines 160 and the second sensing lines 170 may include an elastomer having elasticity.

The stretch sensing controller SSC may be formed in the form of an integrated circuit chip and may be disposed on the FPCB on which the display driving controller DDC is arranged. In an embodiment, the stretch sensing controller SSC may be formed in the form of an integrated circuit chip and may be disposed on a separate FPCB from the FPCB on which the display driving controller DDC is arranged.

The stretch sensing controller SSC may include a stretch sensing unit 25' and a memory 27*b*. The stretch sensing unit 25' may obtain stretch sensing data by certain periods. For example, the stretch sensing unit 25' may measure a voltage and/or a current of the first sensing lines 160 and the second sensing lines 170 and obtain a resistance change as the stretch sensing data. The stretch sensing unit 25' may identify a stretch and a stretch location by comparing the stretch sensing data with reference data that is a resistance before stretching. The stretch sensing unit 25' may generate stretch data based on the stretch sensing data. The stretch data may include a stretch ratio, a stretch location and/or a stretch range. The stretch sensing unit 25' may provide the stretch data to the processor PRC.

The memory 27*b* may be a non-volatile memory. The non-volatile memory may be a flash memory. The memory 27*b* may store a stretch ratio according to a resistance change amount. The stretch ratio according to the resistance change amount may be generated in an inspection process for the display device 1' and may be stored in the memory 27*b*. For example, in the inspection process, the resistance change amount may be calculated for each stretch stage and may be written on the memory 27*b*.

The processor PRC may obtain correction data based on the stretch data obtained from the stretch sensing unit 25'. The processor PRC may obtain the correction data for each pixel in the display area DA corresponding to a stretch location and a stretch range from the lookup table stored in the memory 40. The processor PRC may generate corrected image data by applying the correction data to the image data.

Although the controller 17 is described as a timing controller which is separate from the processor PRC in the embodiments above, in one or more embodiments, the controller 17 may be a control device configured to further perform control functions of the processor PRC in addition to the functions of the timing controller and may be implemented as a micro control unit (MCU), a field programmable gate array (FPGA) device, a processor, etc. In this case, the controller 17 may communicate with the touch driving controller TDC or the stretch sensing controller SSC and perform image correction to compensate for the stretching.

Figure 32:
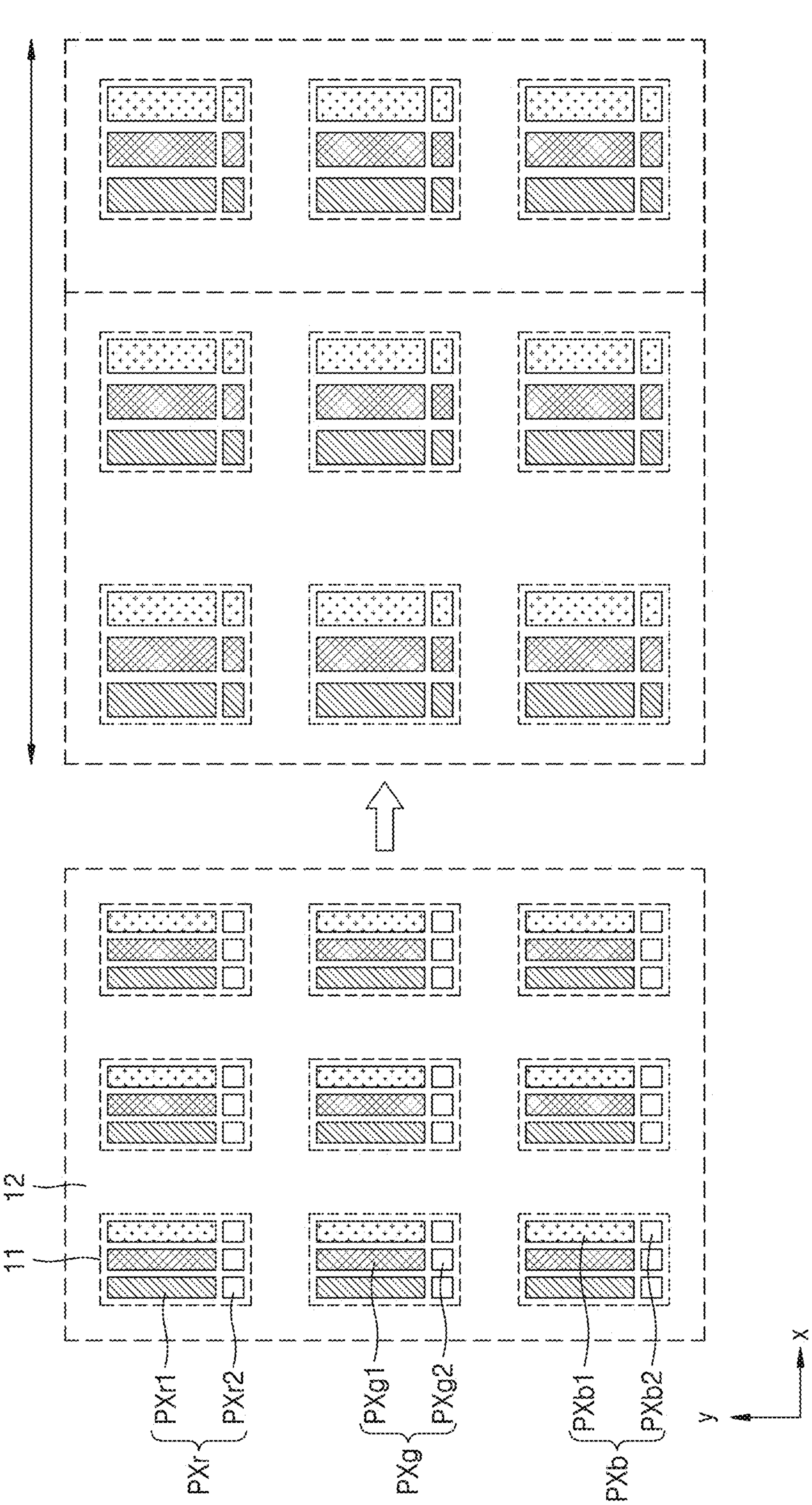
FIG. 32 is a schematic view illustrating a part of a display device before and after stretching according to one or more embodiments.

FIG. 32 is a schematic view illustrating a part of a display device before and after stretching according to one or more embodiments.

In one or more embodiments, the first areas 11 may respectively include different two subpixels. For example, as illustrated in FIG. 32, the red pixel PXr, the green pixel PXg, and the blue pixel PXb may respectively be arranged in the first area 11. The red pixel PXr of the first area 11 may include a pair of a first red pixel PXr1 and a second red pixel PXr2, the green pixel PXg may include a pair of a first green pixel PXg1 and a second green pixel PXg2, and the blue pixel PXb may include a pair of a first blue pixel PXb1 and a second blue pixel PXb2.

The display driving controller DDC may operate in a first mode to drive the display panel DP when there is no stretch or in a second mode to drive the display panel DP when stretching is in progress or stretching has already been performed.

In the first mode, the display driving controller DDC may drive the display panel DP such that one of the first red pixel PXr1 and the second red pixel PXr2, one of the first green pixel PXg1 and the second green pixel PXg2, and one of the first blue pixel PXb1 and the second blue pixel PXb2 in the first area 11 emit light.

In the second mode, the display driving controller DDC may drive the display panel DP such that both of the first red pixel PXr1 and the second red pixel PXr2, both of the first green pixel PXg1 and the second green pixel PXg2, and both of the first blue pixel PXb1 and the second blue pixel PXb2 in the first area 11 emit light.

In the second mode, the processor PRC may perform the image correction to compensate for the stretching as described above and provide corrected image data to the display driving controller DDC.

Figure 33A:
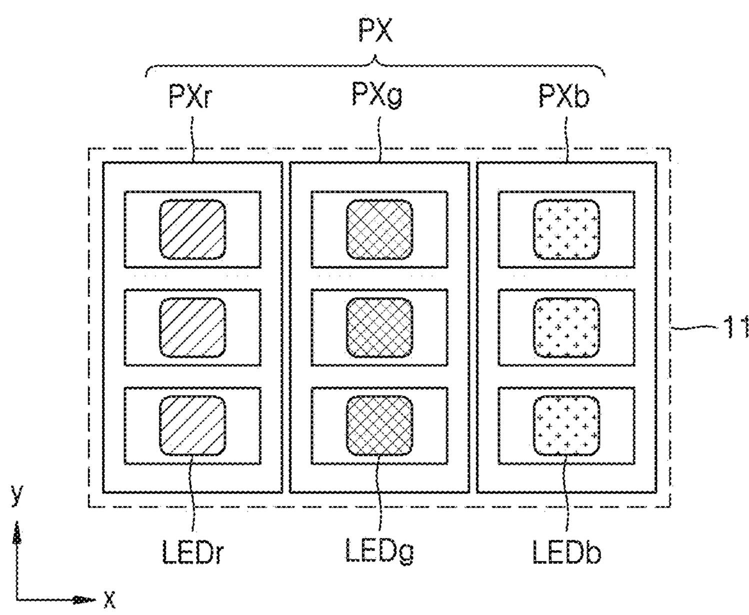
FIGS. 33A-33C are each a diagram illustrating an arrangement of pixels according to one or more embodiments.
Figure 33B:
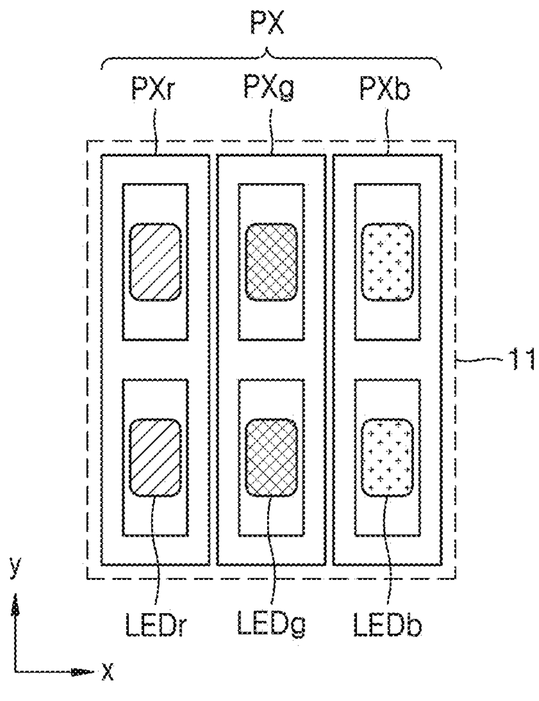
Figure 33C:
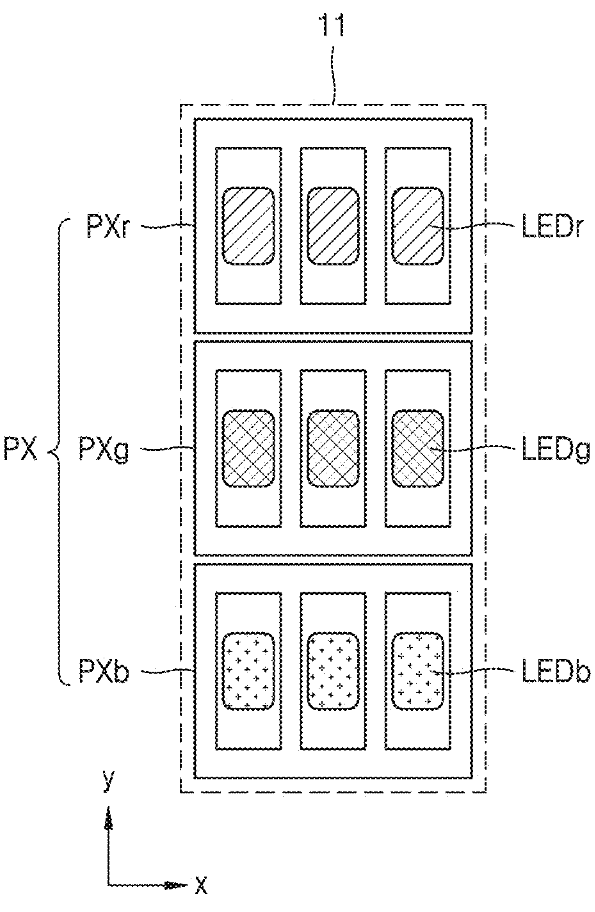
Figure 34A:
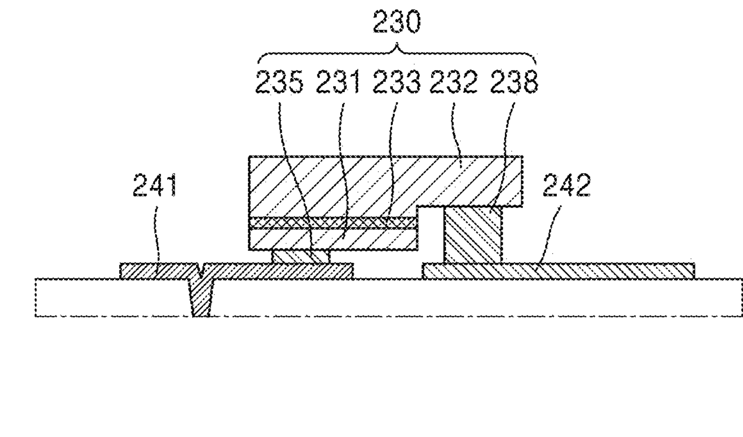
FIGS. 34A and 34B are each a schematic cross-sectional view of a light-emitting device according to one or more embodiments.
Figure 34A:
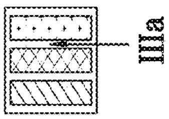
Figure 34B:
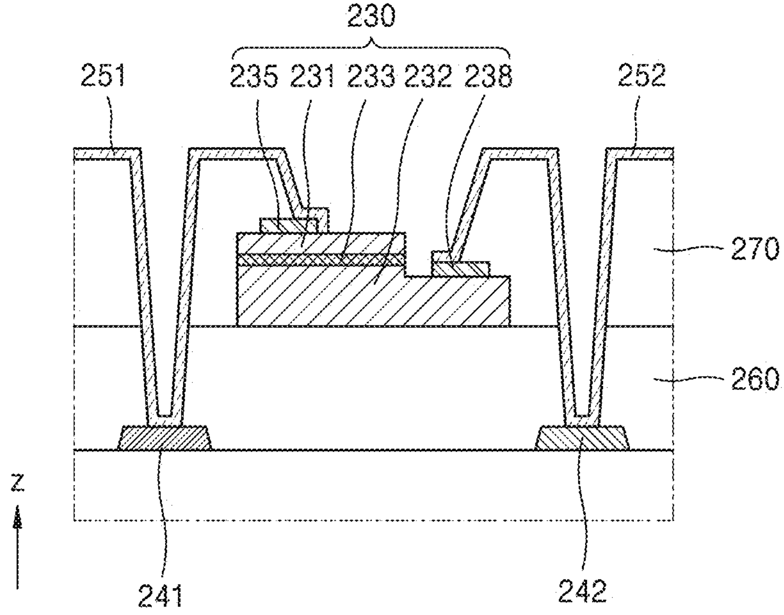

FIGS. 33A-33C are each a diagram illustrating an arrangement of pixels according to one or more embodiments. FIGS. 34A and 34B are each a schematic cross-sectional view of a light-emitting device according to one or more embodiments.

The pixel PX may be arranged in the first area 11, and the pixel PX may include a plurality of subpixels. Each subpixel may include a pixel circuit and a light-emitting device electrically connected to the pixel circuit. In one or more embodiments, the light-emitting device may be a light-emitting diode LED, and the light-emitting diode LED may be an inorganic light-emitting diode 230 including an inorganic material (FIGS. 34A and 34B). The red pixel PXr may include a plurality of red light-emitting diodes LEDr, the green pixel PXg may include a plurality of green light-emitting diodes LEDg, and the blue pixel PXb may include a plurality of blue light-emitting diodes LEDb. In one or more embodiments, each light-emitting diode may be connected to a corresponding pixel circuit to be driven independently. In one or more embodiments, light-emitting diodes in a subpixel may be connected to the same pixel circuit and may be driven concurrently.

In one or more embodiments, a plurality of light-emitting diodes in a subpixel may be arranged along the y direction and/or the x direction. For example, as illustrated in FIGS. 33A and 33B, the red pixel PXr may include two or more red light-emitting diodes LEDr arranged along the y direction, the green pixel PXg may include two or more green light-emitting diodes LEDg arranged along the y direction, and the blue pixel PXb may include two or more blue light-emitting diodes LEDb arranged along the y direction. As illustrated in FIG. 33C, the red pixel PXr may include two or more red light-emitting diodes LEDr arranged along the x direction, the green pixel PXg may include two or more green light-emitting diodes LEDg arranged along the x direction, and the blue pixel PXb may include two or more blue light-emitting diodes LEDb arranged along the x direction.

As illustrated in FIG. 34A, the inorganic light-emitting diode 230 may include a first semiconductor layer 231, a second semiconductor layer 232, an intermediate layer 233 between the first semiconductor layer 231 and the second semiconductor layer 232, a first electrode 235 connected to the first semiconductor layer 231, and a second electrode 238 connected to the second semiconductor layer 232. The first electrode 235 and the second electrode 238 of the inorganic light-emitting diode 230 may respectively be connected to a first electrode pad 241 and a second electrode pad 242 that are arranged at a same layer. The first electrode pad 241 may be connected to a pixel circuit through a contact hole passing through a lower insulating layer. The second electrode pad 242 may be provided as a single electrode shared by a plurality of subpixels.

In one or more embodiments, the first semiconductor layer 231 may include a p-type semiconductor layer. The p-type semiconductor layer may be selected from semiconductor materials having an empirical formula of InxAlyGa1-x-yN (0≤x≤1, 0≤y≤1, 0≤x+y≤1), for example, GaN, AlN, AlGaN, InGaN, InN, InAlGaN, AllnN, etc., and may be doped with a p-type dopant such as Mg, Zn, Ca, Sr, Ba, etc.

The second semiconductor layer 232 may include, for example, an n-type semiconductor layer. The n-type semiconductor layer may be selected from semiconductor materials having an empirical formula of InxAlyGa1-x-yN (0≤x≤1, 0≤y≤1, 0≤x+y≤1), for example, GaN, AlN, AlGaN, InGaN, InN, InAlGaN, AllnN, etc., and may be doped with an n-type dopant such as Si, Ge, Sn, etc.

The intermediate layer 233 may be an area in which electrons and holes recombine, thereby causing a shift to a low energy level, and light having a wavelength corresponding to the energy level may be generated. The intermediate layer 233 may by formed by including a semiconductor material having an empirical formula of $In_xAl_yGa_{1-x-y}N$ (0≤x≤1, 0≤y≤1, 0≤x+y≤1) and may have a single-quantum well structure or a multi-quantum well (MQW) structure. The intermediate layer 233 may include a quantum wire structure or a quantum dot structure.

FIG. 34A illustrates that the first semiconductor layer 231 includes a p-type semiconductor layer, and the second semiconductor layer 232 includes an n-type semiconductor layer; however, the present disclosure is not limited thereto. In one or more embodiments, the first semiconductor layer 231 ay include an n-type semiconductor layer, and the second semiconductor layer 232 may include a p-type semiconductor layer.

FIG. 34A illustrates that the first electrode pad 241 and the second electrode pad 242 are arranged on the same layer as the inorganic light-emitting diode 230; however, the present disclosure is not limited thereto. Referring to FIG. 34B, the first electrode pad 241 and the second electrode pad 242 may be arranged on a layer different from a layer at which the inorganic light-emitting diode 230 is arranged. For example, an insulating layer 260 may be arranged on the first electrode pad 241 and the second electrode pad 242, and the inorganic light-emitting diode 230 may be arranged on the insulating layer 260. In other words, in the one or more embodiments depicted in FIG. 34B, unlike the one or more embodiments of FIG. 34A, another layer (i.e., the insulating layer 260) is located between the inorganic light-emitting diode 230 and the first and second electrode pads 241, 242. A bank layer 270 at least partially overlapping the first electrode 235 and the second electrode 238 may be arranged on the inorganic light-emitting diode 230. The first electrode 235 and the first electrode pad 241 may be connected to each other by a first connection electrode 251, and the second electrode 238 and the second electrode pad 242 may be connected to each other by a second connection electrode 252. The first connection electrode 251 may connect the first electrode 235 with the first electrode pad 241 through a contact hole penetrating the bank layer 270 and the insulating layer 260. The second connection electrode 252 may connect the second electrode 238 with the second electrode pad 242 through a contact hole penetrating the bank layer 270 and the insulating layer 260. The structure of the inorganic light-emitting diode 230 illustrated in FIG. 34B is the same as described above in relation to FIG. 34A.

Figure 35:
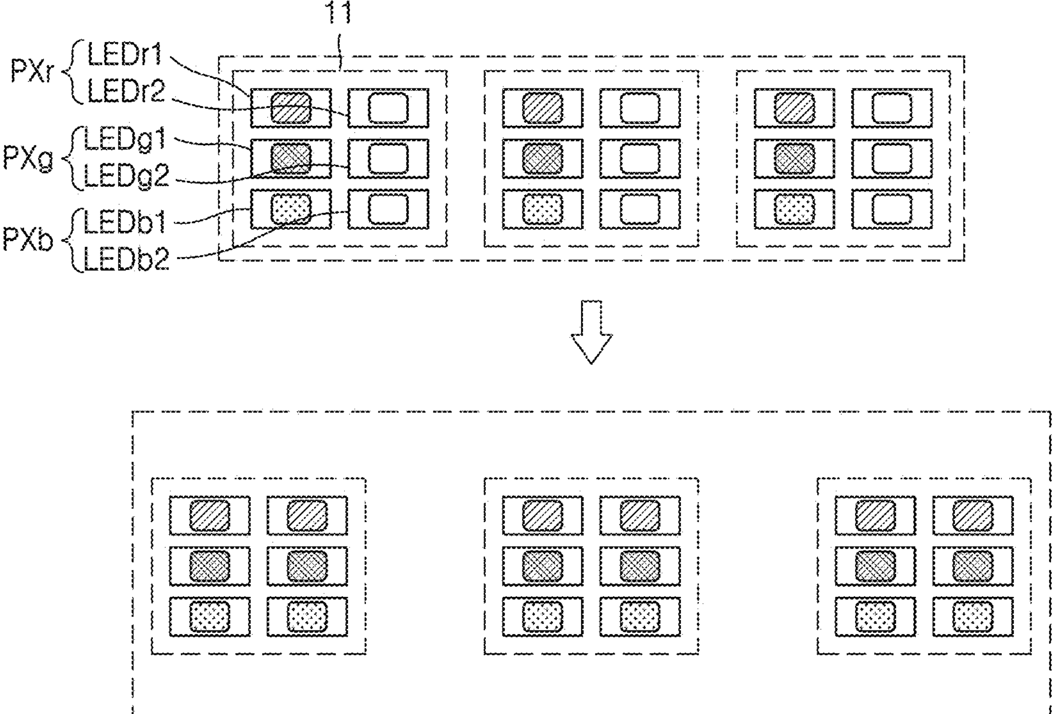
FIG. 35 is a schematic view illustrating a part of a display device before and after stretching according to one or more embodiments.

FIG. 35 is a schematic view illustrating a part of a display device before and after stretching according to one or more embodiments.

In one or more embodiments, in the first area 11, each of the subpixels may include two light-emitting diodes LED. For example, as illustrated in FIG. 35, the red pixel PXr, the green pixel PXg, and the blue pixel PXb may be arranged in the first area 11. In the first area 11, the red pixel PXr may include a pair of a first red light-emitting diode LEDr1 and a second red light-emitting diode LEDr2, the green pixel PXg may include a pair of a first green light-emitting diode LEDg1 and a second green light-emitting diode LEDg2, and the blue pixel PXb may include a pair of a first blue light-emitting diode LEDb1 and a second blue light-emitting diode LEDb2.

The display driving controller DDC may operate in a first mode to drive the display panel DP when there is no stretch or in a second mode to drive the display panel DP when stretching is in progress or stretching has already been performed.

In the first mode, the display driving controller DDC may drive the display panel DP such that one of the first red light-emitting diode LEDr1 and the second red light-emitting diode LEDr2, one of the first green light-emitting diode LEDg1 and the second green light-emitting diode LEDg2, and one of the first blue light-emitting diode LEDb1 and the second blue light-emitting diode LEDb2 emit light in the first area 11.

In the second mode, the display driving controller DDC may drive the display panel DP such that both of the first red light-emitting diode LEDr1 and the second red light-emitting diode LEDr2, both of the first green light-emitting diode LEDg1 and the second green light-emitting diode LEDg2, and both of the first blue light-emitting diode LEDb1 and the second blue light-emitting diode LEDb2 emit light in the first area 11.

In the second mode, the processor PRC may perform the image correction to compensate for the stretching as described above and provide corrected image data to the display driving controller DDC.

FIGS. 36A-36G are each a schematic perspective view illustrating an example of an electronic device including a display device according to one or more embodiments.

Figure 36A:
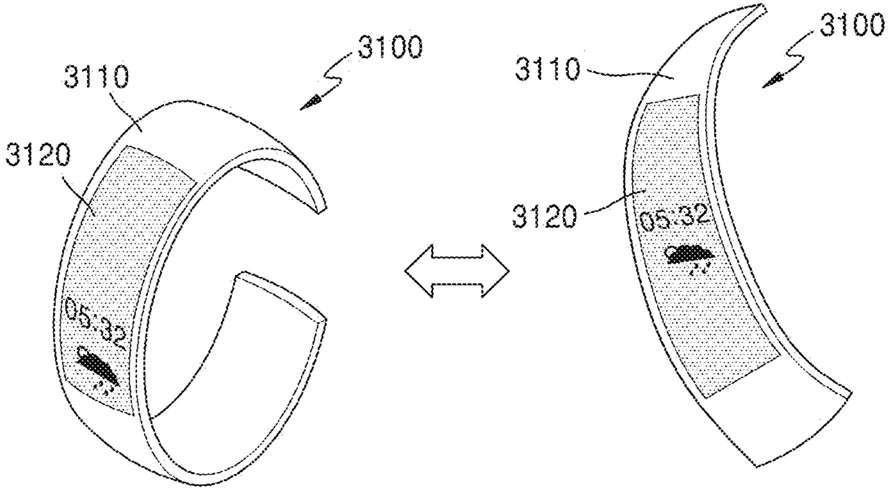
FIGS. 36A-36G are each a schematic perspective view illustrating an example of an electronic device including a stretchable display device according to one or more embodiments.

Referring to FIG. 36A, the display device according to one or more embodiments may be used in a wearable electronic device 3100 that may be worn on a body part of a user. The wearable electronic device 3100 may include a body portion 3110 and a display portion 3120 provided in the body portion 3110. The stretchable display device according to one or more embodiments may be used as the display portion 3120 of the wearable electronic device 3100. As illustrated in FIG. 36A, the wearable electronic device 3100 may be transformable. In one or more embodiments, the wearable electronic device 3100 may be used as a smart watch or a smartphone according to a user's choice.

Figure 36B:
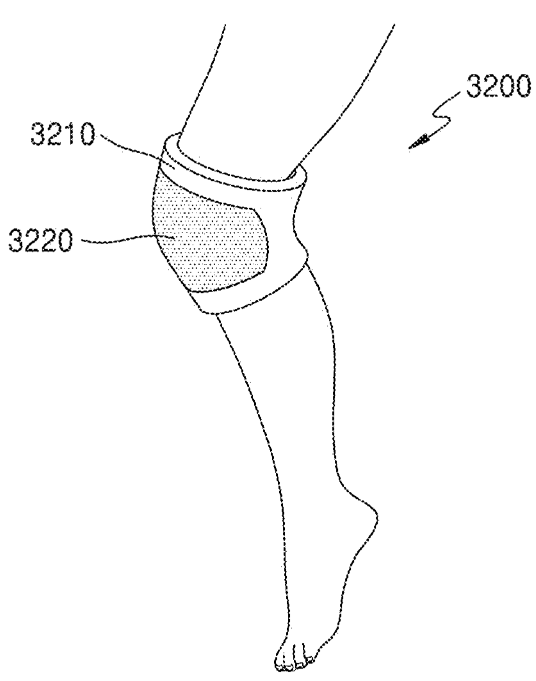

FIG. 36B illustrates a medical electronic device 3200. In one or more embodiments, the medical electronic device 3200 may include a body portion 3210 and an emission portion 3220. The stretchable display device according to one or more embodiments may be used as the emission portion 3220 of the medical electronic device 3200. The emission portion 3220 may emit light of a particular wavelength band (for example, infrared light, visible light, etc.) to the body of a patient. In one or more embodiments, the body portion 3210 may include a stretchable fiber material, and the emission portion may have a structure which may be worn on a body part of a user.

Figure 36C:
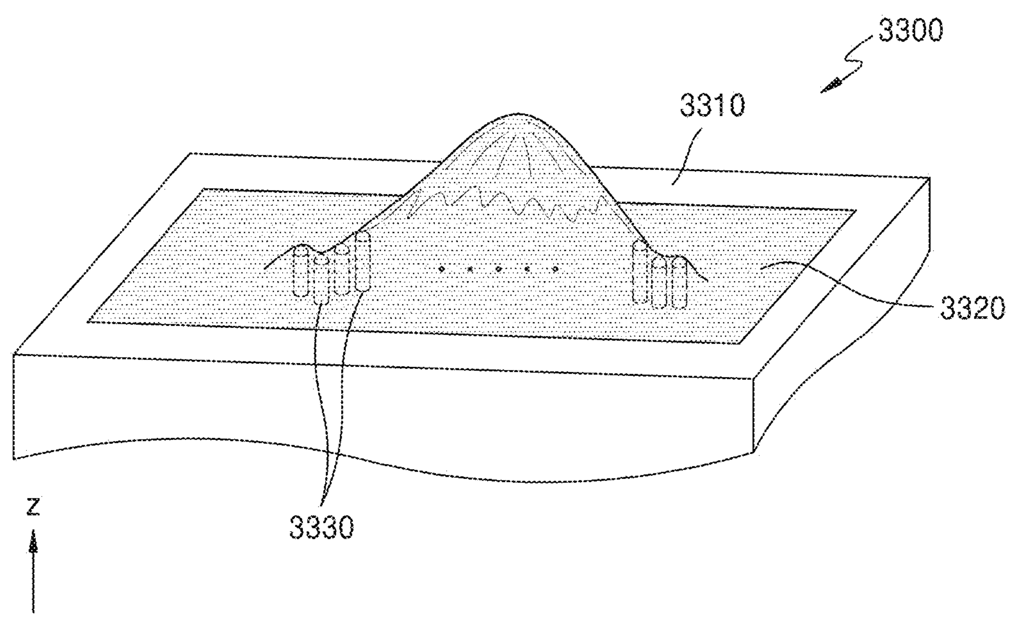

FIG. 36C illustrates an educational electronic device 3300. In one or more embodiments, the educational electronic device 3300 may include a display portion 3320 provided in a frame 3310. The stretchable display device according to one or more embodiments may be used as the display portion 3320. Through the display portion 3320, images of a choppy sea, a mountain covered with snow, a volcano with flowing lava, etc. may be provided, and in this case, the display portion 3320 may be stretched in a height direction (for example, the z direction) considering the height of the waves, mountains, and/or volcanos. In one or more embodiments, a part of the display portion 3320 may sequentially change in height in a flow direction of lava, which allows a user to see a three-dimensional movement of lava. The educational electronic device 3300 may include a plurality of pins 3330 (or strokes) arranged on a rear surface of the display portion 3320 to expand the display portion 3320 in the height direction. As the pins 3330 move in a third direction (for example, z direction or −z direction), an image expressed on the display portion 3320 may have a three-dimensional height. FIG. 36C illustrates the educational electronic device 330; however, the use thereof is not limited as long as certain image information is provided by the device.

FIGS. 36A-36C illustrate electronic devices having a transformable shape; however, the present disclosure is not limited thereto. As described below, the stretchable display device according to one or more embodiments may be used in an electronic device having a fixed portion to show an image (for example, a screen).

Figure 36D:
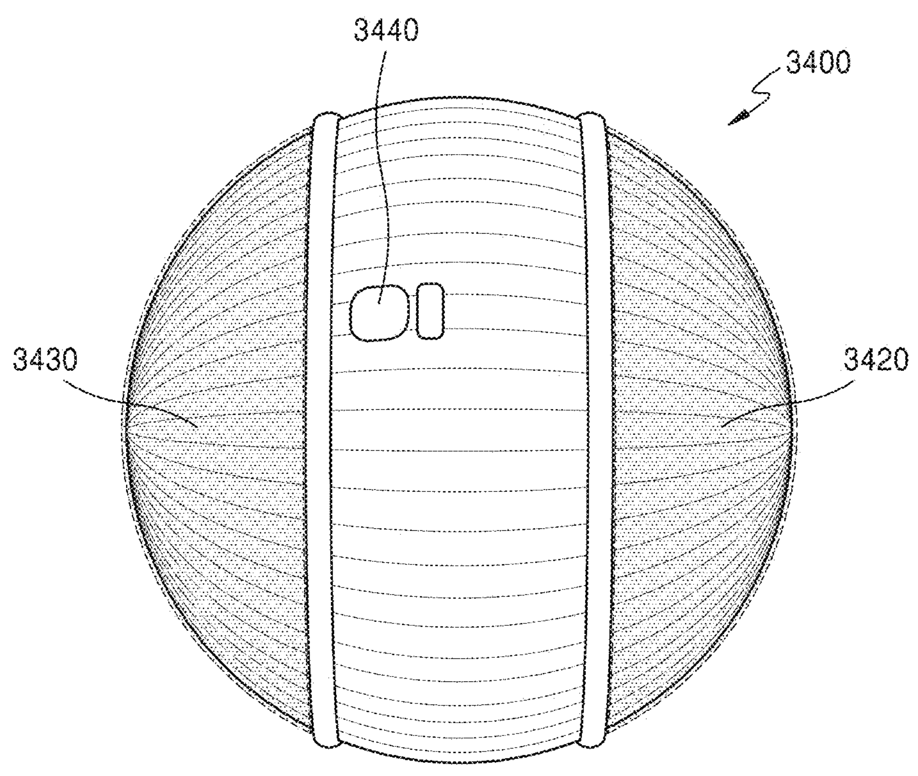

FIG. 36D illustrates a robot 3400 as an electronic device according to one or more embodiments. The robot 3400 may move or recognize an object by using a camera portion 3440 and may display a certain image to a user through display portions 3420 and 3430. In one or more embodiments, as the stretchable display device according to one or more embodiments may be stretched in various directions, they may be assembled into a body frame having a hemispherical shape, and accordingly, the robot 3400 may include hemispherical display portions 3420 and 3430.

Figure 36E:
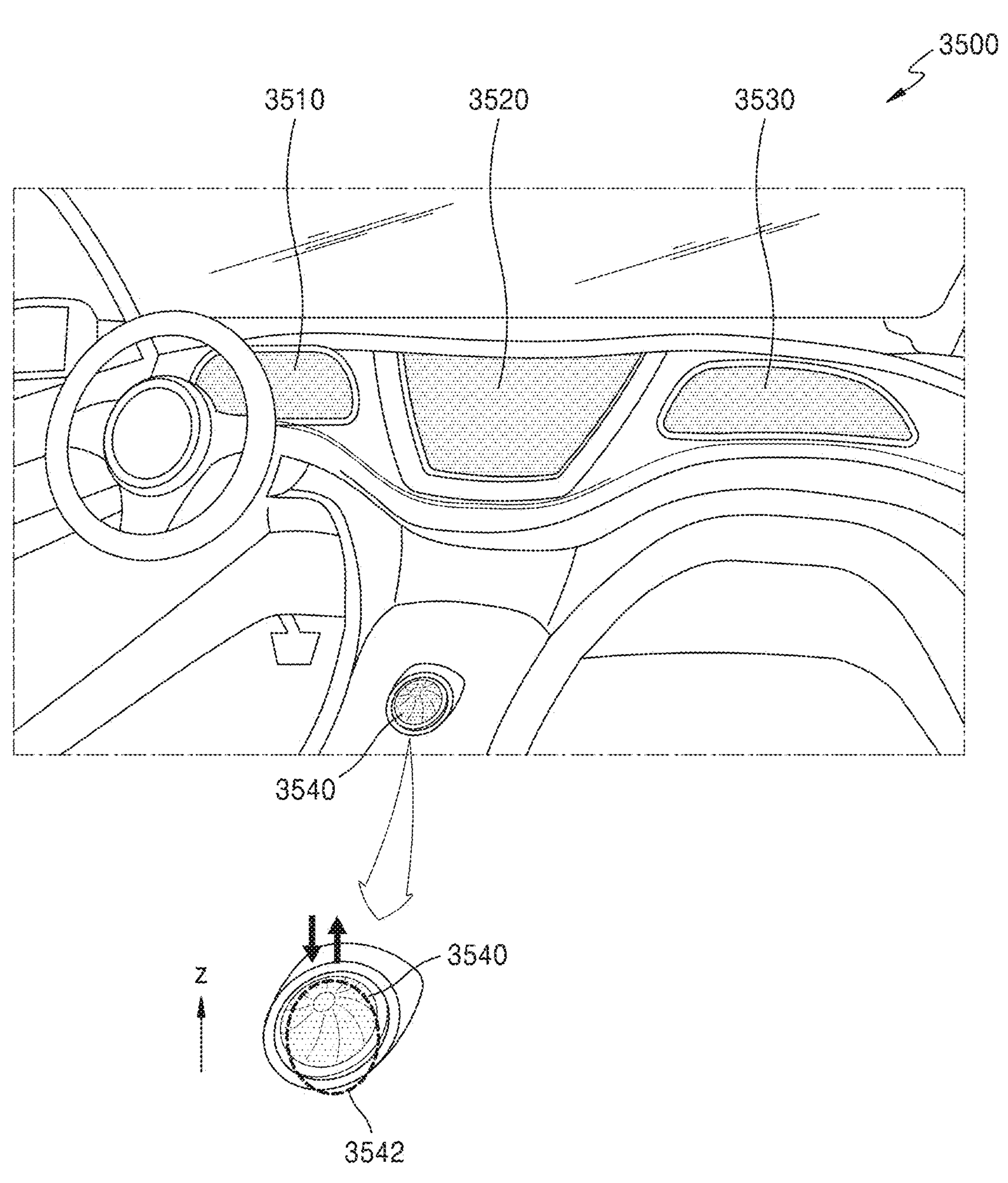

FIG. 36E illustrates a display device for vehicles 3500 as an electronic device according to one or more embodiments. The display device for vehicles 3500 may include a cluster 3510, a center information display (CID) 3520, and/or a passenger display. As the stretchable display device according to one or more embodiments may be stretched in various directions, it may be used in the cluster 3510, the CID 3520, and/or the co-driver display without being limited by a shape of an inner fame of vehicles.

FIG. 36E illustrates that the cluster 3510, the CID 3520, and/or the co-driver display are separated from each other; however, the present disclosure is not limited thereto. In one or more embodiments, two or more of the cluster 3510, the CID 3520, and the co-driver display may be integrated.

In one or more embodiments, the display device for vehicles 3500 may include a button 3540 that may show a certain image. Referring to an enlarged view of FIG. 36E, a semispherical button 3540 may include an object 3542 that may move in the z direction or the −z direction and provide a feeling of touching and a stretchable display device arranged on the object 3542. In one or more embodiments, when the object 3542 has a three-dimensionally round surface, the stretchable display device may also have a three-dimensionally round surface.

Figure 36F:
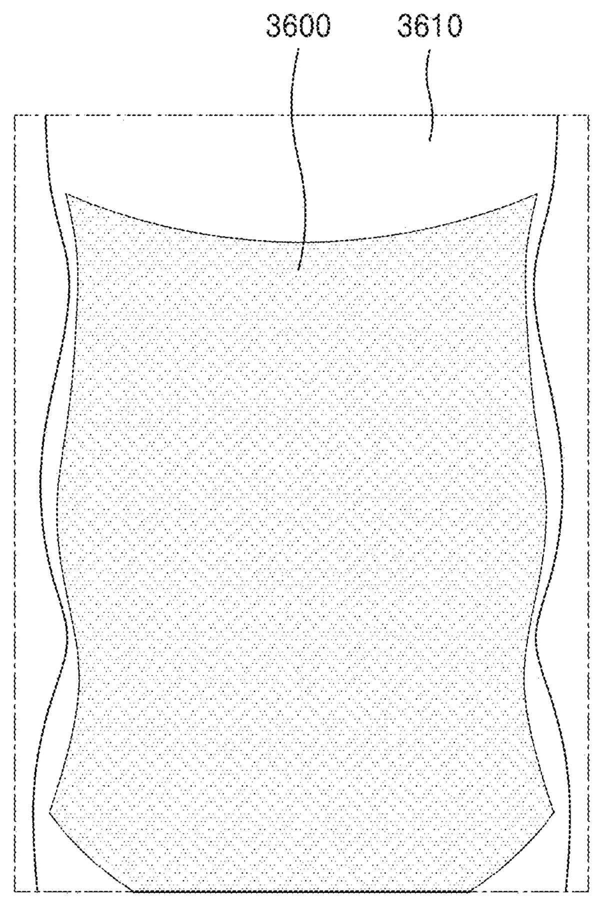

FIG. 36F illustrates an electronic device for advertisements or exhibitions 3600 as an electronic device according to one or more embodiments. In one or more embodiments, the electronic device 3600 for advertisements or exhibitions may be installed on a fixed structure 3610 such as a wall and/or a pillar. When the structure 3610 includes an uneven surface as illustrated in FIG. 36F, the electronic device for advertisements or exhibitions may be arranged along the uneven surface of the structure 3610. In one or more embodiments, the electronic device 3600 for advertisements or exhibitions may be installed on the structure 3610 by using a heat shrink film, etc.

Figure 36G:
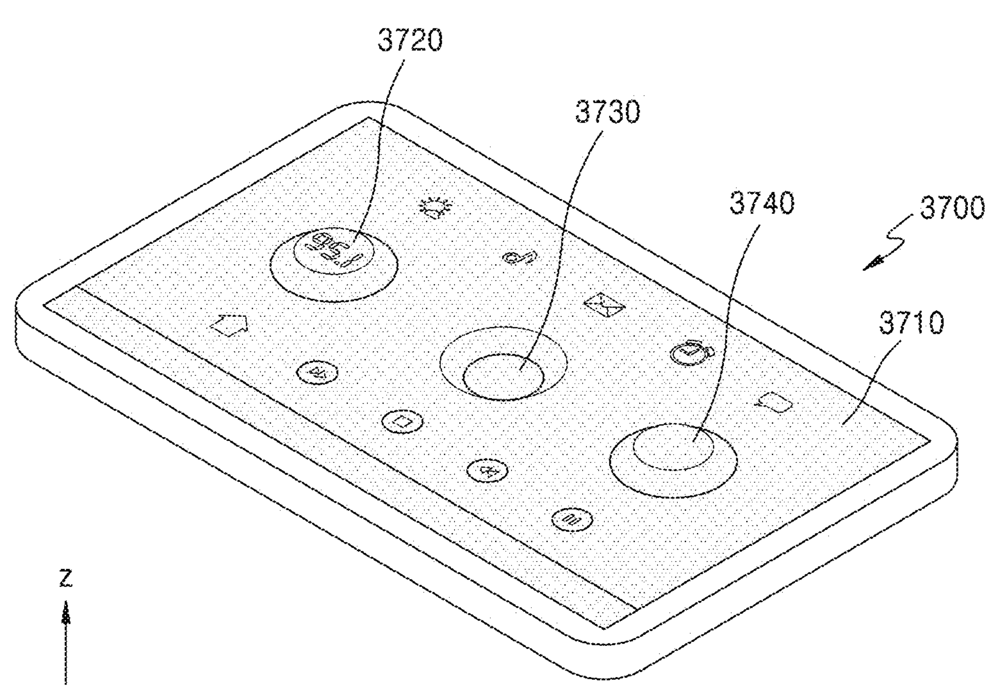

FIG. 36G illustrates a controller 3700 as an electronic device according to one or more embodiments. The controller 3700 may include an image-type button. For example, the controller 3700 may include first to third button areas 3720, 3730, and 3740 of which a display portion 3710 partially protrudes in the z direction or protrudes in the −z direction (or is recessed in the z direction). In one or more embodiments, the first and third button areas 3720 and 3740 may protrude in the z direction, and the second button area 3730 may protrude in the −z direction (or may be recessed in the z direction).

According to the embodiments of the present disclosure, the quality of provided images may remain the same before and after the stretching. According to one or more embodiments, stretching may be sensed by using a touch sensor or a separate stretch sensor. In one or more embodiments, as a stretch ratio is calculated by using a touch sensor, a separate stretch sensor may not be required, which may lead to reduced thickness of a display device and manufacturing cost. In addition, according to one or more embodiments, as a stretch state is sensed periodically and/or in consideration of stretch time, the stretch compensation may be performed by correcting an image in real time during and/or after the stretching. Accordingly, a change in the quality of images perceived by a user during and/or after stretching may be reduced.

According to one or more embodiments, a display device with improved display quality may be provided. However, the spirit and scope of the present disclosure is not limited to the above mentioned effects, aspects, and features.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims and their equivalents.

What is claimed is:

1. A stretchable display device comprising a processor configured to correct image data for stretch compensation, wherein the processor is configured to:

receive, from a stretch sensing unit of the display device, stretch data comprising a stretch location, a stretch range, and a stretch ratio determined based on an electrical characteristic change for each coordinate of a sensor of the display device; and correct the image data corresponding to pixels of the display device based on the stretch data and a lookup table comprising a relation between the stretch ratio and correction data, and wherein the correction data is determined based on an emission area ratio according to the stretch ratio and a characteristic change of a thin-film transistor according to the stretch ratio.

2. The stretchable display device of claim 1, wherein the correction data is determined based on the emission area ratio, and a characteristic change of a light-emitting device according to the stretch ratio.

3. The stretchable display device of claim 1, wherein the electrical characteristic change is a capacitance change amount, and wherein the stretch sensing unit is configured to determine at least one stretch range based on a stretch location having a minimum capacitance change amount and a stretch location having a maximum capacitance change amount.

4. The stretchable display device of claim 3, wherein the processor is further configured to correct image data of pixels in a display area corresponding to the at least one stretch range according to the stretch ratio.

5. The stretchable display device of claim 3, wherein the sensor comprises a capacitive touch sensor, and wherein the stretchable display device further comprises a touch sensing unit configured to sense a capacitance change amount for each coordinate of the sensor and generate touch data based on the capacitance change amount for each coordinate.

6. The stretchable display device of claim 5, wherein the touch sensing unit and the stretch sensing unit are separate integrated circuit chips or a single integrated circuit chip.

7. The stretchable display device of claim 5, wherein the touch sensing unit is configured to sense a touch when a capacitance for each coordinate of the sensor is greater than a reference capacitance, wherein the stretch sensing unit is configured to sense a stretch when a capacitance for each coordinate of the sensor is less than or equal to the reference capacitance, and wherein the reference capacitance is a maximum capacitance of the sensor calculated in a maximum stretch state.

8. The stretchable display device of claim 5, wherein the sensor comprises a plurality of sensing electrodes, and wherein the plurality of sensing electrodes comprises first sensing electrodes arranged along a first direction and electrically connected to each other and second sensing electrodes arranged along a second direction crossing the first direction and electrically connected to each other.

9. The stretchable display device of claim 1, wherein the processor is further configured to:

determine that stretch ratios in the stretch range are the same when a difference between the stretch ratios in the stretch range is within a threshold value; and differentiate a stretch ratio applied to pixels corresponding to a center area of the display device in the stretch range from a stretch ratio applied to pixels corresponding to an edge area of the display device in the stretch range, based on a stretch ratio lookup table for each area.

10. The stretchable display device of claim 1, wherein the processor is further configured to measure, during stretching, a first time point and a second time point, the first time point and the second time point being preset and correct image data input between the first time point and the second time point based on stretch ratios respectively set to the first time point and the second time point.

11. The stretchable display device of claim 10, wherein the processor is further configured to:

further set up a third time point between the first time point and the second time point and calculate a stretch ratio of the third time point by interpolation of a first stretch ratio set to the first time point and a second stretch ratio set to the second time point; and correct image data input between the first time point and the third time point and image data input between the second time point and the third time point.

12. The stretchable display device of claim 1, further comprising a data driving unit configured to output data signals corresponding to corrected image data to the pixels.

13. The stretchable display device of claim 1, wherein the electrical characteristic change is a resistance change amount, and wherein the stretch sensing unit is configured to determine at least one stretch range based on a stretch location determined based on a minimum resistance change amount and a stretch location determined based on a maximum resistance change amount.

14. The stretchable display device of claim 13, wherein the processor is further configured to correct image data of pixels in a display area corresponding to the at least one stretch range according to the stretch ratio.

15. The stretchable display device of claim 13, wherein the sensor comprises a single-film or double-film transparent resistive film having a resistance varying according to a stretch.

16. The stretchable display device of claim 13, wherein the sensor comprises a plurality of first sensing lines extending in a first direction and a plurality of second sensing lines extending in a second direction intersecting the first direction, the plurality of first sensing lines and the plurality of second sensing lines having a resistance varying according to a stretch, and wherein the plurality of first sensing lines and the plurality of second sensing lines are in different layers from each other.

17. The stretchable display device of claim 13, further comprising:

a resistive touch sensor; and a touch sensing unit configured to sense a resistance change amount for each coordinate of the touch sensor and generate touch data based on the resistance change amount for each coordinate.

18. A method of correcting image data for stretch compensation in a stretchable display device, the method comprising:

receiving, by a processor, from a stretch sensing unit of the display device, stretch data comprising a stretch location, a stretch range, and a stretch ratio determined based on an electrical characteristic change for each coordinate of a sensor; and correcting, by the processor, image data corresponding to pixels of the display device based on the stretch data and a lookup table comprising a relation between the stretch ratio and correction data, wherein the correction data is determined based on an emission area ratio, a characteristic change of a light-emitting device, and a characteristic change of a thin-film transistor, according to the stretch ratio.

19. The method of claim 18, wherein the sensor comprises a capacitive touch sensor, wherein the electrical characteristic change of the sensor comprises a capacitance change amount, and wherein the processor is configured to receive, from the stretch sensing unit, the stretch data determined based on a capacitive change amount of the sensor and receive, from a touch sensing unit of the display device, touch data determined based on the capacitive change amount of the sensor.

20. The method of claim 18, wherein the sensor comprises a resistive film having a resistance varying according to a stretch, wherein the electrical characteristic change of the sensor is a resistance change amount, wherein the processor is further configured to receive from the stretch sensing unit the stretch data determined based on a resistance change amount of the sensor, and receive from a touch sensing unit touch of the display device, data determined based on an electrical characteristic change amount for each coordinate of a touch sensor of the display device, wherein the touch sensor is separately located from the sensor and comprises a capacitive sensor or a resistive sensor, and wherein the electrical characteristic change amount of the touch sensor is a capacitance change amount or a resistance change amount.

* * * * *